United States Patent
Chamberland et al.

(10) Patent No.: US 12,008,438 B1
(45) Date of Patent: Jun. 11, 2024

(54) LATTICE SURGERY TECHNIQUES USING TWISTS

(71) Applicant: Amazon Technologies, Inc., Seattle, WA (US)

(72) Inventors: Christopher Chamberland, Pasadena, CA (US); Earl Campbell, Sheffield (GB)

(73) Assignee: Amazon Technologies, Inc., Seattle, WA (US)

( * ) Notice: Subject to any disclaimer, the term of this patent is extended or adjusted under 35 U.S.C. 154(b) by 113 days.

(21) Appl. No.: 17/707,811

(22) Filed: Mar. 29, 2022

Related U.S. Application Data

(60) Provisional application No. 63/297,645, filed on Jan. 7, 2022.

(51) Int. Cl.
| | |
|---|---|
| *G06F 11/00* | (2006.01) |
| *G06F 11/30* | (2006.01) |
| *G06N 10/20* | (2022.01) |
| *G06N 10/70* | (2022.01) |
| *G08C 25/00* | (2006.01) |
| *H03M 13/00* | (2006.01) |
| *H04L 1/00* | (2006.01) |

(52) U.S. Cl.
CPC ............. *G06N 10/70* (2022.01); *G06N 10/20* (2022.01)

(58) Field of Classification Search
CPC ................................ G06N 10/70; G06N 10/20
See application file for complete search history.

(56) References Cited

PUBLICATIONS

Litinski et al. Lattice Surgery with a Twist: Simplifying Clifford Gates of Surface Codes. Apr. 17, 2018, Quantun vol. 2, arXIV pp. 1-16.*
Horsman et al. Surface code quantum computing by lattice surgery. New Journal of Physics vol. 14, 2012. pp. 1-28.*
J. Preskill, "Reliable quantum computers", Proceedings of the Royal Society of London. Series A: Mathematical, Physical and Engineering Sciences 454, pp. 385-410 (1998).
B. M. Terhal, "Quantum error correction for quantum memories", Rev. Mod. Phys. 87, 307, arXiv:1302.3428 (2015), pp. 1-47.
E. T. Campbell, B. M. Terhal, and C. Vuillot, "Roads towards fault-tolerant universal quantum computation," Nature 549, pp. 172-179 (2017) arXiv:1612.07330v1 [quant-ph].

(Continued)

*Primary Examiner* — Samir W Rizk
(74) *Attorney, Agent, or Firm* — Alexander A. Knapp; Kowert, Hood, Munyon, Rankin & Goetzel, P.C.

(57) ABSTRACT

A technique for performing lattice surgery using twists is disclosed. Also, an error correcting code and decoder is provided that allows for error decoding of Pauli measurements performed in association with a lattice surgery operation. This allows for overall run-times of lattice surgery to be reduced. For example, some level of errors are tolerable, because they can be corrected, thus fewer measurement rounds ($d_m$) may be performed for a given round of Pauli measurements. Additionally, a temporal encoding of lattice surgery technique is provided, which may additionally or alternatively be used to shorten run times. Also, a quantum computer layout is provided, wherein the layout includes a core computing region and a cache region. Also, protocols for swapping logical qubits between the core and cache are provided.

20 Claims, 31 Drawing Sheets

(56) References Cited

PUBLICATIONS

A. Y. Kitaev, "Fault-tolerant quantum computation by anyons", Annals of Physics 303, pp. 2-30 (2003), 2002 Elsevier Science.

A. G. Fowler, M. Mariantoni, J. M. Martinis, and A. N. Cleland, "Surface codes: Towards practical large-scale quantum computation", Phys. Rev. A 86, 032324 (2012), ©2012 American Physical Society, pp. 1-48.

P. W. Shor, "Fault-tolerant quantum computation", in Proceedings of the 37th Annual Symposium on Foundations of Computer Science (IEEE, 1996) pp. 56-65.

R. Raussendorf, J. Harrington, and K. Goyal, "Topological fault-tolerance in cluster state quantum computation", New Journal of Physics 9, 199, © IOP Publishing Ltd and Deutsche Physikalische Gesellschaft (2007), pp. 1-25.

C. Horsman, A. G. Fowler, S. Devitt, and R. Van Meter, "Surface code quantum computing by lattice surgery", New Journal of Phys. 14, 123011,© IOP Publishing Ltd and Deutsche Physikalische Gesellschaft (2012), pp. 1-28.

A. G. Fowler and C. Gidney, Low overhead quantum computation using lattice surgery, arXiv preprint arXiv:1808.06709, 2018, pp. 1-15.

D. Litinski and F. v. Oppen, "Lattice Surgery with a Twist: Simplifying Clifford Gates of Surface Codes", Quantum vol. 2, arXiv:1709.02318v2 (2018), pp. 1-16.

D. Litinski, "A Game of Surface Codes: Large-Scale Quantum Computing with Lattice Surgery", Quantum vol. 3, arXiv:1808.02892v3 [quant-ph] (2019), pp. 1-37.

D. Gottesman and I. L. Chuang, "Quantum teleportation is a universal computational primitive", Nature 402, (1999), arXiv:quant-ph/9908010v1, pp. 1-6.

X. Zhou, D. W. Leung, and I. L. Chuang, "Methodology for quantum logic gate constructions", Phys. Rev. A 62, 052316 (2000), arXiv:quant-ph/0002039, pp. 1-17.

S. Bravyi and A. Kitaev, "Universal quantum computation with ideal clifford gates and noisy ancillas", Phys. Rev. A 71, 022316, Core, (2005), 2005 The American Physical Society, pp. 1-14.

S. Bravyi and J. Haah, "Magic-state distillation with low overhead", Phys. Rev. A 86, 052329 (2012) ©2012 American Physical Society, pp. 10.

A. M. Meier, B. Eastin, and E. Knill, "Magic-state distillation with the four-qubit code", Quant. Inf. and Comp. 13, 195 (2013), arXiv:1204.4221 [quant-ph], pp. 1-10.

C. Jones, "Multilevel distillation of magic states for quantum computing", Phys. Rev. A 87, 042305 (2013), arXiv:1210.3388 [quant-ph], pp. 1-10.

E. T. Campbell and M. Howard, "Magic state parity-checker with pre-distilled components", Quantum 2, 56 (2018), arXiv:1709.02214v3 [quant-ph], pp. 1-18.

C. Chamberland and A. W. Cross, "Fault-tolerant magic state preparation with flag qubits", Quantum vv. 3, 143 (2019), arXiv:1811.00566v2 [quant-ph], pp. 1-26.

C. Chamberland and K. Noh, "Very low overhead fault-tolerant magic state preparation using redundant ancilla encoding and flag qubits", npj Quantum Information 6, 91 (2020), Published in partnership with The University of New South Wales, pp. 1-12.

H. Bombin and M. A. Martin-Delgado, "Topological quantum distillation", Phys. Rev. Lett. V. 97, 180501 (2006), arXiv:quant-ph/0605138, pp. 1-4.

T. Jochym-O'Connor and R. Laflamme, "Using concatenated quantum codes for universal fault-tolerant quantum gates", Phys. Rev. Lett. 112, 010505 (2014), arXiv: 1309.3310 [quant-ph], pp. 1-5.

H. Bombin, "Dimensional jump in quantum error correction", New Journal of Physics v. 18, 043038 (2016), IOP Institute of Physics, pp. 1-13.

T. J. Yoder, R. Takagi, and I. L. Chuang, "Universal fault-tolerant gates on concatenated stabilizer codes", Phys. Rev. X 6, 031039, Published by the American Physical Society (2016), pp. 1-23.

C. Chamberland, T. Jochym-O'Connor, and R. Laflamme, "Thresholds for universal concatenated quantum codes", Phys. Rev. Lett. 117, 010501 (2016), arXiv:1603.02704 [quant-ph], pp. 1-10.

C. Chamberland, T. Jochym-O'Connor, and R. Laflamme, Overhead analysis of universal concatenated quantum codes, Phys. Rev. A 95, 022313 (2017), arXiv:1609.07497v3 [quant-ph] , pp. 1-25.

M. E. Beverland, A. Kubica, and K. M. Svore, Cost of universality: A comparative study of the overhead of state distillation and code switching with color codes, PRX Quantum 2, 020341, (2021), Published by the American Physical Society, pp. 1-46.

S. Bravyi, G. Smith, and J. A. Smolin, "Trading classical and quantum computational resources", Phys. Rev. X 6, 021043, (2016), Published by the American Physical Society, pp. 1-14.

C. Jones, "Low-overhead constructions for the fault-tolerant Toffoli gate", Phys. Rev. A 87, 022328 (2013), arXiv:1212.5069 [quant-ph], pp. 1-5.

B. Eastin, "Distilling one-qubit magic states into Toffoli states", Phys. Rev. A 87, 032321 (2013), arXiv:1212.4872 [quant-ph] pp. 1-8.

C. Gidney and A. G. Fowler, "Efficient magic state factories with a catalyzed |CCZ> to 2|T> transformation", Quantum 3, 135 (2019), arXiv:1812.01238v3 [quant-ph], pp. 1-24.

C. Chamberland, et al., Building a fault-tolerant quantum computer using concatenated cat codes, arXiv preprint arXiv:2012.04108 (2020), pp. 1-118.

E. T. Campbell and M. Howard, "Unified framework for magic state distillation and multiqubit gate synthesis with reduced resource cost", Phys. Rev. A 95, 022316 (2017), arXiv:1606.01904 [quant-ph], pp. 1-23.

E. T. Campbell and M. Howard, "Unifying gate synthesis and magic state distillation", Phys. Rev. Lett. 118, 060501 (2017), arXiv:1606.01906v2, pp. 1-5.

J. Haah and M. B. Hastings, "Codes and Protocols for Distilling T, controlled-S, and Toffoli Gates", Quantum 2, 71 (2018), arXiv:1709.02832v3 pp. 1-29.

C. Gidney, "Halving the cost of quantum addition", Quantum 2, 74 (2018), arXiv:1709.06648v3, pp. 1-6.

J. O'Gorman and E. T. Campbell, "Quantum computation with realistic magic-state factories", Phys. Rev. A 95, 032338 (2017), Published by the American Physical Society, pp. 1-19.

E. Campbell, A. Khurana, and A. Montanaro, Applying quantum algorithms to constraint satisfaction problems, Quantum 3, 167 (2019), arXiv:1810.05582v2, pp. 1-30.

D. W. Berry, C. Gidney, M. Motta, J. R. McClean, and R. Babbush, "Qubitization of Arbitrary Basis Quantum Chemistry Leveraging Sparsity and Low Rank Factorization", Quantum 3, 208 (2019), arXiv:1902.02134v4, pp. 1-44.

I. D. Kivlichan, et al., "Improved Fault-Tolerant Quantum Simulation of Condensed-Phase Correlated Electrons via Trotterization", Quantum 4, 296 (2020), arXiv:1902.10673v4, pp. 1-45.

J. Lee, D. W. Berry, C. Gidney, W. J. Huggins, J. R. McClean, N. Wiebe, and R. Babbush, "Even more efficient quantum computations of chemistry through tensor hypercontraction", PRX Quantum 2, 030305 (2021), Published by the American Physical Society, pp. 1-62.

Y. Tomita and K. M. Svore, "Low-distance surface codes under realistic quantum noise", Phys. Rev. A 90, 062320 (2014), arXiv:1404.3747 [quant-ph], pp. 1-15.

C. Vuillot, L. Lao, B. Criger, C. G. Almud'ever, K. Bertels, and B. M. Terhal, "Code deformation and lattice surgery are gauge fixing", New Journal of Phys. 21, 033028 (2019), pp. 1-21.

J. Edmonds, "Paths, trees, and flowers", Canadian Journal of mathematics 17, 449 (1965), pp. 449-467.

C. Chamberland, G. Zhu, T. J. Yoder, J. B. Hertzberg, and A. W. Cross, "Topological and subsystem codes on low-degree graphs with flag qubits", Phys. Rev. X 10, 011022 (2020), Published by the American Physical Society pp. 1-19.

C. Chamberland, A. Kubica, T. J. Yoder, and G. Zhu, "Triangular color codes on trivalent graphs with flag qubits", New Journal of Physics 22, 023019 (2020), IOP Publishing, pp. 1-24.

(56) References Cited

PUBLICATIONS

C. Chamberland, A. Kubica, T. J. Yoder, and G. Zhu, Triangular color codes on trivalent graphs with flag qubits, New Journal of Physics 22, 023019 (2020), arXiv:1004.1838 [cond-mat.str-el], pp. 1-5.

T. J. Yoder and I. H. Kim, The surface code with a twist:, Quantum vol. 1, p. 2 (2017), arXiv:1612.04795v2, pp. 1-19.

R. Chao and B. W. Reichardt, "Quantum error correction with only two extra qubits", Phys. Rev. Lett. 121, 050502 (2018), arXiv:1705.02329 [quant-ph] pp. 1-9.

R. Chao and B.W. Reichardt, "Fault-tolerant quantum computation with few qubits", npj Quantum Information 4, 2056 (2018), nature.com, pp. 1-8.

C. Chamberland and M. E. Beverland, "Flag fault-tolerant error correction with arbitrary distance codes", Quantum 2, 53 (2018), arXiv: 1708.02246v3 [quant-ph] pp. 1-29.

Y. Shi, C. Chamberland, and A. Cross, "Fault-tolerant preparation of approximate GKP states", New J. Phys. 21, 093007, (2019), pp. 1-26.

T. Tansuwannont, C. Chamberland, and D. Leung, "Flag faulttolerant error correction, measurement, and quantum computation for cyclic calderbank-shor-steane codes", Phys. Rev. A 101, 012342 (2020), arXiv:1803.09758 [quant-ph], pp. 1-17.

R. Chao and B.W. Reichardt, "Flag fault-tolerant error correction for any stabilizer code", PRX Quantum 1, 010302 (2020), Published by the American Physical Society, pp. 1-6.

B. W. Reichardt, "Fault-tolerant quantum error correction for Steane's seven-qubit color code with few or no extra qubits," mQuantum Sci. Technol. 6, 015007 (2020), arXiv:1804.06995 [quant-ph], pp. 1-11.

T. Tansuwannont and D. Leung, "Achieving fault tolerance on capped color codes with few ancillas", arXiv e-prints, arXiv:2106.02649 (2021), arXiv:2106.02649, pp. 1-39.

A. G. Fowler, "Time-optimal quantum computation", arXiv preprint arXiv:1509.03239 (2012), pp. 1-5.

I. Kim, E. Lee, Y.-H. Liu, S. Pallister, W. Pol, and S. Roberts, "Fault-tolerant resource estimate for quantum chemical simulations: Case study on li-ion battery electrolyte molecules", arXiv preprint arXiv:2104.10653 (2021), pp. 1-26.

S. Puri, L. St-Jean, J. A. Gross, A. Grimm, N. E. Frattini, P. S. Iyer, A. Krishna, S. Touzard, L. Jiang, A. Blais, et al., "Biaspreserving gates with stabilized cat qubits", Science advances vol. 6, issued 34, DOI: 10.1126/sciadv.aay5901 (2020), pp. 1-16.

E. T. Campbell, A theory of single-shot error correction for adversarial noise, Quantum Science and Technology 4, 025006, © 2019 IOP Publishing Ltd., arXiv:1805.09271 [quant-ph], pp. 1-30.

A. O. Quintavalle, M. Vasmer, J. Roffe, and E. T. Campbell, "Single-shot error correction of three-dimensional homological product codes", PRX Quantum 2, 020340 (2021), Published by the American Physical Society, pp. 1-35.

D. K. Tuckett, S. D. Bartlett, S. T. Flammia, and B. J. Brown, "Fault-tolerant thresholds for the surface code in excess of 5% under biased noise", Phys. Rev. Lett. 124, 130501 (2020), arXiv:1907.02554 [quant-ph], ages 1-10.

A. Ashikhmin, C.-Y. Lai, and T. A. Brun, "Quantum Data-Syndrome Codes", IEEE Journal on Selected Areas in Communications 38, 449 (2020), arXiv:1907.01393, pp. 1-18.

D. K. Tuckett, A. S. Darmawan, C. T. Chubb, S. Bravyi, S. D. Bartlett, and S. T. Flammia, "Tailoring surface codes for highly biased noise", Phys. Rev. X 9, 041031 (2019), Published by the American Physical Society, pp. 1-22.

J. P. Bonilla Ataides, D. K. Tuckett, S. D. Bartlett, S. T. Flammia, and B. J. Brown, "The XZZX surface code", Nature Communications 12, Article 2172 (2021), pp. 1-12.

A. S. Darmawan, B. J. Brown, A. L. Grimsmo, D. K. Tuckett, and S. Puri, "Practical quantum error correction with the XZZX code and Kerr-cat qubits", arXiv e-prints (2021), 2104.09539 [quant-ph], pp. 1-21.

O. Higgott and N. P. Breuckmann, "Subsystem codes with high thresholds by gauge fixing and reduced qubit overhead", Phys. Rev. X 11, 031039 (2021), Published by the American Physical Society, pp. 1-30.

N. P. Breuckmann, C. Vuillot, E. Campbell, A. Krishna, and B. M. Terhal, "Hyperbolic and semi-hyperbolic surface codes for quantum storage", Quantum Science and Technology vol. 2, No. 3, 035007 (2017), arXiv:1703.00590 [quant-ph], pp. 1-29.

J. Conrad, C. Chamberland, N. P. Breuckmann, and B. M. Terhal, "The small stellated dodecahedron code and friends", Philiosophical Transaction A. Soc. A. 376, Mar. 23, 2017 (2018), https://doi.org/10.1098/rsta.2017.0323, pp. 1-19.

E. T. Campbell, Early fault-tolerant simulations of the Hubbard model, arXiv, 2012.09238 (2020), arXiv:2012.09238 [quant-ph], pp. 1-15.

D. Litinski, Magic State Distillation: "Not as Costly as You Think", Quantum, vol. 3, p. 205 (2019), arXiv: 1905.06903v3 [quant-ph], pp. 1-22.

U.S. Appl. No. 17/545,895, filed Dec. 8, 2021, Christopher Chamberland, et al.

U.S. Appl. No. 17/545,906, filed Dec. 8, 2021, Christopher Chamberland, et al.

U.S. Appl. No. 17/545,914, filed Dec. 8, 2021, Christopher Chamberland, et al.

U.S. Appl. No. 17/545,921, filed Dec. 8, 2021, Christopher Chamberland, et al.

E. Dennis, A. Kitaev, A. Landahl, and J. Preskill, "Topological quantum memory," Journal of Mathematical Physics 43, 4452 (2002), arXiv Preprint: arXiv:quant-ph/0110143, pp. 1-39.

T. J. Yoder, R. Takagi, and I. L. Chuang, "Universal fault-tolerant gates on concatenated stabilizer codes," Phys. Rev. X 6, 031039 (2016 Published by the American Physical Society), pp. 1-23.

R. Raussendorf, J. Harrington, and K. Goyal, "A fault-tolerant one-way quantum computer," Annals of Physics vol. 321, Issue 9, pp. 2242-2270 (2006), arXiv:quant-ph/0510135, pp. 1-26.

C. Chamberland and E. T. Campbell, "Universal quantum computing with twist-free and temporally encoded lattice surgery," arXiv e-prints (2021), arXiv:2109.02746, pp. 1-23.

J. Hubbard, "Electron correlations in narrow energy bands," Proceedings of the Royal Society A, A276238{257 (1963).

T. Tansuwannont and D. Leung, "Fault-tolerant quantum error correction using error weight parities," Phys. Rev. A 104, 042410 (2021), arXiv:2006.03068 [quant-ph], pp. 1-13.

P. Prabhu and B. W. Reichardt, "Fault-tolerant syndrome extraction and cat state preparation with fewer qubits," arXiv e-prints, arXiv:2108.02184 (2021), pp. 1-10.

L. Postler, et al., "Demonstration of fault-tolerant universal quantum gate operations," arXiv e-prints, arXiv:2111.12654 (2021), pp. 1-14.

* cited by examiner

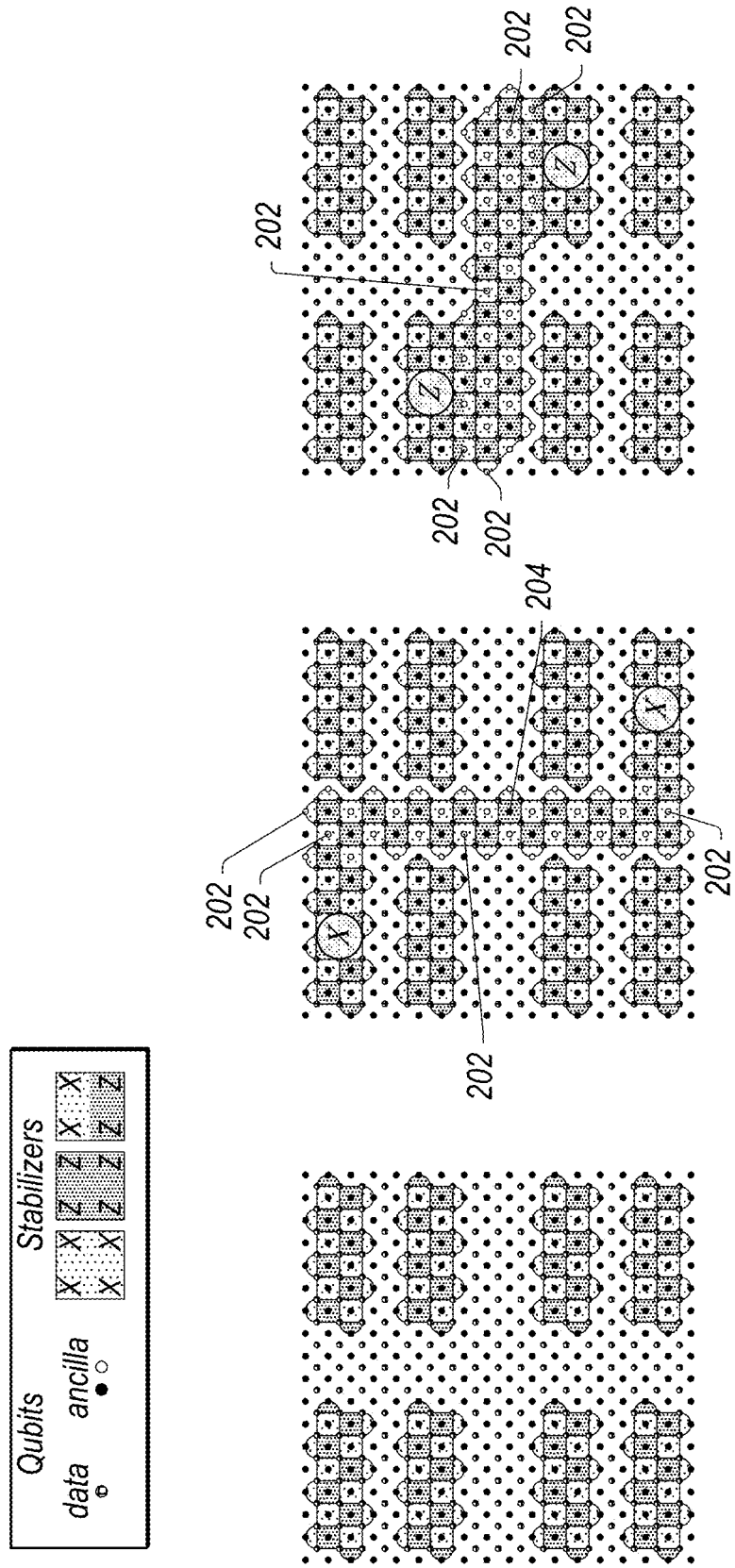

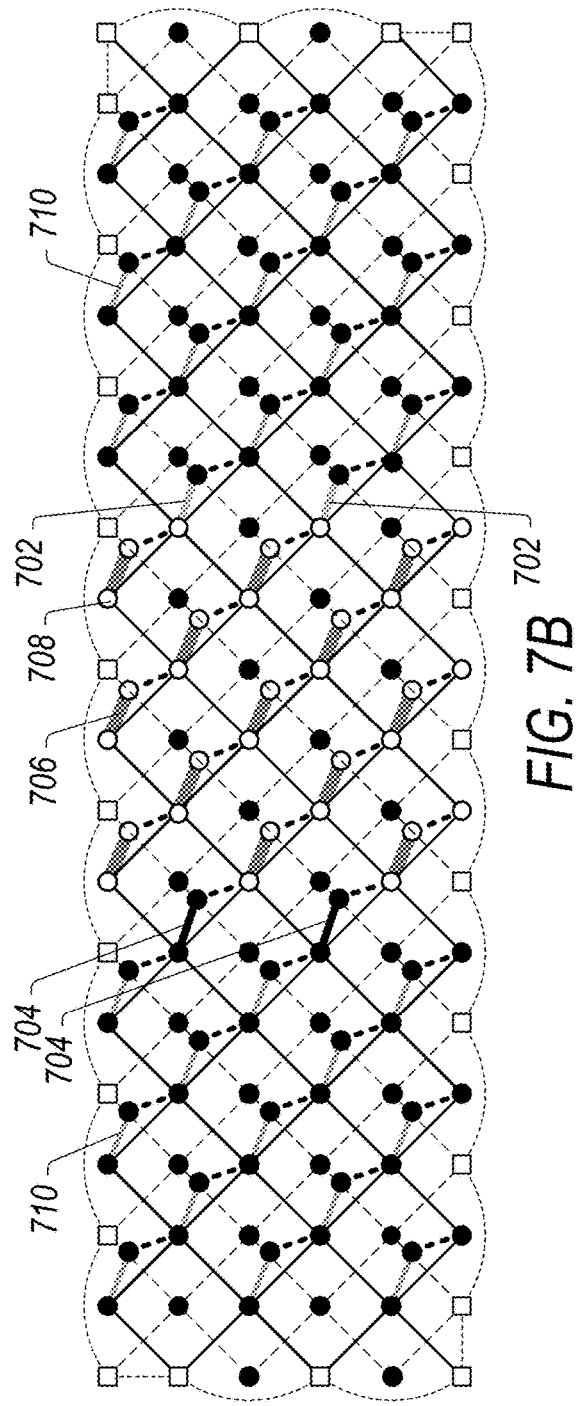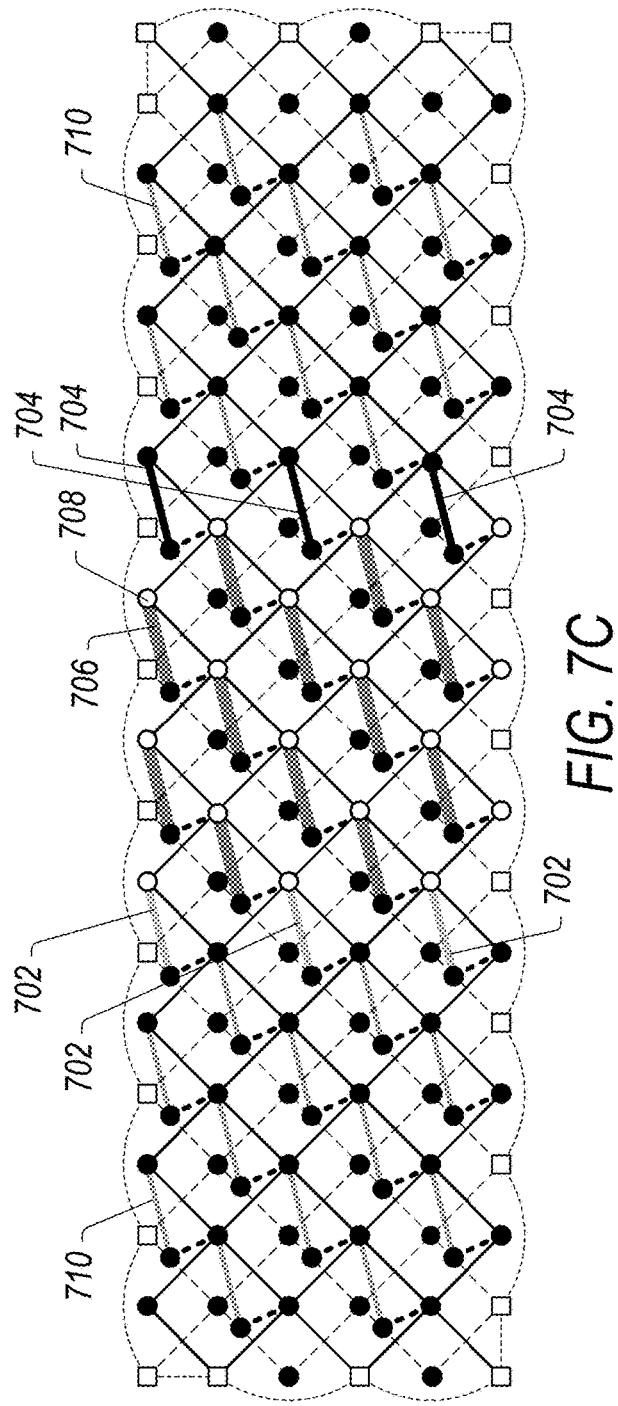

Correct errors, if occurring, for logical data used in the quantum computation, wherein the logical data is stored in data qubits encoded in topological codes, and wherein errors, if occurring, are corrected via an error correcting code applied to repeated syndrome measurements of the topological codes
902

Correct errors, if occurring, in logical multi-qubit Pauli measurements performed in lattice surgery operations for the quantum computation
904

Correcting a wrong parity measurement, if occurring, for a tensor product of Pauli measurements for parity vertices, wherein parity vertices correspond to qubits in a region that connects two or more topological codes upon which a lattice surgery operation is being performed
906

*FIG. 9*

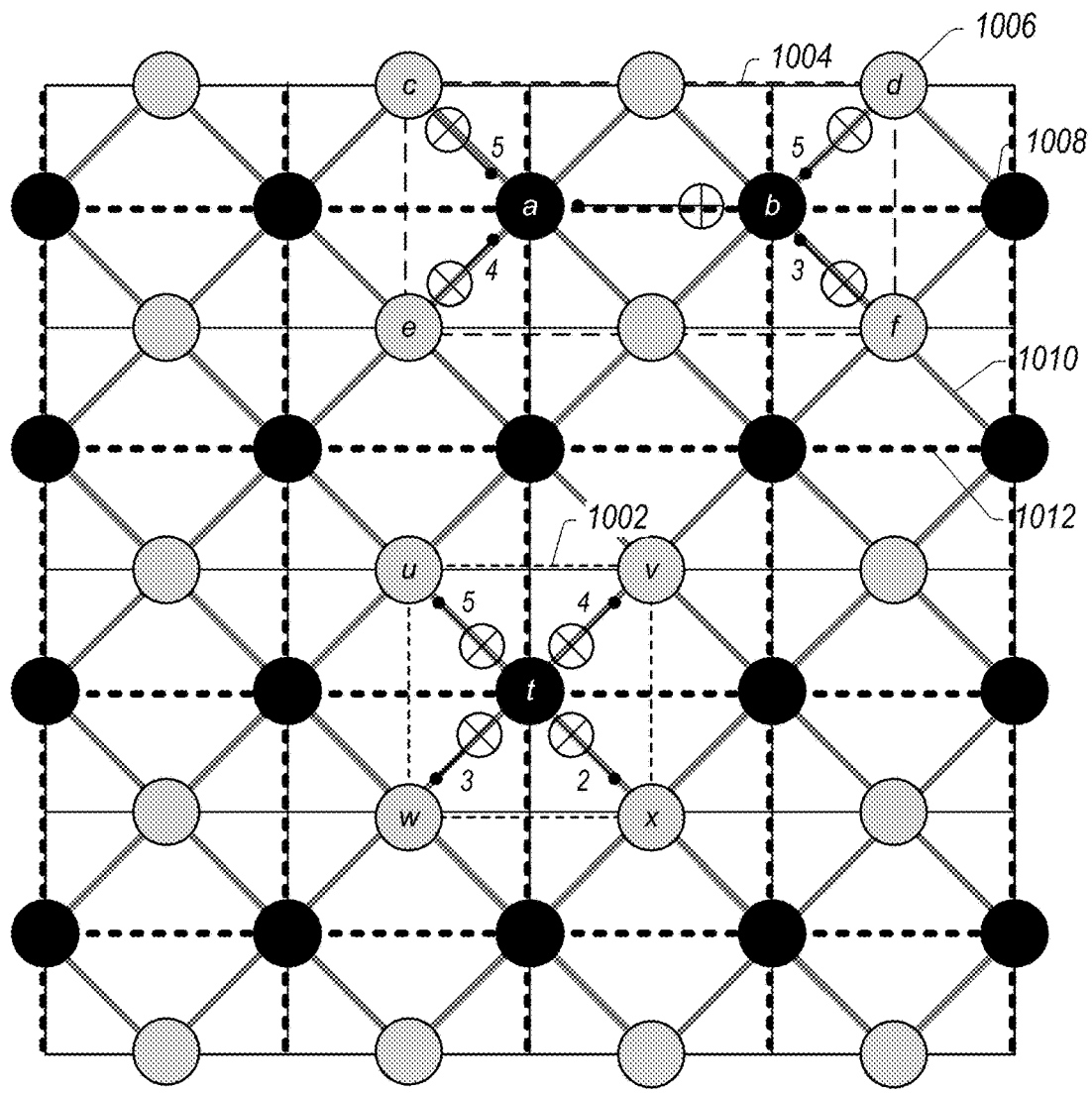
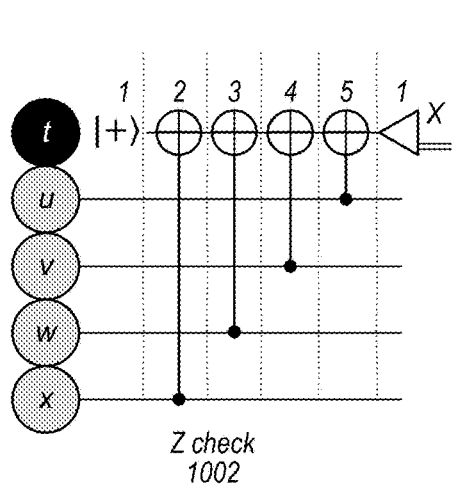
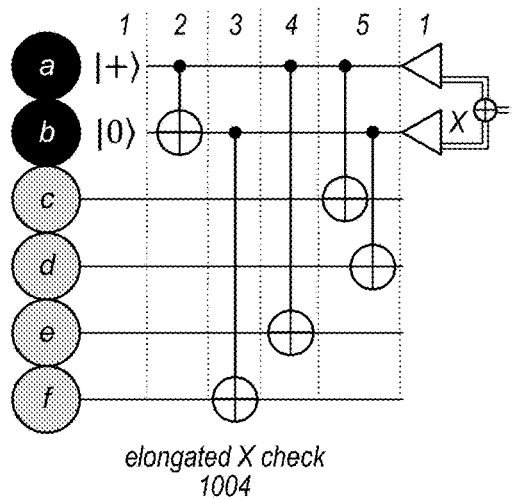
Z check
1002
elongated X check
1004
FIG. 10

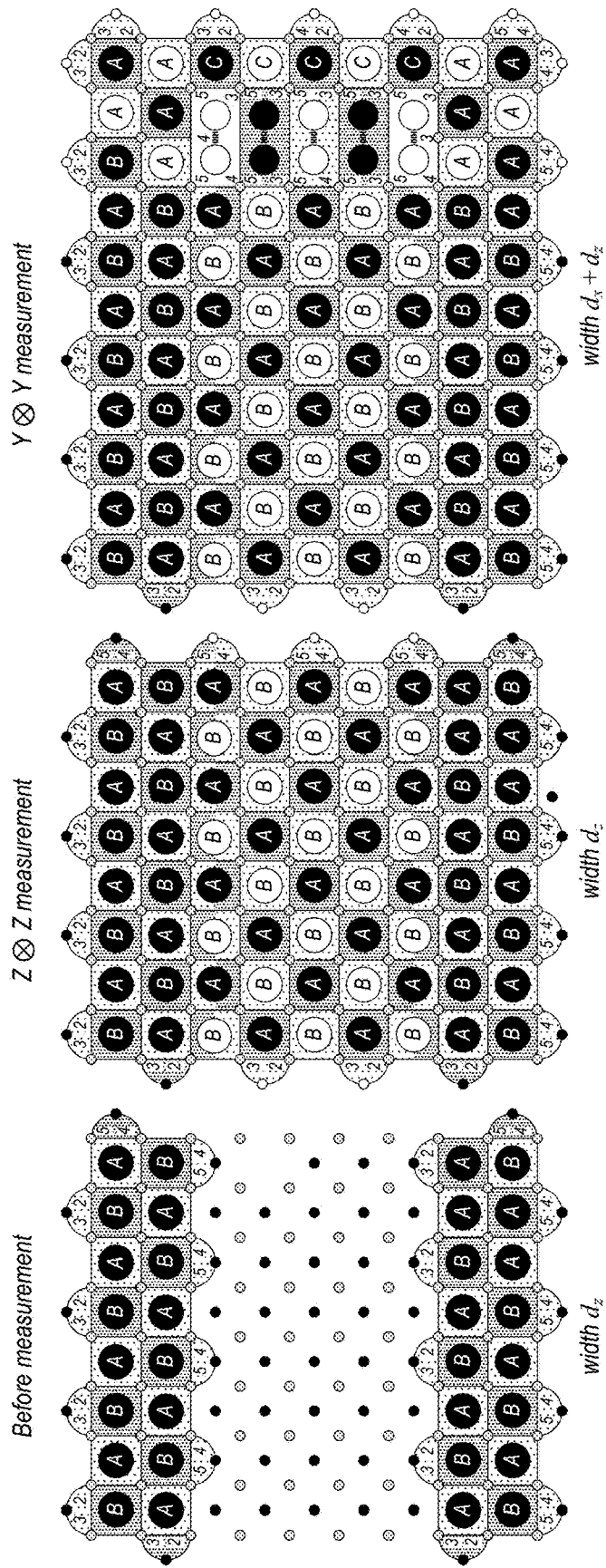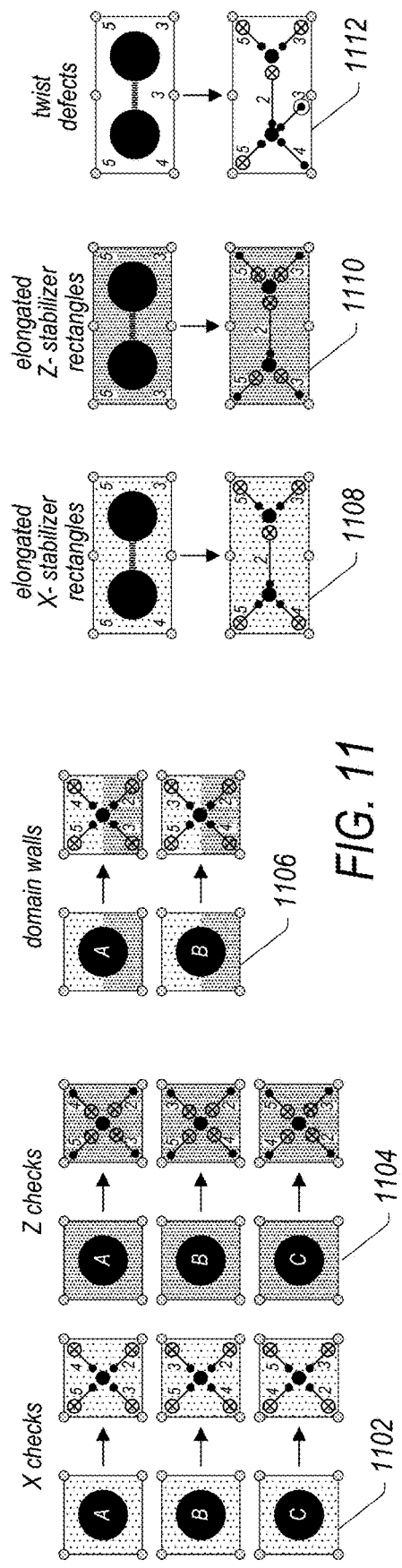
FIG. 11

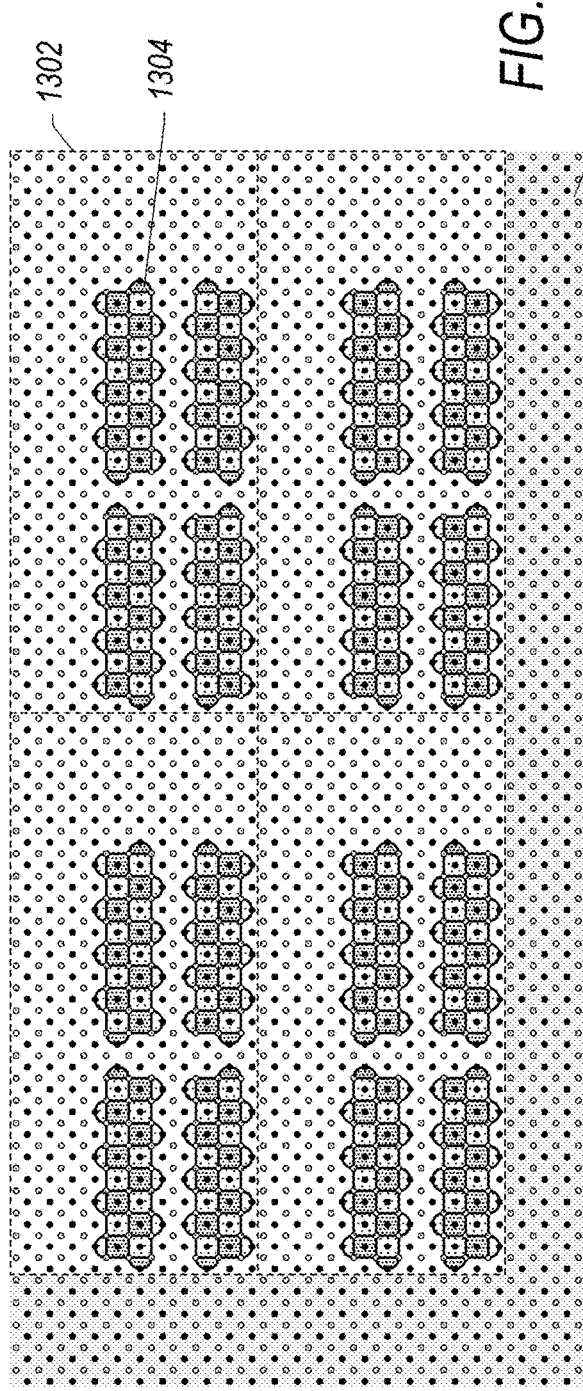
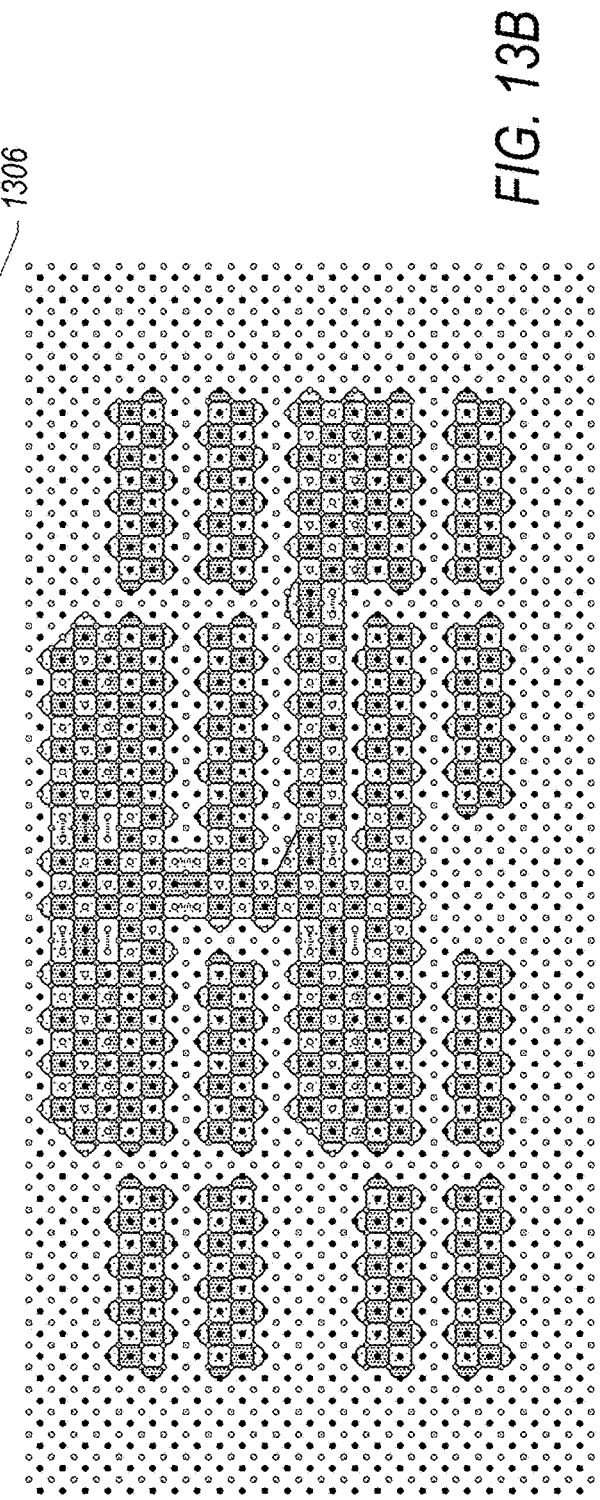
FIG. 13A
FIG. 13B

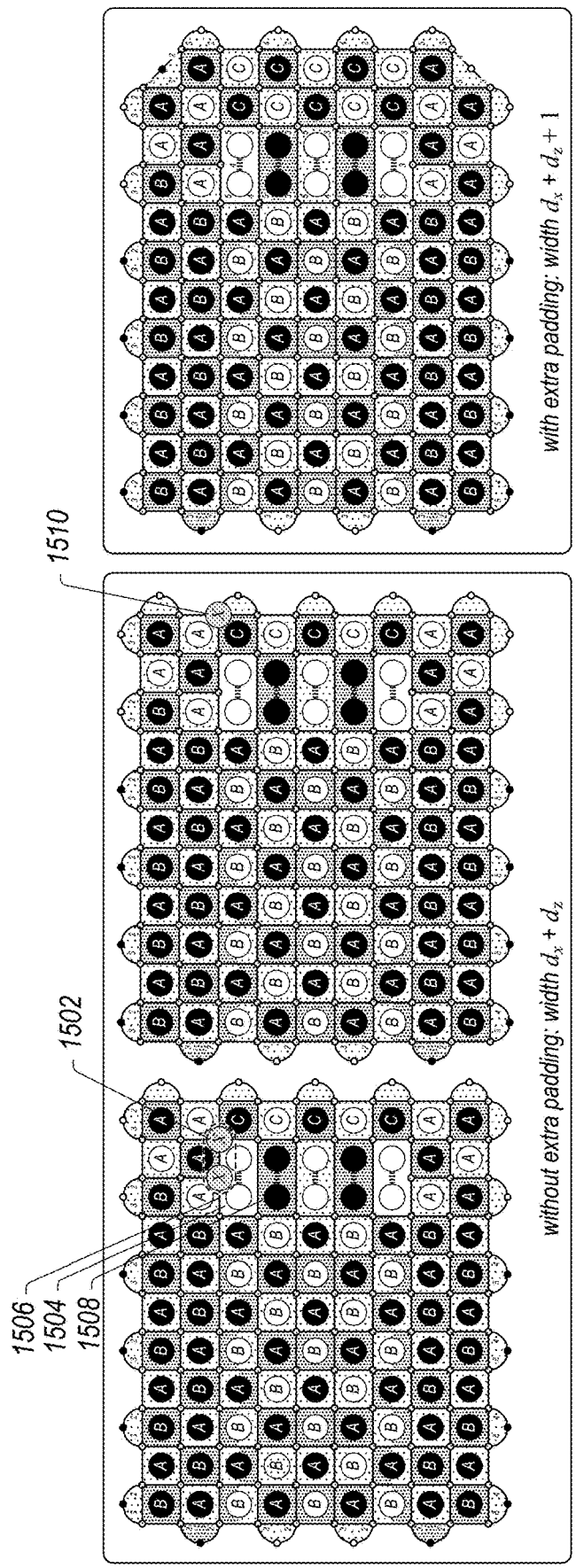

Performing lattice surgery using temporally encoded measurements
2202

Measuring a parallelizable set of Pauli operators associated with a lattice surgery operation, wherein the set comprises Pauli measurements of:
- at least a first Pauli operator;
- at least a second Pauli operator; and
- at least one product of the first and second Pauli operators, wherein there is a linear dependence between the measurements of the first and second Pauli operators

2204

Detecting or correcting an error, if occurring, in the Pauli measurements associated with the lattice surgery operation, wherein the error is detected based on comparing a calculated product of the Pauli measurements of the first and second Pauli operator to the measured product of the first and second Pauli operators
2206

*FIG. 22*

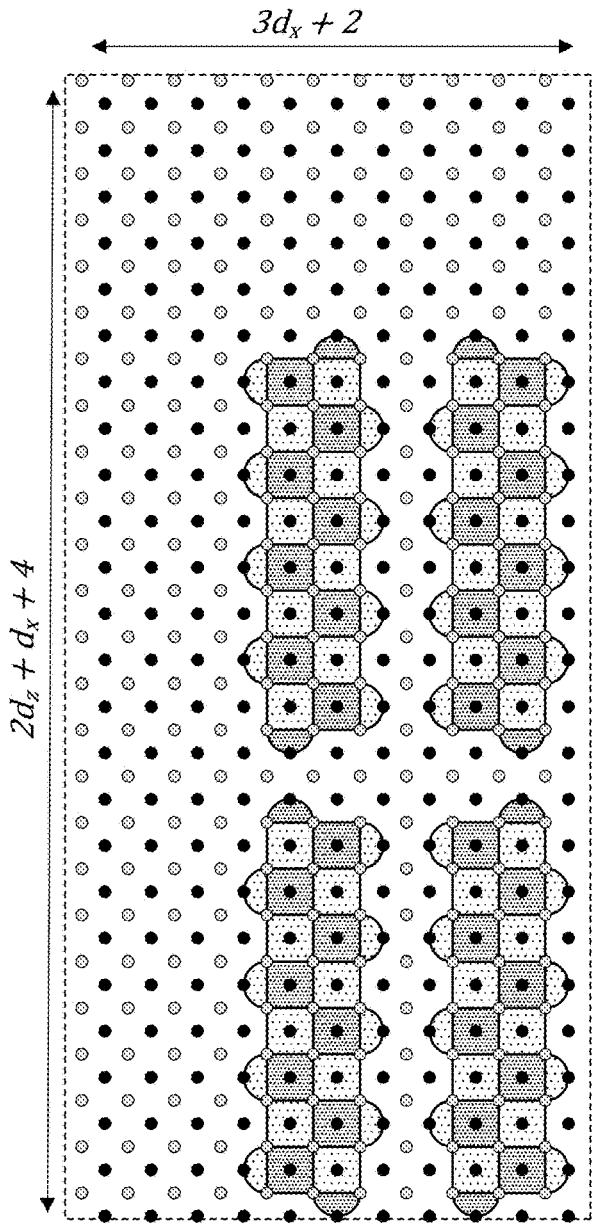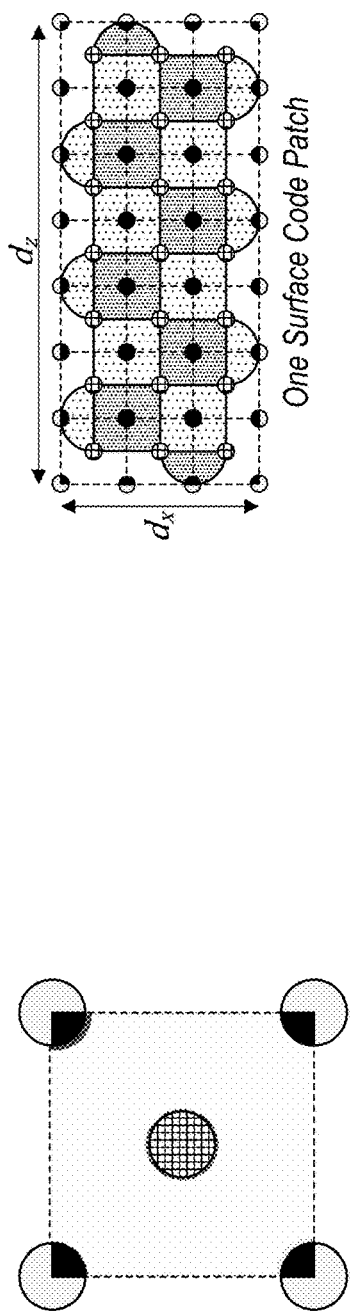
FIG. 23A
FIG. 23B
FIG. 23C

US 12,008,438 B1

LATTICE SURGERY TECHNIQUES USING TWISTS

PRIORITY CLAIM

This application claims benefit of priority to U.S. Provisional Application Ser. No. 63/297,645, entitled "Lattice Surgery Techniques Using Twists," filed Jan. 7, 2022, and which is incorporated herein by reference in its entirety.

BACKGROUND

Quantum computing utilizes the laws of quantum physics to process information. Quantum physics is a theory that describes the behavior of reality at the fundamental level. It is currently the only physical theory that is capable of consistently predicting the behavior of microscopic quantum objects like photons, molecules, atoms, and electrons.

A quantum computer is a device that utilizes quantum mechanics to allow one to write, store, process and read out information encoded in quantum states, e.g., the states of quantum objects. A quantum object is a physical object that behaves according to the laws of quantum physics. The state of a physical object is a description of the object at a given time.

In quantum mechanics, the state of a two-level quantum system, or simply a qubit, is a list of two complex numbers whose squares sum up to one. Each of the two numbers is called an amplitude, or quasi-probability. The square of an amplitude gives a potentially negative probability. Hence, each of the two numbers correspond to the square root that event zero and event one will happen, respectively. A fundamental and counterintuitive difference between a probabilistic bit (e.g., a traditional zero or one bit) and the qubit is that a probabilistic bit represents a lack of information about a two-level classical system, while a qubit contains maximal information about a two-level quantum system.

Quantum computers are based on such quantum bits (qubits), which may experience the phenomena of "superposition" and "entanglement." Superposition allows a quantum system to be in multiple states at the same time. For example, whereas a classical computer is based on bits that are either zero or one, a qubit may be both zero and one at the same time, with different probabilities assigned to zero and one. Entanglement is a strong correlation between quantum particles, such that the quantum particles are inextricably linked in unison even if separated by great distances.

A quantum algorithm is a reversible transformation acting on qubits in a desired and controlled way, followed by a measurement on one or multiple qubits. For example, if a system has two qubits, a transformation may modify four numbers; with three qubits this becomes eight numbers, and so on. As such, a quantum algorithm acts on a list of numbers exponentially large as dictated by the number of qubits. To implement a transform, the transform may be decomposed into small operations acting on a single qubit, or a set of qubits, as an example. Such small operations may be called quantum gates and the arrangement of the gates to implement a transformation may form a quantum circuit.

There are different types of qubits that may be used in quantum computers, each having different advantages and disadvantages. For example, some quantum computers may include qubits built from superconductors, trapped ions, semiconductors, photonics, etc. Each may experience different levels of interference, errors and decoherence. Also, some may be more useful for generating particular types of quantum circuits or quantum algorithms, while others may be more useful for generating other types of quantum circuits or quantum algorithms.

For some types of quantum computations, such as fault tolerant computation of large-scale quantum algorithms, overhead costs for performing such quantum computations may be high. For example, for types of quantum gates that are not naturally fault tolerant, the quantum gates may be encoded in error correcting code, such as a surface code. However, this may add to the overhead number of qubits required to implement the large-scale quantum algorithms. Also, performing successive quantum gates, measurement of quantum circuits, etc. may introduce probabilities of errors in the quantum circuits and/or measured results of the quantum circuits. In some situations, error rates for a quantum algorithm may be reduced by increasing a number of times measurements are repeated when executing the quantum algorithm. However, this may increase a run-time for executing the quantum algorithm. Thus, overhead may be evaluated as a space-time cost that takes into account both run-times and qubit costs to achieve results having at least a threshold level of certainty (e.g., probability of error less than a threshold amount).

BRIEF DESCRIPTION OF THE DRAWINGS

FIG. 2A illustrates an example quantum computing region comprising eight logical qubits encoded in the surface code, wherein the surface code patches comprise physical and ancilla qubits and are included in stabilizer plaquettes, and wherein routing space is included in the computing region between the surface code patches, according to some embodiments.

FIG. 2B illustrates a lattice surgery operation that allows a logical X⊗X operator to be measured, wherein qubits in the routing space are used to perform the lattice surgery operation, according to some embodiments.

FIG. 2C illustrates another lattice surgery operation that allows a logical Z⊗Z operator to be measured, wherein qubits in the routing space are used to perform the lattice surgery operation, according to some embodiments.

FIG. 7B illustrates a first type of space-time correlated edges for X-stabilizers included in the surface code matching graph for the two surface code patches shown in FIG. 4A, according to some embodiments.

FIG. 7C illustrates a second type of space-time correlated edges for X-stabilizers included in the surface code matching graph for the two surface code patches shown in FIG. 4A, according to some embodiments.

FIG. 9 is a flowchart illustrating a process for correcting errors for quantum computation comprising lattice surgery, according to some embodiments.

FIG. 10 is a connectivity diagram illustrating connection between data qubits (light grey vertices) and ancilla qubits (black vertices). FIG. 10 further illustrates quantum circuits for performing a Z-check and an elongated X-check with the illustrated connectivity, according to some embodiments.

FIG. 11 illustrates example gate schedules implemented for surface code patches upon which lattice surgery is being performed, wherein the gate schedules are for performing X-checks and Z-checks, along with gate schedules for performing stabilizer measurements of domain walls, elongated rectangles, and twist defects, according to some embodiments.

FIG. 13A illustrates an example layout of surface code patches and a routing space for four unit cells that may be included in a quantum computing core region that performs lattice surgery using twists, as described herein, according to some embodiments.

FIG. 13B illustrates the surface code patches, wherein the surface code patches have been merged, wherein the merged patch is obtained by measuring a logical Y⊗Y⊗X⊗Y⊗X⊗Z Pauli operator, according to some embodiments.

FIGS. 15A-15C illustrate examples of merged surface code patches after performing a Y⊗Y measurement via lattice surgery, according to some embodiments. More specifically, FIG. 15C illustrates a configuration with extra padding that allows leading order failures to have distinct syndromes to avoid a logical fault being obtained due to different types of failures having a same syndrome, according to some embodiments.

FIG. 22 is a flowchart illustrating a process of performing lattice surgery using temporally encoded measurements (e.g., temporally encoded lattice surgery or TELS), according to some embodiments.

FIG. 23A illustrates an example tile used in the proposed core-cache architecture, according to some embodiments.

FIG. 23B illustrates an example surface code patch that may be used in a unit cell, according to some embodiments.

FIG. 23C illustrates an example unit cell that may be used in a core computing region of a quantum computer, according to some embodiments.

Figure 1A:
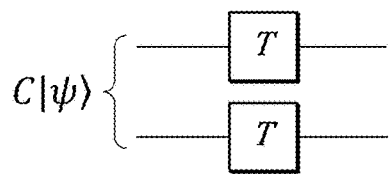
FIG. 1A illustrates an example quantum circuit comprising two T gates, wherein the example quantum circuit may be implemented using Pauli based computation, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

The present disclosure relates to methods and apparatus for implementing lattice surgery, including techniques for decoding time-like errors occurring during lattice surgery, techniques for performing lattice surgery using twists (e.g. an explicit lattice surgery protocol for performing lattice surgery using twists and its connectivity layout, as well as gate schedules for measuring stabilizers for twist defects), temporal encoding for fast lattice surgery, a more efficient quantum computer layout in the presence of biased noise where data qubits are encoded in thin-stripped surface codes, and a scheme that utilizes lattice surgery in the proposed layout to swap data between a cache region and a core computing region.

It is noted that the proposed core-cache layout has lower routing overhead costs in the presence of biased noise as compared to previous layouts.

Fault-tolerant quantum computing architectures enable the protection of logical qubits from errors by encoding them in error correcting codes, while simultaneously allowing for gates to be performed on such qubits. Importantly, failures arising during the implementation of logical gates may not result in uncorrectable errors as long as the total number of such failures remains below a certain fraction of the code distance. For example, if the errors only occur in a portion of the code, decoding techniques can be used to determine if an error has occurred and correct for it, such that the final logical result is correct. In most practical settings, quantum logic gates may be split into two categories. The first corresponds to Clifford operations (such as Pauli I, X, Y, and Z gates, as well as Hadamard (H) and S gates, as well as CNOT gates, as a few examples), which can be efficiently simulated by classical computers, and the second corresponds to non-Clifford operations which cannot be efficiently simulated using purely classical resources. For example, a T gate or Toffoli gate are examples of non-Clifford operations that cannot be efficiently simulated using purely classical resources. Early proposals for fault-tolerant quantum computation used transversal gates to perform logical Clifford operations. Later, it was shown that by braiding defects in a surface code, some Clifford operators could be realized fault-tolerantly in a 2D local architecture with a high-threshold level of confidence (e.g., low error rate). In some techniques, lattice surgery is used to replace the braiding approach due to its ability to retain locality constraints and high thresholds (features which are required by many hardware architectures). Additionally, lattice surgery offers a much lower resource cost (e.g., qubits) as compared to these other techniques. In such approaches, non-Clifford gates may be performed by teleportation of magic states prepared by a distillation procedure.

In some embodiments, a decoder is used that is compatible with lattice surgery. For example, the decoder is capable of correcting both space-like and time-like errors that occur during lattice surgery protocols, such as errors occurring within a surface code patch and errors occurring during multi-qubit Pauli measurements between surface code patches which give the wrong parity of the measurement outcome.

In some embodiments, lattice surgery is performed using a twist-defect for measuring arbitrary Pauli operators using the surface code. This disclosure provides detailed configurations for the extra circuit and gate scheduling complexities that arise when using twists, in addition to gate schedules for the high-weight stabilizer measurements required by twists.

In some embodiments, a new technique called temporal encoding of lattice surgery, which is further described below, is used to reduce algorithm runtimes. In some embodiments, temporal encoding of lattice surgery uses fast lattice surgery operations (which are inevitably noisier), wherein any errors arising from extra noise due to the fast lattice surgery operations are corrected by encoding a sequence of measured Pauli operators from the fast lattice surgery operations using a classical error correcting code. In the regime of interest to quantum algorithms of a practical scale, a 2.2× runtime improvement is achieved over previous lattice surgery techniques. Also, such an encoding does not lead to additional qubit overhead costs since it occurs in the time domain, and so the overall spacetime complexity of performing lattice surgery is improved.

In some embodiments, a core-cache region architecture is used for a quantum computer, wherein a core computing region comprises surface code patches and routing spaces, a cache region comprises surface code patches with less routing space between the surface code patches than in used in the core computing region, and lattice surgery is used to swap logical data between surface code patches of the core computing region and surface code patches of the cache.

Universal Quantum Computing Via Lattice Surgery

In some embodiments, Pauli-based computation (PBC) may be used. In PBC, a reserve of magic states, which may be provided by a magic state factory, are provided and computations are driven by performing a sequence of multi-qubit Pauli measurements $\{P_1, P_2, \ldots, P\mu\}$ where later Pauli measurements depend on measurement outcomes of earlier Pauli measurements. In this notation, $P_2$ does not denote a specific Pauli, but one conditional on the outcome of $P_1$. This conditionality occurs because (in the circuit picture) each Pauli measurement would be followed by a conditional Clifford operation. However, in a PBC, these conditional Cliffords are conjugated to the end of the computation, thereby changing subsequent Pauli measurements. Since in a PBC all Cliffords are performed "in software", the algorithm runtime is independent of the Clifford complexity.

Figure 1B:
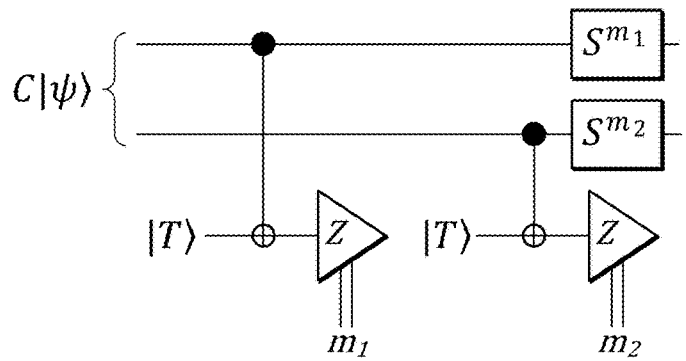
FIG. 1B illustrates an example implementation of the quantum circuit comprising two T gates, wherein gate teleportation with |T⟩-type magic states, CNOT gates, Pauli Z measurements, and conditional S gates are used, according to some embodiments.
Figure 1C:
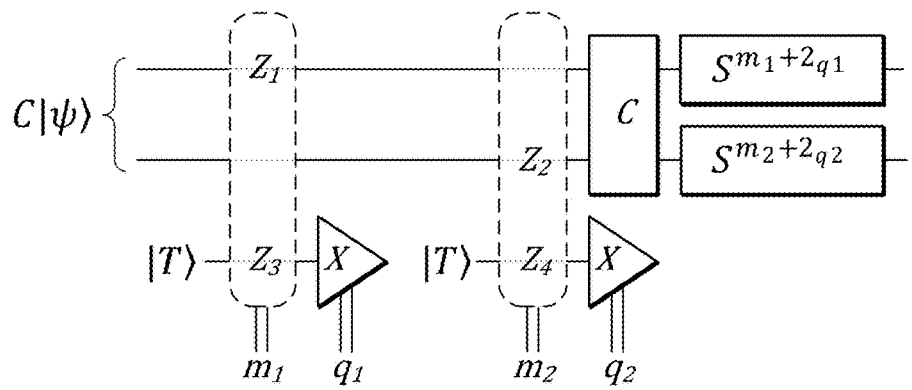
FIG. 1C illustrates another example implementation of the quantum circuit comprising two T gates, wherein teleportation with CNOT gates, as shown in FIG. 1B, are replaced with two-qubit Pauli measurements, according to some embodiments.
Figure 1D:
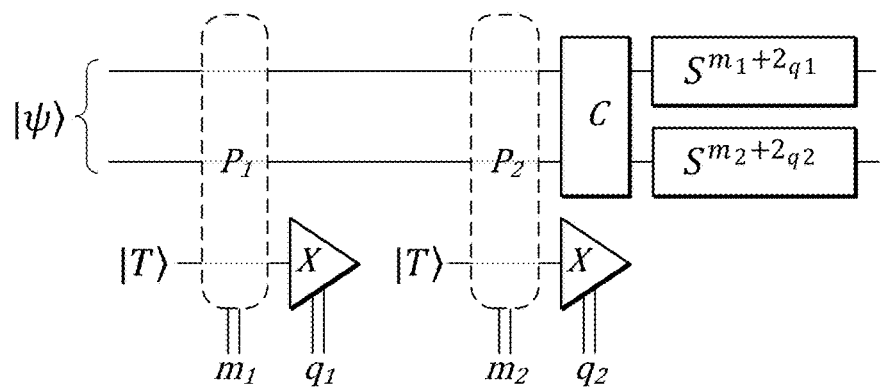
FIG. 1D illustrates yet another example implementation of the quantum circuit comprising two T gates, wherein the Clifford frame (C) (arising from Clifford corrections which took place in earlier parts of the algorithm) has been conjugated through the end of the circuit, wherein the Clifford correction is applied after the Pauli measurements, according to some embodiments. For example, $P_1 = CZ_1Z_3C\dagger$; and $P_2 = CZ_2Z_4C\dagger$ (which commute) and the output state carries Clifford frame correction $C' = S_1^{m_1+2q_1} S_2^{m_2+2q_2} C$.

For example, FIG. 1A illustrates an example circuit diagram for performing two T gates, wherein an input state $|\psi\rangle$ carries a Clifford frame correction C. In FIG. 1B an equivalent circuit as that shown in FIG. 1A is shown where gate teleportation is used such that $|T\rangle := (|0\rangle + e^{i\pi/2}|1\rangle)/\sqrt{2}$ magic states. In FIG. 1B CNOT gates are applied to the magic state taking the input state $C|\psi\rangle$ as a control. Pauli Z measurements are then performed on the magic states that have been operated on by the CNOT gates with Pauli Z measurement outcomes $m_1$ and $m_2$. Classical conditioned Clifford gates are then applied to the input state $C|\psi\rangle$ based on the measurement outcomes $m_1$ and $m_2$, where the classical conditioned Clifford gates are S gates, where $S=|0\rangle\langle 0|+i|1\rangle\langle 1|$. Whereas in FIG. 1B there were two sets of CNOT gates followed by single qubit Pauli Z measurements, using Pauli based computation in FIG. 1C, these portions of the circuit are replaced by respective two qubit Pauli Z measurements, which yield measurement outcomes $m_1$ and $m_2$, wherein additional Pauli X measurements are then performed on the magic states that have been used in the two qubit Pauli Z measurements, with Pauli X measurements yielding outcomes $q_1$ and $q_2$, which are further used in the classical conditioned S gates. In FIG. 1D the Clifford frame correction that was carried with the input state $|\psi\rangle$ in the previous figures, is conjugated through the circuit such that the multi-qubit Pauli measurements are now $P_1 = CZ_1Z_3C^{\dagger}$ and $P_2 = CZ_2Z_4C^{\dagger}$ (which commute). The output state of the multi-qubit Pauli measurements now carries a Clifford frame correction $C' = S_1^{m_1+2q_1} S_2^{m_2+2q_2} C$.

As discussed in more detail below, in some embodiments, multi-qubit Pauli measurements can be performed using lattice surgery. However, even if Pauli operators commute, depending on quantum computing design, it may not be possible to measure such Pauli operators simultaneously, for example due to limited routing space in the quantum computer. Thus, in such situations, Pauli operators of a multi-qubit Pauli measurement may be measured sequentially (instead of simultaneously). This is referred to herein as sequential Pauli based computation or seqPBC. In sequential Pauli based computation, a total time required to execute all Pauli measurements (measured at least in part sequentially) is proportional to a number of measurement rounds performed for each Pauli measurement plus a step for resetting the qubits between lattice surgery operations and a total number of sequential Pauli measurements being measured. For example, $T_{seqPBC} = (d_m+1)\mu$, where $d_m$ corresponds to the number of rounds of stabilizer measurements performed during a lattice surgery operation, and μ is the number of sequential Pauli operators being measured. The proportionality factor will depend on the time required to measure the surface code stabilizers during one syndrome measurement round.

There are several sources of contributions to μ, the number of Pauli measurements. At a high level, a quantum algorithm may be thought of as comprising of a series of unitaries with some Pauli measurements for readout, and $N_A$ may denote the number of such algorithmic readout measurements. However, as shown in FIGS. 1A-1D, non-Clifford unitaries are performed by Pauli measurements and reserves of magic states. If an algorithm has $N_T$ T-gates, then additional $N_T$ Pauli measurements are also needed. For example, in FIG. 1D multi-qubit Pauli measurements $P_1$ and $P_2$ are used to replace the two T gates shown in FIG. 1A. Note that the Clifford plus T gate set is universal. However, in some embodiments, it may be advantageous to use an overcomplete gate set such as Clifford plus T gates and further including Toffoli gates.

While Toffoli gates can be synthesized for example using 4 T gates, it is often more efficient to directly prepare Toffoli magic states. Furthermore, it may only take 3 Pauli measurements to teleport a Toffoli state rather than the 4 measurements needed to teleport T states and then synthesize a Toffoli. As such, if an algorithm can be prepared with $N_{TOF}$ Toffoli gates and $N_T$ T-gates, then the number of Pauli measurements needed to perform these teleportations is given by $N_T+3N_{TOF}$ Pauli measurements.

A quantum computing architecture also requires time to produce the T magic states (in addition to transporting the T magic states or Toffoli magic states). If an architecture produces all the magic states in a shorter amount of time than what is required to transport the magic states, then the architecture may be said to be Clifford bottle necked, e.g., $T_{magic}<T_{PBC}$. On the other hand, if the amount of time required to generate the magic states is greater than or equal to the amount of time required to transport the magic states, the quantum computer architecture can be said to be magic-state bottle necked, e.g., $T_{magic} \geq T_{PBC}$. Thus, for a given quantum computing architecture, depending on which way it is bottlenecked, the run time of a given algorithm will be given by the max value of $\{T_{magic}, T_{PBC}\}$.

For quantum hardware architectures where physical qubits can only interact with one another locally, lattice surgery is an efficient protocol that can be used to measure arbitrary multi-qubit Pauli operators. For example, in some embodiments, logical qubits are encoded in a topological code arranged in a two-dimensional layout (for example logical qubits may be encoded in the rotated surface code). The layout contains extra routing space between the surface code patches such that the routing space comprises of additional qubits. By applying the appropriate gauge-fixing in the routing space, which involves measuring surface code stabilizers, the surface code patches involved in a Pauli measurement are merged into one larger surface code patch. After gauge fixing, the parity of the measurement outcome of the multi-qubit Pauli operator being measured is obtained by taking a product of the appropriate stabilizers in the routing space (e.g., the qubits that connect the two surface code patches). Lastly, the surface code patches for each logical qubit can be detached from the merged patch by measuring the qubits in the routing space in the appropriate basis. An illustration of X⊗X and Z⊗Z Pauli measurements is shown in FIG. 2B and FIG. 2C for surface code patches, such as shown in FIG. 2A. Note that the ancilla qubits in the routing space encoding the parity of the multi-qubit Pauli being measured are shown with white vertices. These white vertices 202 correspond to stabilizers that are measured to compute the parities of the X⊗X and Z⊗Z Pauli measurements. Products of the surface code stabilizers marked by white vertices 202 give the parity of the X⊗X and Z⊗Z Pauli measurements.

Note that there are other ancilla qubits 204 in the routing space which are not marked by white vertices. These ancillas do not encode the parity of the measurement outcome for the multi-qubit Pauli of interest.

When performing a lattice surgery measurement of a logical Pauli operator, there is some probability that a wrong outcome is obtained. Even with large code distances, the lattice surgery measurement could still fail due to time-like errors occurring during the finite time allowed for lattice surgery. For example, repeatedly measuring a given stabilizer may reduce a probability of a time-like error, but there may be a limited amount of time to repeat such measurements. Note that space-like errors refer to errors which can result in a logical Pauli error on a logical qubits part of an algorithm, whereas time-like errors refer to errors which can result in a wrong parity measurement of a multi-qubit Pauli operator measured via lattice surgery. The probability of time-like errors is exponentially suppressed in the number of rounds $d_m$ for which the stabilizer measurements are repeated during lattice surgery. This exponential suppression will hold until $d_m \gg 0(d_z, d_x)$ when logical Pauli errors become the more dominate mechanism.

For sake of discussion, assume that code distances $d_x$ and $d_z$ are chosen so that even a single logical Z and X error is very unlikely over the course of the whole computation. In such a configuration, time-like errors occur with a probability $\mathbb{P}$ which has a bound of the form:

$$\mathbb{P} \leq La(pb)^{c(d_m+1)}$$

where physical gate, idle, state-preparation, and measurement error probabilities are proportional to p, {a, b, c} which are constants, and L is the area of the patch used for lattice surgery (e.g., the area encompassing the routing qubits used to connect multiple surface code patches). The value of L will vary for different measurements and different layouts, but it will be convenient to think of it as a constant representing the worst case (or average) area of lattice surgery patches.

In general, in order to sequentially perform μ Pauli measurements in the algorithm that fail with probability no more than δ, $d_m$ is chosen to be large enough that $$\delta \geq 1-(1-\mathbb{P})^\mu \approx \mathbb{P}_\mu = \mu La(pb)^{c(d_m+1)}$$

where the approximation holds for low error probabilities, e.g., small $\mathbb{P}$.

Decoding Time-like Errors During Lattice Surgery.

In some embodiments, a decoding protocol for correcting both space-like and time-like errors during lattice surgery is used. In particular, such a protocol protects data qubits (the logical qubits of an algorithm) encoded in surface code patches while at the same time corrects logical multi-qubit Pauli measurement failures which can occur during lattice surgery.

Figure 3:
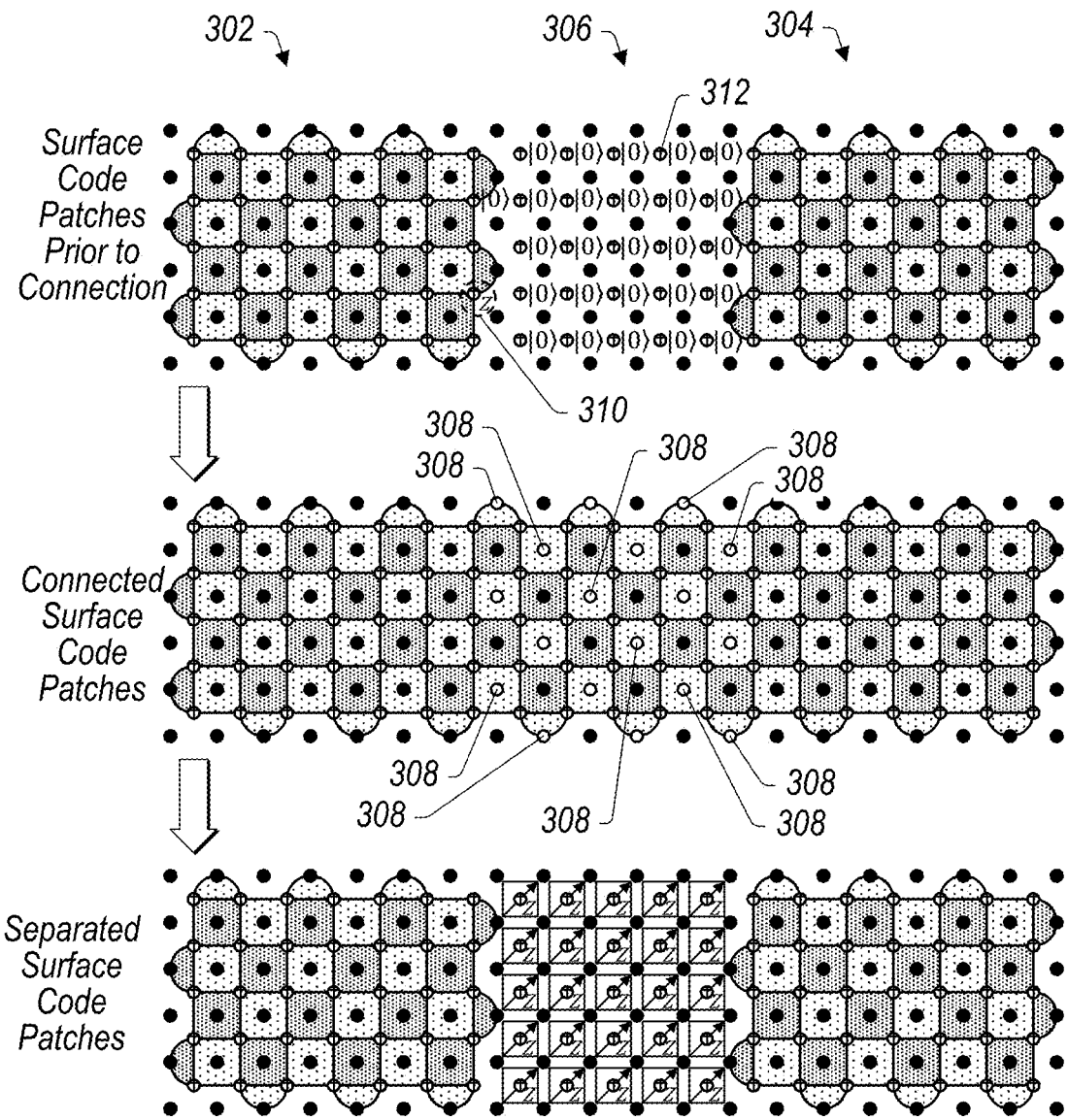
FIG. 3 illustrates an example X⊗X measurement of two surface code patches, wherein routing space qubits are prepared in a |0⟩ state prior to connecting the two surface code patches, and wherein the routing space qubits are measured in a Z basis to split the two surface code patches, wherein stabilizer measurements are repeatedly taken before, during, and after connection of the two surface code patches, according to some embodiments.

For example, FIG. 3 illustrates two surface code patches 302 and 304 separated by a routing space 306. Both surface code patches 302 and 304 have dimensions $d_x=5$ and $d_z=7$. As shown in FIG. 3 data qubits in the routing space 306 are prepared in the |0⟩ state prior to merging the two surface code patches into one surface code patch. In the first round of stabilizer measurements, wherein the surface code patches 302 and 304 are merged into one large surface code patch, the product of all stabilizers marked by white vertices 308, e.g., parity vertices, give the result of an $X \otimes X$ measurement. After measuring the stabilizers for $d_m$ rounds, the surface code patches 302 and 304 are split apart again by measuring the data qubits 308 in the routing region 306 in the Z basis. In the first round of the merge, measurement errors occurring on parity vertices can result in wrong $X \otimes X$ measurement outcomes. Additionally, an odd number of data qubit Z errors along the boundary of the surface code lattices prior to the merge, such as the one circled in the top row of the figure (indicated by 310), can also give the wrong measurement outcome.

Said another way, measuring the surface code stabilizers of the ancillary qubits 308 prepared in the |0⟩ state (where the data qubits 312 are prepared in the |0⟩ state) and taking the products of the stabilizers marked by white vertices gives the measurement outcome of $X \otimes X$. In what follows, white vertices whose product gives the result of a $P_1 \otimes P_2 \otimes \ldots \otimes P_k$ Pauli measurement are referred to as "parity vertices." It can be said that a logical time-like failure occurs if a set of errors result in the wrong parity measurement of $P_1 \otimes P_2 \otimes \ldots \otimes P_k$. Further, it may be assumed that split surface code patches are measured for r rounds before being merged by the Pauli measurement in round r+1. For example, FIG. 4B shows a transition where two separate surface codes 408 and 410 are measured for r rounds, then at round r+1, the surface codes are merged into a larger surface code 406. Also, FIG. 4A shows the merged surface codes 406 being measured for $d_m$ rounds, such that the current round is r+$d_m$, then after measuring the merged surface codes for $d_m$ rounds, at round r+$d_m$+1, the surface codes are separated again into surface codes 402 and 404.

When measuring $P_1 \otimes P_2 \otimes \ldots \otimes P_k$ using lattice surgery, in addition to an odd number of measurement errors during round r+1 resulting in the wrong parity measurement of $P_1 \otimes P_2 \otimes \ldots \otimes P_k$, an odd number of errors along the boundaries of the patches before the merge can also result in the wrong parity measurement. An example is provided in FIG. 3 where a single Z error (310) along the right boundary of the surface patch prior to the merge gives the wrong parity of $X \otimes X$. It is also noted that during round r+1, an odd number data-qubit errors which anti-commute with $P_1 \otimes P_2 \otimes \ldots \otimes P_k$ will also result in the wrong parity measurement of $P_1 \otimes P_2 \otimes \ldots \otimes P_k$.

The above examples show that in order to obtain the correct parity measurement of a $P_1 \otimes P_2 \otimes \ldots \otimes P_k$ operator in the presence of full circuit level noise, one must have a decoding scheme which, while constantly correcting errors on the data qubit patches, also corrects space-like and time-like errors which can flip the parity of the measurement outcome.

Figure 4A:
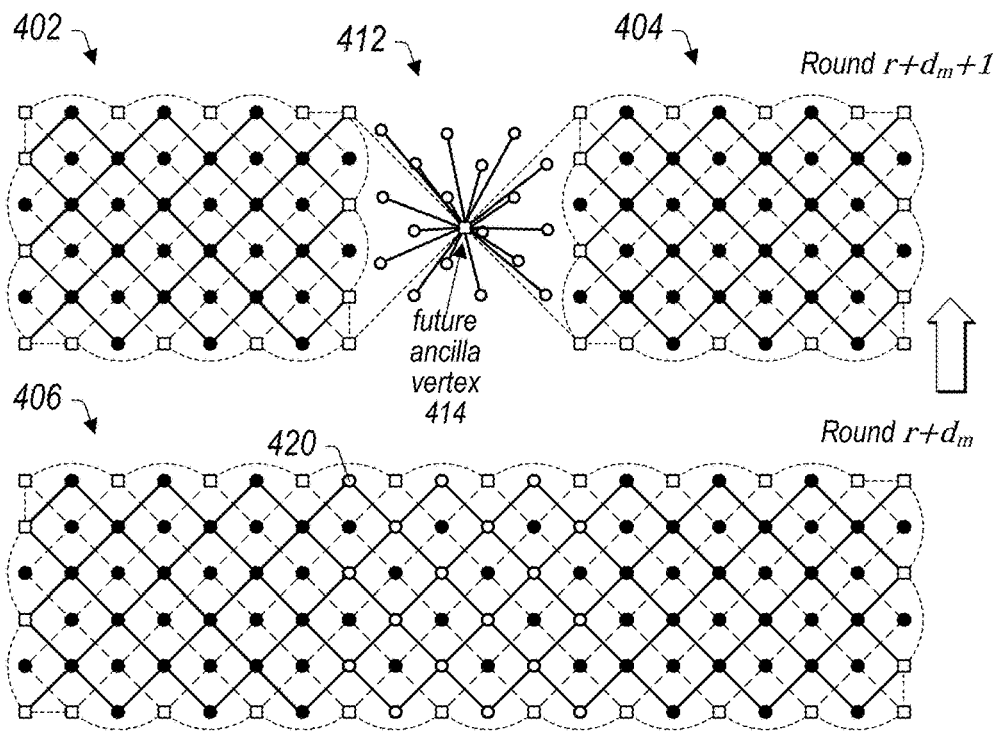
FIG. 4A illustrates a view of two slices of a three-dimensional surface code matching graph used for the two surface code patches shown in FIG. 3 that is used by a decoder to protect both the surface code patches and Pauli measurements performed during lattice surgery against errors. The two slices of the matching graph are for two consecutive syndrome measurement rounds, where in the second round the surface code patches are split. For the syndrome measurement round after the split, a future ancilla vertex is included and connected via future vertical edges to parity vertices which encode the measurement outcome of X⊗X in the first round of the merge, according to some embodiments.
Figure 4B:
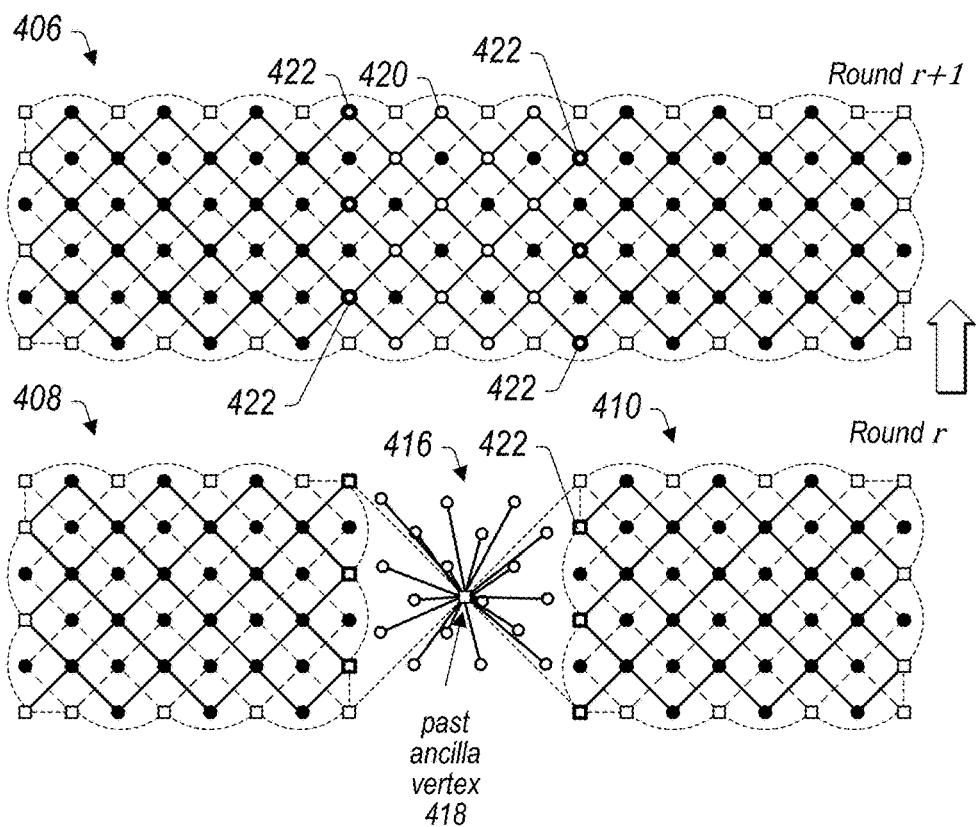
FIG. 4B illustrates a view of a horizontal slice of the surface code matching graph for the two surface code patches shown in FIG. 4A, wherein a past ancilla vertex is included and connected via past vertical edges to parity vertices that store the measurement outcome of X⊗X in the syndrome measurement round r+1, according to some embodiments. It is noted that FIG. 4A and FIG. 4B are arranged in a time ascending order from the bottom of the page to the top of the page. Therefore, the measurement rounds in FIG. 4B take place before the measurement rounds in FIG. 4A.

In order to correct logical time-like failures using a minimum-weight-perfect-matching (MWPM) decoder, time-like boundaries are added to the matching graphs of the surface code as shown in FIGS. 4A and 4B For example, FIG. 4A illustrates time-like boundaries 412 and FIG. 4B illustrates time-like boundaries 416. For example, a future virtual ancilla vertex 414 forms time-like future boundaries 412 with parity vertices of merged surface codes 406. Also, a past virtual ancilla vertex 418 forms time-like boundaries with parity vertices of merged surface codes 406.

In some embodiments, the measurement of an operator $P_1 \otimes P_2 \otimes \ldots \otimes P_k$ is divided into three steps (pre-merge, merge, and post-merge). In the first step, the surface code patches encoding data qubits are measured for r rounds. In round r+1, the patches are merged by measuring the appropriate operators in the ancilla space (see for instance FIG. 3) and the parity of the measurement outcome is given by the product of all parity vertices (e.g., parity vertices 308 in FIG. 3, or parity vertices 420 in FIGS. 4A/4B). The merged patches are measured for $d_m$ rounds, and then in round r+$d_m$+1, the qubits in the ancilla space are measured in the appropriate basis to split the patches back to their original configuration. In round r, extra virtual vertices 418 (past ancilla vertex 418) are added to the matching graphs of the split surface codes with vertical edges 416 which connect to the parity vertices 420 of the merged matching graph in round r+1 (see the edges 416 in FIG. 4B for the $X \otimes X$ measurement). Such vertices may be called past ancilla vertices and the edges 416 incident to the past vertical edges. Similarly, in round r+$d_m$+1 (e.g., right after the split), virtual vertices 414 are added to the matching graphs of the split surface codes 402 and 404 with vertical edges 412 which connect to the parity vertices 420 of the merged matching graph 406 in round r+$d_m$ (see the future edges 412 in FIG. 4A for the $X \otimes X$ measurement). Such a virtual vertex, as vertex 414, may be called a future ancilla vertex 414 and the edges incident to it may be called future vertical edges 412. Importantly, the vertical edges 416 that are incident to the past ancilla vertices 418 and to the parity vertices 420 in the round r+1 have zero weight, while the future vertical edges 412 incident to the parity vertices 420 in the round r+$d_m$ and the future ancilla vertices 414 have non-zero weights. These weights are computed from all time-like failure processes which can result in measurement errors in the round r+$d_m$. When performing MWPM over the full syndrome history, the parity of the measurement outcome of $P_1 \otimes P_2 \otimes \ldots \otimes P_k$ is flipped if there are an odd number of highlighted past vertical edges. In such a setting one would require a sequence of consecutive measurement errors that is greater than $(d_m-1)/2$ in order to cause a time-like logical failure.

It is also noted that FIG. 4B illustrates transition vertices 422 (bolded squares) that prior to the merge are boundary vertices and which transition to parity vertices after the merge. Note that the transition vertices appear in rounds 1 to r, and are transitioned into parity vertices in round r+1.

Note that for round r+1 shown in FIG. 4B, the transition vertices 422 are shown as white circles with bold outlines.

Figure 5:
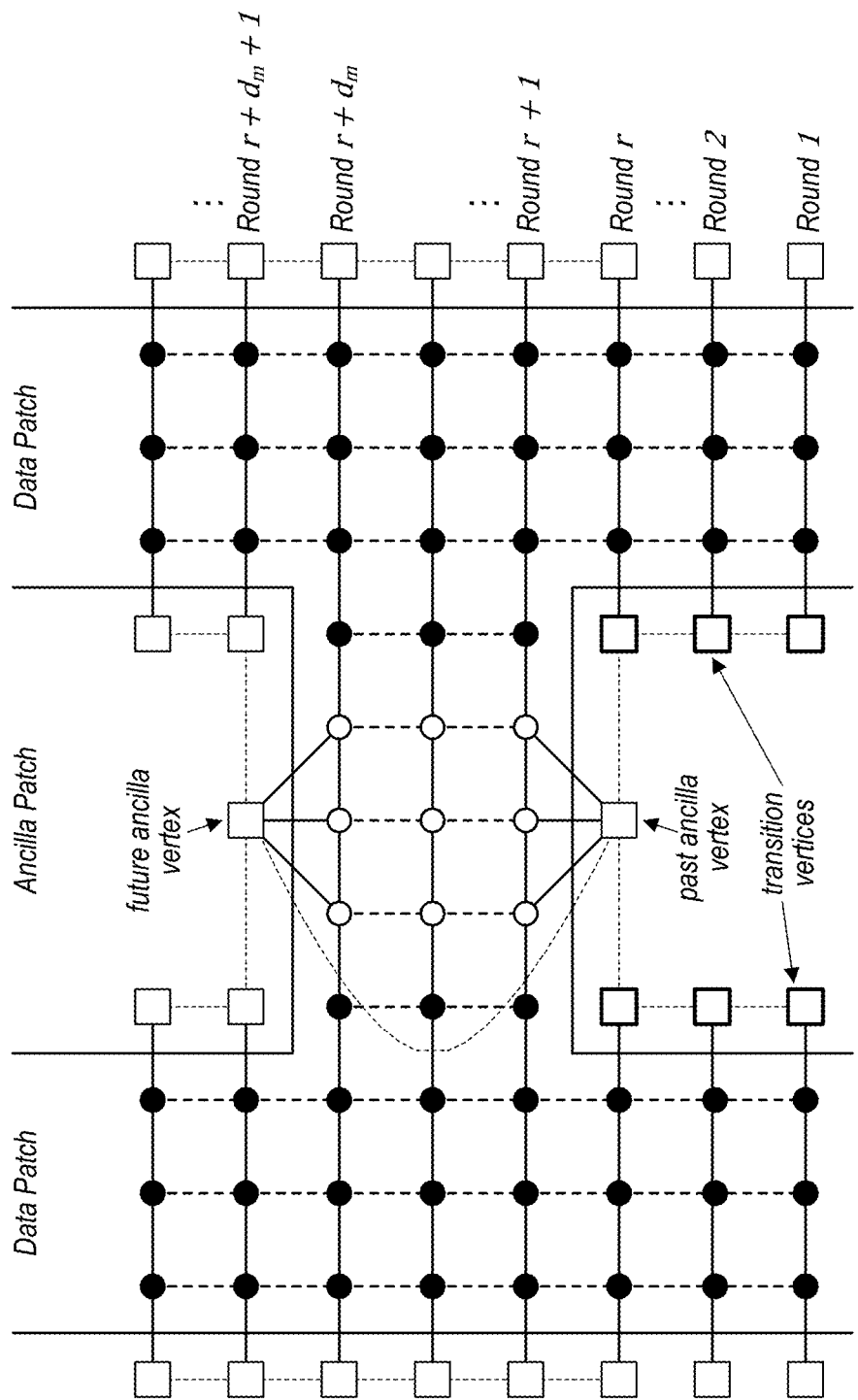
FIG. 5 illustrate a view of a vertical slice of the three-dimensional surface code matching graph for the two surface code patches shown in FIG. 4A, wherein a future ancilla vertex, future vertical edges, a past ancilla vertex, past vertical edges, and a weightless edge connecting the future and past ancilla vertices are included, according to some embodiments.

As mentioned above, a lattice surgery decoder as disclosed herein also corrects logical time-like failures arising from sets of data qubit errors along surface code boundaries of the data qubit patches prior to merging them (recall the example shown in FIG. 3 regarding a Z error 310). The decoder also corrects wrong parity measurements arising from data qubit errors in round r+1 which anti-commute with the Pauli operator being measured by lattice surgery. In constructing such a decoder, note that prior to merging the surface code patches for the $X \otimes X$ measurement, a single Z error along the relevant boundaries would result in a highlighted edge (after implementing MWPM over the full syndrome history) incident to one of the transition vertices 422 shown in FIG. 4B Note that such transition vertices 422 become parity vertices after merging the surface code patches. For the measurement of a general $P_1 \otimes P_2 \otimes \ldots \otimes P_k$ Pauli operator, transition vertices are defined to be vertices in the set $$V_{Bd}^{(s)} = \{v_{b1}^{(s)}, \ldots, v_{bm}^{(s)}\}$$

where $1 \leq s \leq r+1$. When $$s < r+1, \{v_{b1}^{(s)}, \ldots, v_{bm}^{(s)}\}$$

are labels for boundary vertices of the graphs of split surface code patches which become parity vertices in round r+1. If s=r+1, then $V_{Bd}^{(r+1)}$ is the set of the parity vertices which are along the boundaries of the data and ancilla patch regions, as shown in FIG. 5. Based on previous observations discussed above, after implementing MWPM over the full syndrome history of a multi-qubit Pauli measurement via lattice surgery, if there are an odd number of highlighted edges on the data qubit regions which are incident to transition vertices, the parity of the Pauli measurement needs to be flipped. An illustration of a two-dimensional slice of the matching graphs of FIGS. 4A/4B in the time-like direction (which contains a subset of the spacelike edges and vertices) is shown in FIG. 5 In particular, FIG. 5 illustrates transition vertices, the past and future ancilla vertices, in addition to the past and future vertical edges.

Using such edges and vertices, the decoding algorithm for implementing a multi-qubit Pauli measurement via lattice surgery is describe in Algorithm 1, below. Note that space-time correlated edges incident to parity vertices in round r+1 need to be treated with care in order to correct errors up to the full code distance. In particular, a subset of the space-time correlated edges incident to transition vertices can also contribute to $v_2$ (defined in Algorithm 1).

In some embodiments, Algorithm 1 can be simplified. Notice that vertices in $V_{parity}^{(r+1)}$ are not highlighted during MWPM due to the random outcomes of the ancilla patch stabilizers marked by white vertices 420 in round r+1. As such, one could remove all vertices in $V_{parity}^{(r+1)}$ and instead have the past vertical edges incident to the vertices in $V_{parity}^{(r+2)}$. In such a setting, edges incident to $V_{parity}^{(r+1)}$ and $V_{parity}^{(r+2)}$ would be removed, and their weights would be assigned to the past vertical edges.

Figure 6A:
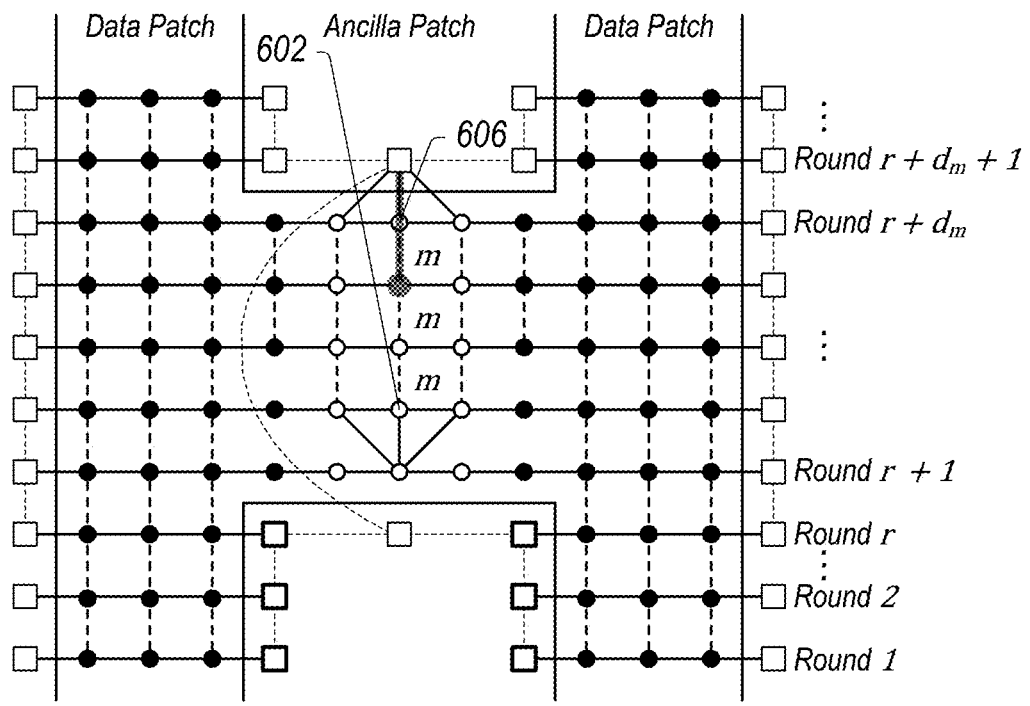
FIG. 6A illustrates the vertical slice of the three-dimensional surface code matching graph for the two surface code patches shown in FIG. 4A, wherein consecutive measurement errors on one of the parity vertices (labelled by m) result in the highlighted edge incident to the future ancilla vertex. The measurement error results in the wrong parity of the measurement of X⊗X. Since the highlighted edge is not incident to the past ancilla vertex, a logical time-like failure occurs resulting in a logical failure labelled by (0,1,0,0), according to some embodiments.

Examples of failure mechanisms resulting in time-like and/or space-like logical errors are shown in FIGS. 6A/6B. For instance, in FIG. 6A, a series of consecutive measurement errors 602 occur on the same parity vertex, starting in round r+1. Since a single measurement error occurs in round r+1, the wrong parity of X⊗X is measured. Due to the series of measurement errors, a single parity vertex near the top boundary is highlighted in the graph (Gr). The shortest path correction (606) matches the highlighted parity vertex to the future ancilla vertex. Hence no parity corrections are applied and a logical (0,1,0,0) error occurs.

The different logical failures for an X⊗X measurement can be encoded in a bit string of the form $(b_{Z_L}, b_{tl}, b_{Z_R}, b_X)$ where $b_{Z_L}=1$ means a logical Z error occurred on the left surface code patch (302), $b_{Z_R}=1$ means a logical Z error occurred on the right surface code patch (304), $b_{tl}=1$ means a logical time-like failure occurred, and $b_X=1$ means a logical X error occurred on both surface code patches. If any of the bits mentioned above are 0, then no logical error occurred for the failure mechanism corresponding to that bit. Thus, in the above example of a (0,1,0,0) error, a logical time-like failure has occurred.

Figure 6B:
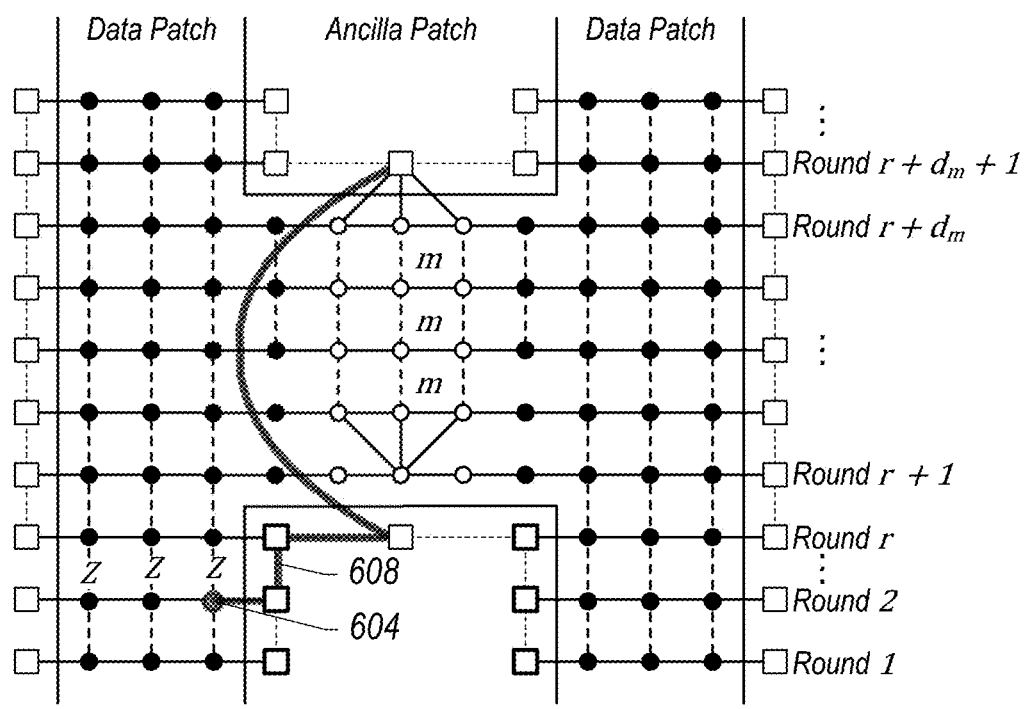
FIG. 6B illustrates the vertical slice of the three-dimensional surface code matching graph for the two surface code patches shown in FIG. 4A, wherein a horizontal string of space-like Z measurements on the left surface code patch result in a logical space-like (a logical Z on the left surface code patch) and time-like failure, which is labelled by (1,1,0,0), according to some embodiments.

Another example is shown in FIG. 6B, where a high-weight string of Z data qubit errors (604) results in the highlighted vertices shown in FIG. 6B. Prior to the merge, there are no Z data qubit errors at the boundary between the ancilla and data-qubit patches and thus the correct parity of X⊗X is measured. However, the minimum-weight path (608) connecting the highlighted vertex to the future ancilla vertex goes through a transition vertex, so that $v_2$=1. The correction thus results in a logical Z error on the left data-qubit patch, in addition to a logical parity measurement failure (since the decoder incorrectly flips the parity) leaving the code with a logical (1, 1, 0, 0) error.

Figure 8:
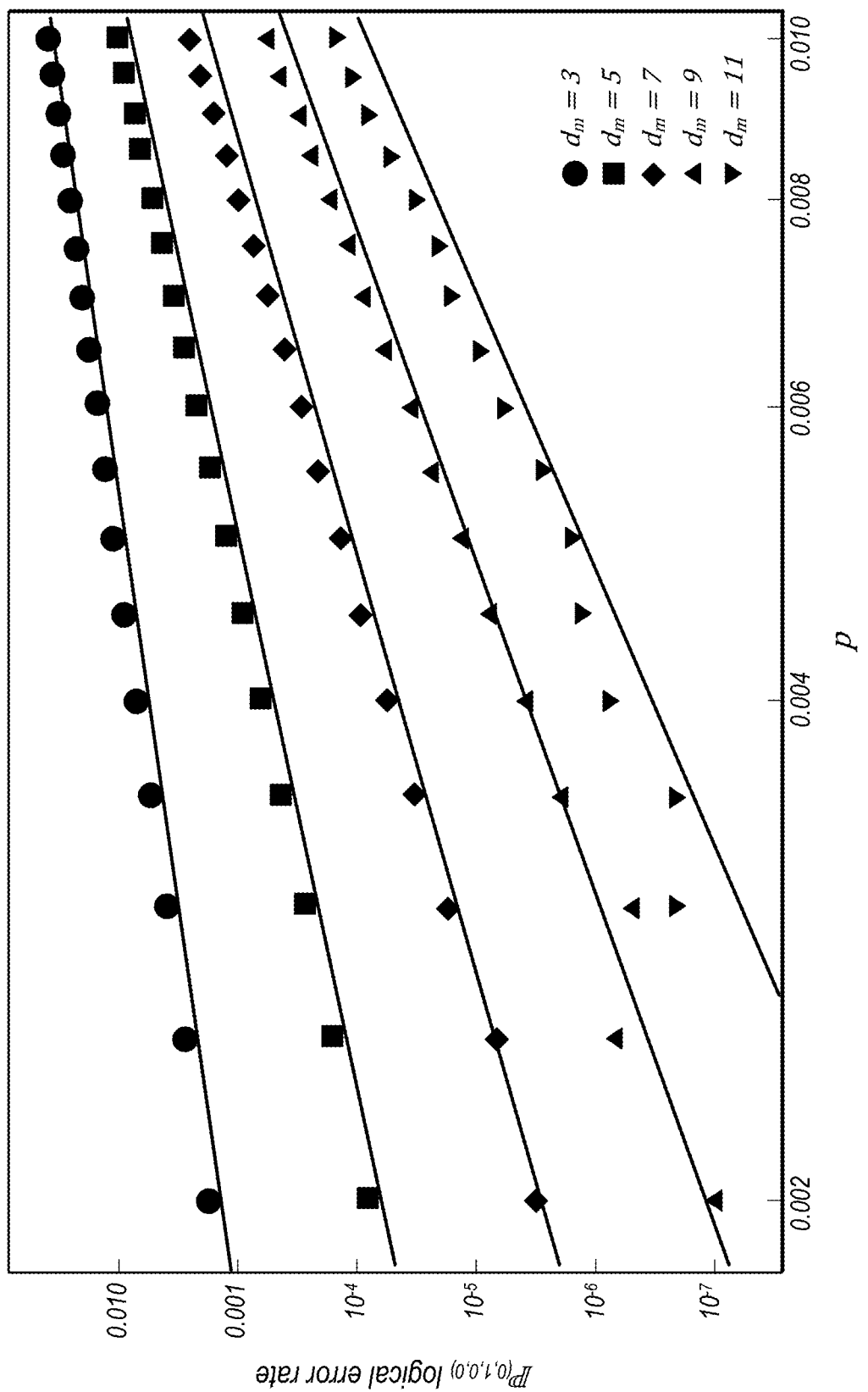
FIG. 8 is a graph illustrating results for different values of repeated measurements ($d_m$) of the merged surface code patches during an X⊗X measurement implemented via lattice surgery, wherein the Y-axis represents the time-like logical failure rate (labelled (0,1,0,0)) and the X-axis represents the physical error rate p for a biased depolarizing noise model where all components of the circuits fail with a probability proportional to p, according to some embodiments.

FIG. 8 compares the best fit polynomial $\mathbb{P}_{(0,1,0,0)}$ with a representative subset of data obtained from Monte Carlo simulations for various values of $d_m$ and a physical noise rate (p), where the chosen parameters are further described in the caption. The plot shows the exponential suppression in purely time-like error probabilities as a function of $d_m$, and that the data is in good agreement with the best-fit polynomials. Note that the logical error rate for a (0, 1, 0, 0) error, of which FIG. 6A shows one example of many possible errors that cause a (0, 1, 0, 0) error, is relatively low (e.g., $10^{-7}$), and can be suppressed as shown in FIG. 8 by increasing $d_m$ and/or using hardware with a low physical noise rate (p).

Algorithm 1 Decoding Algorithm for Measuring $P_1 \otimes P_2 \otimes \ldots \otimes P_k$ Result: Data qubit and parity measurement corrections.

Initialize: $v_1=v_2=0$. Let Gr be the graph for the surface code patches before, during, and after the merge.

Measurement: Measure the stabilizers of the split surface code patches for r rounds. Merge the surface code patches in round r+1 via lattice surgery to perform the $P_1 \otimes P_2 \otimes \ldots \otimes P_k$ measurement and let $s_{par}$ be the parity of the measurement outcome. Repeat the stabilizer measurements of the merged patch for $d_m$−1 rounds.

1) Add the past ancilla vertex $v_{past}$ to Gr for the round r (round before the merge). Let $$V_{par}^{(r+1)} = \{v_{par}^{(1)}, \ldots, v_{par}^{(k)}\}$$

be the set of parity vertices for the syndrome measurement round r+1. Add weightless past vertical edges to Gr which are incident to $v_{past}$ and all vertices $v \in V_{par}^{(r+1)}$. Add weightless edges to Gr which are between $v_{past}$ and virtual boundary edges of all surface code patches.

2) Add the future ancilla vertex $v_{future}$ to Gr for the round $r+d_m+1$ (round after the merge). Let $$V_{par}^{(r+d_m)} = \{\tilde{v}_{par}^{(1)}, \ldots, \tilde{v}_{par}^{(k)}\}$$

be the set of parity vertices for the syndrome measurement round $r+d_m$. Add future vertical edges (of non-zero weight) to Gr which are incident to $v_{future}$ and all vertices $v \in V_{par}^{(r+d_m)}$.

3) Add a weightless edge to Gr which is incident to $v_{past}$ and $v_{future}$.

4) Set all two-dimensional edges incident to any two vertices $v_i, v_j \in V_{par}^{(r+1)}$ to have zero weight.

5) Given the full syndrome measurement history, if the total number of highlighted vertices (obtained by taking the difference between any two consecutive syndrome measurement rounds modulo 2) is odd, highlight $v_{future}$.

6) Implement MWPM on Gr and perform the vertical collapse. Set $v_1$ to be the number of highlighted past vertical edges, and $v_2$ to be the number of highlighted edges incident to transition vertices in the data-qubit patch regions. If $v_1+v_2$ is odd, set $s_{par} \rightarrow s_{par}+1$ (mod 2).

7) Apply data qubit corrections based on the highlighted two-dimensional and space-time correlated edges after performing the vertical collapse.

Figure 7A:
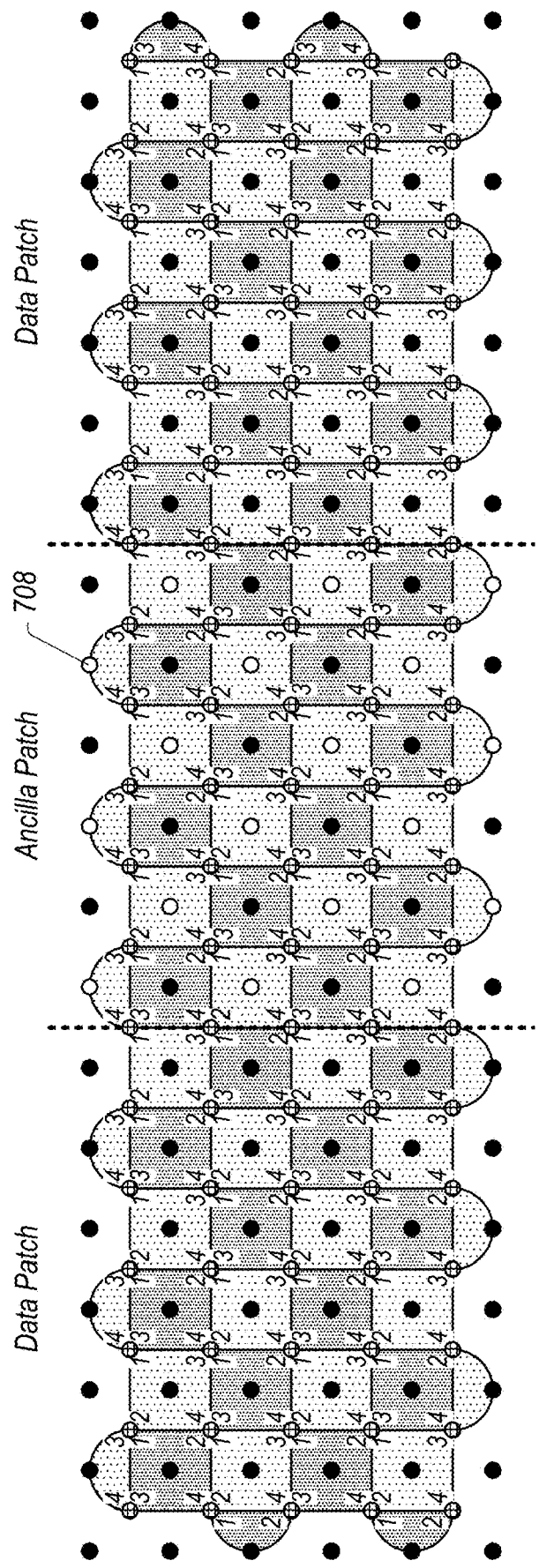
FIG. 7A illustrates an example set of surface code patches connected via an ancilla patch (e.g., parity qubits, for example as shown in FIGS. 4A and 4B), with numbers included in the plaquettes indicating example two-qubit gate schedulings for performing syndrome measurements that may be used in the lattice surgery decoding process described herein, according to some embodiments.

As mentioned above, the space-time correlated edges incident to the parity vertices during the first round of the merged surface code patches (e.g., vertices $v \in V_{par}^{(r+1)}$) need to be treated with care. Such edges are highlighted in thicker light grey (702), black (704) and thicker dark grey (706) in FIGS. 7B and 7C for an $X \otimes X$ measurement. Note that in FIG. 7A, the numbers in each check indicate the gate scheduling of the two-qubit gates (which in the example shown are CNOT gates).

Firstly, in round r+1, edges highlighted in thicker dark grey (706) must have infinite weight and can thus be removed. This is due to the fact that when the data surface code patches are merged with the ancilla patch in round r+1, individual X-stabilizer measurements on the ancilla patch (whose ancillas are marked by white vertices 708) will have a random outcome and thus cannot be highlighted. As such, failures arising from two-qubit gates on the ancilla patch, and which introduce errors which do not interact with data patch stabilizers, cannot generate a non-trivial measurement outcome between two consecutive rounds of stabilizer measurements. Although the thicker dark grey edges (706) discussed above must be removed when they are incident to vertices in rounds r+1 and r+2, such edges incident to vertices $v_i$ and $v_j$ belonging to rounds greater than r+1 must be included since they will have finite weights.

Secondly, space-time edges incident to a single parity vertex $v \in V_{par}^{(r+1)}$ are highlighted in thicker light grey (702) in FIGS. 7B and 7C. Note that in round r+1, such edges are incident to parity vertices, which are also transition vertices. Such edges arise from two-qubit gate failures in round $j \geq r+1$ with the property that the errors introduced by the failure only flip the parity vertices in that round. In round j+1, the error is detected by X-stabilizers on both the ancilla and data patch regions. Errors introduced by such failures can flip the parity of the $X \otimes X$ measurement outcome. As such, $v_2$ (defined in Algorithm 1) should also include the number of highlighted thicker light grey (702) space-time correlated edges incident to transition vertices.

Thirdly, space-time correlated edges highlighted in black (704) have the same effect for correcting errors as all other space-time correlated edges belonging to the data qubit patches (which are highlighted in thin light grey (710)). The reason is that they are incident to parity vertices in rounds $j \geq r+2$ and thus failure mechanisms leading to such edges cannot flip the parity of the $X \otimes X$ measurement outcome.

Lastly, it is noted that a two-qubit gate failure arising in round r+1 and which results in a thicker light grey (702) highlighted space-time correlated edge will only highlight a single vertex (belonging to the data-qubit patch in round r+2) throughout the entire syndrome measurement history (assuming no other failures occur). This is due to the random outcomes of X-stabilizers in round r+1 (so that vertices for such stabilizers cannot be highlighted in round r+1). Since there is an asymmetry between the number of thicker light grey (702) space-time correlated edges incident to the left data qubit patch and those incident to the right data qubit patch, an asymmetry in the logical failure rate polynomials $\mathbb{P}_{(1,0,0,0)}$ and $\mathbb{P}_{(0,0,1,0)}$ will also arise.

In some embodiments, the decoder and decoding protocol, as described herein may be used to decode any arbitrary multi-qubit Pauli measurements. For example, though the above description is given using the specific example of a $X \otimes X$ measurement outcome, measurements from any combination of Pauli operators (X, Y, I, etc.) may be decoded using the decoder and/or decoding protocol, as described herein.

FIG. 9 is a flowchart illustrating a process for correcting errors for quantum computation comprising lattice surgery, according to some embodiments.

At block 902, errors are corrected, if occurring, for logical data used in the quantum computation, wherein the logical data is stored in data qubits encoded in topological codes, and wherein errors, if occurring, are corrected via an error correcting code applied to repeated syndrome measurements of the topological codes.

At block 904, errors are corrected, if occurring, in logical multi-qubit Pauli measurements performed in lattice surgery operations for the quantum computation. In some embodiments, this comprises correcting a wrong parity measurement, if occurring, for a tensor product of Pauli measurements for parity vertices, wherein parity vertices correspond to qubits in a region that connects two or more topological codes upon which a lattice surgery operation is being performed, as further described above.

Protocol for Performing Lattice Surgery Using Twists

As discussed in earlier sections, lattice surgery provides a fault-tolerant way to measure Pauli operators and is well suited for quantum hardware architectures implemented with topological codes. However, not all Pauli operators are equally easy to measure. An operator is a XZ-Pauli when it is a tensor product of $\{1, , X, Z\}$. For XZ Pauli operators, a standard lattice surgery approach will suffice and a surface code architecture would need only weight-4 stabilizer measurements. However, for some topological codes such as the surface code, measuring Pauli operators containing any Y terms is more difficult.

The basic primitive in lattice surgery is a logical multi-qubit Pauli measurement, which combined with logical ancilla states can be used to fault-tolerantly perform logical CNOT gates or logical non-Clifford gates by teleportation. When measuring logical Paulis composed of X and Z operators, the code is deformed with several surface code patches merged into a large patch, though locally the code stabilizers are unchanged. However, more generally, measurements involving Pauli Y operators are needed. Such measurements can be realized with twist-based lattice surgery, though this requires some weight-five measurements in addition to long range multi-qubit gates.

In twist-based lattice surgery, it is necessary to measure some longer-range stabilizers, which are referred to herein as elongated rectangles and twist defects. To perform these measurements without increasing the circuit-depth (which would significantly degrade performance) a hardware connectivity as illustrated in FIG. 10 may be used. Two qubits are considered to be connected when a two-qubit gate can be performed between the qubits. Standard surface code implementations have each qubit connected to four other qubits. However, to perform lattice surgery using twists, in some embodiments, as disclosed herein, some qubits are connected to six other qubits. In some embodiments, a cat-qubit based architecture may be used to provide this connectivity. Though, in other embodiments, the necessary connectivity could be produced in other architectures, though at the risk of additional cross-talk. It is noted that the proposed connectivity does not require a substantial change to the underlying surface code.

For example, FIG. 10 illustrates connectivity and gate scheduling for a Z-check 1002 and illustrates a corresponding Z-check quantum circuit diagram. Also, FIG. 10 illustrates connectivity and gate scheduling for an elongated X-check 1004 and illustrates a corresponding elongated X-check quantum circuit diagram. The light grey vertices 1006 represent data qubits and the black vertices 1008 represent ancilla qubits. For example, Z-check 1002 includes a single ancilla qubit (labeled t), wherein CNOT gates are performed between the ancilla qubit "t" and the surrounding data qubits labeled u, v, w, and x. As another example, elongated X-check 1004 includes two ancilla qubits labeled a and b, which are entangled are prepared in a GHZ state. As shown in FIG. 10, a CNOT gate is performed between the entangled ancilla qubits of elongated X-check 1004. Also, CNOT gates are performed between the respective ancilla qubits of the elongated X-check 1004 and the surrounding data qubits labeled c, d, e, and f. The numbers shown next to the respective CNOT gates correspond to time steps of a gate schedule, where the corresponding quantum circuits shown below also illustrated the gates performed at the respective time steps. It is noted that the diagonal solid grey lines 1010 show the connectivity needed to perform a standard weight-four check, as shown in FIG. 10 for Z-check 1002, which corresponds to a $Z^{\otimes 4}$ stabilizer. Further note that the dashed grey lines 1012 provide additional connectivity to perform a check for an elongated rectangle, such as elongated X-check 1004. In some embodiments, the first and last time step are used for state preparation and measurement. As such, they are not labeled in the circuit diagrams or in the Z-check 1002 or the elongated X-check 1004.

In a lattice surgery protocol, multi-qubit Pauli measurements between logical patches are performed by measuring a set of operators in the routing space between the logical patches. Such measurements (which correspond to gauge fixing) merge the logical patches into one large surface code patch, and a subset of the stabilizers of the merged patch encode the parity of the logical multi-qubit Pauli measurement. A simple example for a $Z \otimes Z$ and $Y \otimes Y$ measurement is provided in FIG. 11. An important feature is that when measuring operators involving Pauli Y measurements, such measurements can be done directly, without first extending the surface code patch as has been suggested for other lattice surgery protocols involving twists. Using an extension step doubles the implementation time and uses additional routing space, so the proposed direct approach is more efficient.

Let $P = P_1 \otimes P_2 \otimes \ldots \otimes P_k$ be a multi-qubit Pauli operator that is to be measured using a lattice surgery protocol. If $P_j \in \{X, Z\}$ for all $j \in \{1, \ldots, k\}$, then the standard surface code gate scheduling can be used to measure all the stabilizers during the lattice surgery protocol. For instance, see the scheduling used for a logical $Z \otimes Z$ measurement performed by lattice surgery in FIG. 11. With such a scheduling, all two-qubit gates can be applied in four time steps thus minimizing the number of idling qubit locations. One of the important features of the standard surface code gate scheduling circuits is that a weight-two error arising from a single fault will be perpendicular to the relevant logical operator thus preserving the surface code distance (e.g. the code will be guaranteed to correct any error arising from at most $(d-1)/2$ faults). By relevant logical operator, it is meant that if the weight-two data-qubit error is of the form $E_X = X_{q1} \otimes X_{q2}$ and the minimum-weight representatives of $X_L$ form vertical strings, then $E_X$ will have support along horizontal strings.

For the case where there exists at least one $j \in \{1, \ldots, k\}$ such that $P_j = Y$, the Y operators can be measured as follows. First, logical patches are extended using qubits in the routing space such that the logical $Y_L$ operator of the logical patch can be expressed along a horizontal boundary. The logical Y operator is then given by:

$$Y = Z_{q_1} \otimes Z_{q_2} \otimes \ldots \otimes X_{qd_z-1} \otimes Y_{gd_z} \otimes X_{qd_z+1} \cdots \otimes X_{qd_z+d_x}$$

where $d_x$ and $d_z$ are the minimum weights of the logical X and Z operators of the logical patch. The Y operator can then be measured via gauge fixing by performing Z and X-type stabilizer measurements between the extended logical patch and qubits in the routing space. The gauge-fixing step requires the measurement of mixed $X \otimes X \otimes Z \otimes Z$ stabilizers which are referred to herein as domain walls. For example, FIG. 11 illustrates domain walls 1106 with different gate schedules, e.g., schedule A or schedule B. In addition, it requires the measurement of a weight-five operator containing a physical Y term. Such weight-five operators are referred to as twist-defects. For example, FIG. 11 illustrates twist defects 1112. Additionally, FIG. 11 illustrates elongated rectangles which may include X-checks 1108 (white hatch pattern) or Z-checks 1110 (dark grey hatch pattern). Also, FIG. 11 illustrates weight-four X-checks 1102 (with gate schedules A, B, and C) and weight-four Z-checks 1104 (with gate schedules A, B, and C).

Note that the circuit diagram for measuring the elongated X-type stabilizer rectangles 1108 is given in FIG. 10 (e.g. elongated X check 1004). While not illustrated, a similar circuit for measuring the elongated Z-type stabilizer rectangles 1110 comprises a similar arrangement, but with the reference and targets of the CNOT gates reversed, and the measurement basis changed from X to measurement in the Z basis.

It is noted that the presence of twist-defects reduces the set of gate scheduling solutions that can be used for a twist-based lattice surgery protocol with minimal circuit depth. A valid gate scheduling for the measurement of $P = Y \otimes Y$ via lattice surgery is shown in FIG. 11. The chosen gate scheduling ensures that all two-qubit gates can be applied in four time steps. Three different gate schedules are used, which are labelled A, B and C. The C schedule is only used in the routing space to the right of the twist defects. Note that the A, B and C schedules must follow a set of rules for how they can be tilled on the lattice in order to avoid scheduling conflicts or invalid schedules for performing the stabilizer measurements. For instance, a stabilizer measured using an A schedule cannot be horizontally adjacent to a stabilizer measured using a C schedule since the qubits shared by both stabilizers would interact with the two-qubit gates in the same time steps. However, C and A schedules can be adjacent to each other in the vertical direction (see the legend at the bottom of FIG. 11).

Unlike a standard surface code gate scheduling where all X-type stabilizers use the A schedule and Z-type stabilizers use the B schedule (or vice-versa), the gate scheduling for measuring $Y \otimes Y$ includes some regions where the A schedule is applied uniformly. Consequently, there will be single failures resulting in weight-two data qubit errors which are parallel to the logical $X_L$ or $Z_L$ operators of the merged patch. For a given quantum algorithm, the $d_x$ and $d_z$ distances of logical patches are chosen such that a single logical data qubit error is very unlikely during the course of the entire computation. It is important to note that the merged lattices of a twist-based protocol with distances $d'_x$ and $d'_z$ for measuring Y operators will have $d'_x \geq d_x$ and $d'_z \geq d_z$. In other words, the distances of the merged patches will be larger than the distances required for the logical patches prior to the merge. Therefore, even though the proposed gate scheduling has the property that some weight-two errors arising from single failures will be parallel to $X_L$ or $Z_L$ logical operators, the increased effective distances during lattice surgery protocols will ensure that $d_x$ and $d_z$ distances of the un-merged logical patches remain unchanged when performing twist-based lattice surgery. However, in some embodiments, twist-based lattice surgery protocols require extra padding to correct arbitrary X errors arising from $(d_x-1)/2$ failures.

An example of a weight-one X error being indistinguishable from a weight-two X error (both arising from a single failure with probabilities proportional to p) for a lattice surgery protocol measuring Y⊗Y is shown in FIGS. 15A-15C. The lattices in FIGS. 15A and 15B have width $d_x+d_z$, where $d_x=3$ and $d_z=10$. The lattice in FIG. 15C has extra padding making its width $d_x+d_z$, +1. For FIGS. 15A and 15B, comprising the lattices of width $d_x+d_z$, consider first the lattice in FIG. 15A. A weight-two X data qubit error (1502) occurs during the first syndrome measurement round of the merged patch (e.g., the first syndrome measurement round when gauge fixing is performed) due to a controlled-Y gate failure used for measuring the top twist-defect (1504). The error anti-commutes with the weight-five white plaquette (1506) in addition to a dark-grey hatched weight-four Z-type stabilizer (1508). However, the measurement outcome of the weight-five operator is random in the first round of the merge, and no change in measurement outcomes are observed in subsequent syndrome measurement rounds. As such, only the vertex associated with the weight-four Z-type stabilizer in the first round of the merge is highlighted. The observed syndrome measurement outcome is identical to the one that would be obtained if a weight-one X error (1510), as shown in FIG. 15B, occurred during the first round of the merge. Since both a weight-one and weight-two X error result in the same syndrome measurement history, and $d_x=3$, this example shows that a single failure occurring during the first syndrome measurement round when merging the surface code patches to measure Y⊗Y can lead to a logical failure. However, by increasing the $d_x$ distance by one using extra padding, as shown in FIG. 15C, such failure mechanisms can be distinguished.

More generally suppose lattice surgery is performed using twist-defects to measure Y operators and the initial logical patches prior to a merge have odd distance $d_x$. In such a setting, fewer than $(d_x+1)/2$ failures occurring during the first syndrome measurement round of the merged patch can result in a logical X error. To ensure that up to $(d_x+1)/2$ failures never result in a logical failure, the logical patches can be padded with an extra column of stabilizers thus increasing their $d_x$. distance by one. Depending on the noise bias and size of the quantum algorithm, the extra padding may not be necessary.

Further, even for odd distances $d_x$, the logical X failure probability scales as $$\binom{N}{(d_x-1)/2} p^{(d_x-1)/2},$$

the combinatorial coefficient $$\binom{N}{(d_x-1)/2}$$

is very small relative to the combinatorial coefficient of higher order failure mechanisms since only $(d_x-1)/2$ failures in the first round of the merged patch at very specialized regions near the twist defects can lead to a logical failure.

Figure 12A:
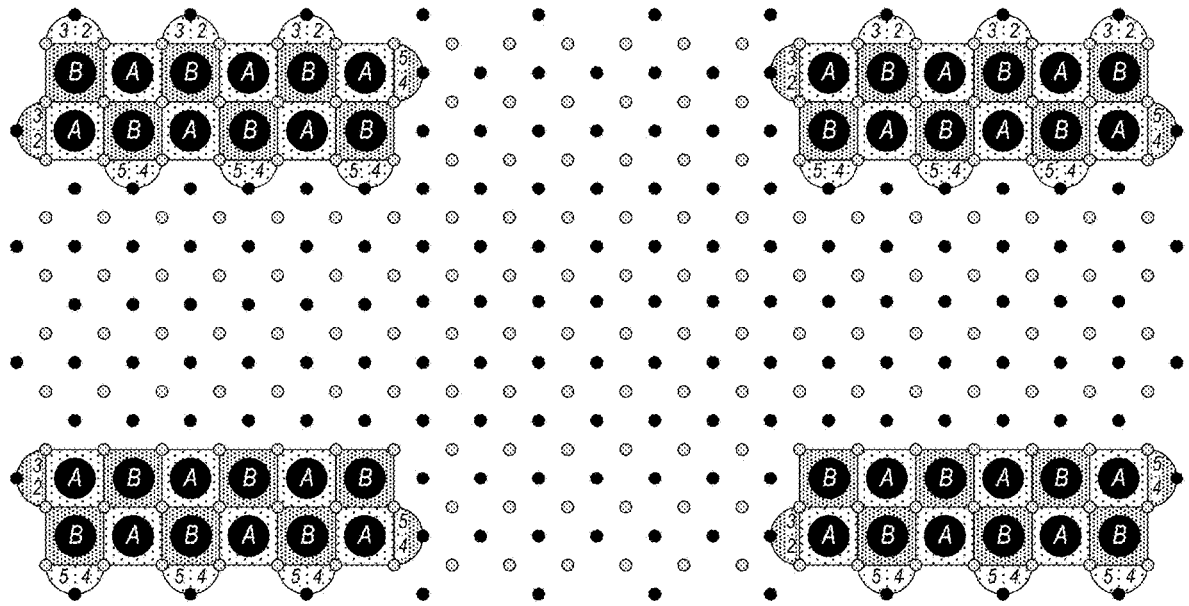
FIG. 12A illustrates surface code patches separated by data and ancilla qubits in a routing space, according to some embodiments.
Figure 12B:
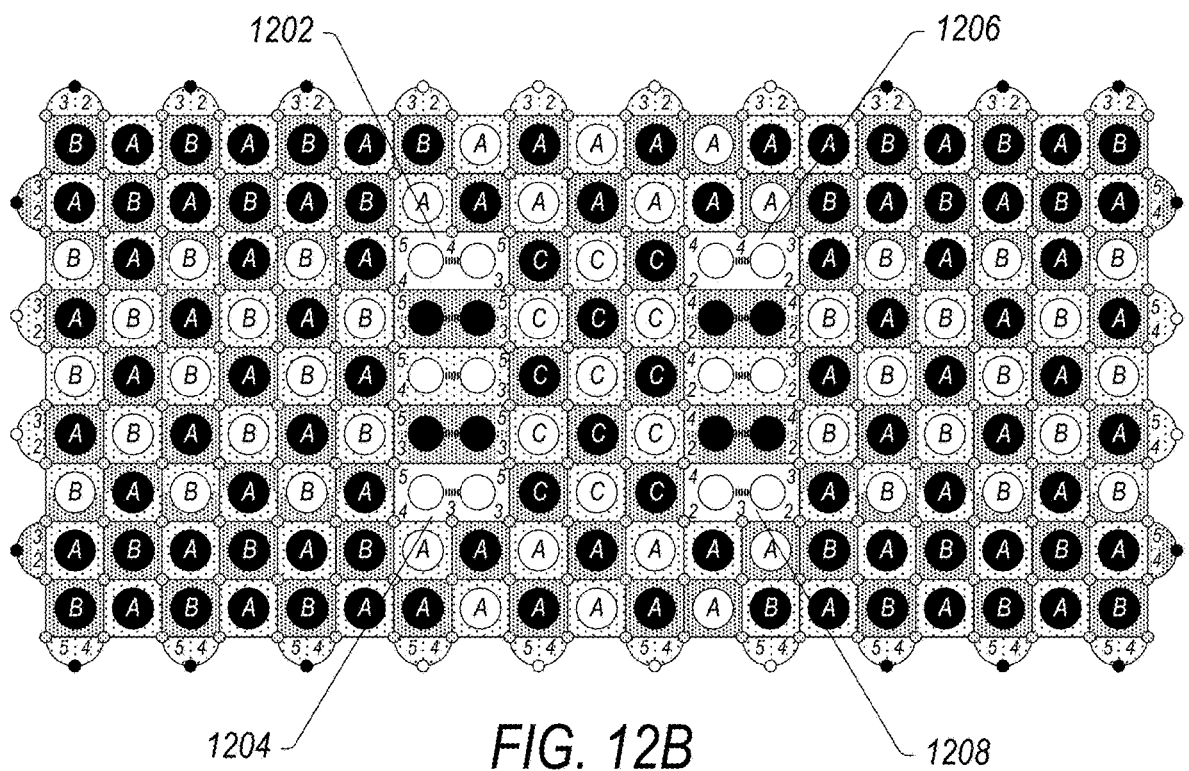
FIG. 12B illustrates lattice surgery being performed between the surface code patches, wherein a first gate scheduling is used for twist defects included in extended versions of the surface patches on the left-hand side and another gate scheduling is used for twist defects include in extended versions of the surface code patches on the right-hand side, according to some embodiments. Note that the gate scheduling shown in FIG. 12B may be used to measure Pauli operators comprising an arbitrary number of Y terms, in some embodiments.

In some embodiments, the gate scheduling for twist-based lattice surgery can be further generalized. For example, FIG. 12B illustrates different gate schedulings used for left hand-side and right-hand side twist defects, e.g., twist defects 1202 and 1204 (left-side) and twist defects 1206 and 1208 (right-side). In FIG. 12B, the gate schedulings illustrated are required to measure the Pauli operator P=Y⊗Y⊗Y⊗Y. The inclusion of a second pair of Y operators has the feature that all stabilizers of the merged patch in the routing space between the four twist defects are measured using the C schedule. As was the case in FIG. 11, the presence of twist-defects requires the measurement of elongated stabilizers along vertical strips located between the twist-defects in the routing space. In order to respect the nearest neighbor connectivity constraints imposed by many quantum hardware architectures, additional ancilla qubits need to be used to measure the elongated stabilizers and weight-five operators. However, an important feature of the circuit in FIG. 12 is that the gate scheduling imposes the need for different syndrome measurement circuits for the twist-defects on the left strip compared to those on the right strip. More details are provided with discussion of FIGS. 14A/14B, below.

In some embodiments, the gate scheduling shown in FIG. 12 can be extended to measure arbitrary multi-qubit Pauli operators such as the one shown in FIGS. 13A/13B. In particular, FIG. 13A/13B provides an example of the minimal routing space requirements to perform arbitrary multi-qubit Pauli measurements for logical patches placed on a two-dimensional grid with qubits afflicted by a biased noise model.

Laying out the surface code patches following the tiling in FIG. 13, there is enough routing space to perform any Pauli measurement. The routing overhead can be accessed by considering an individual unit cell (1302) of 4 logical patches (1304) as shown in FIG. 13. Each unit cell uses $4d_x d_z$ physical qubits for the four logical patches and comprises a total of $2(3d_x+2)(2d_z+d_x+4)$ physical qubits. The factor $3d_x+2$ is the height of the unit cell. The factor $2d_z+d_x+4$ is the width of the unit cell. Note the width factor needs $2(d_z+1)$ to account for the two patches and $d_x+2$ for the routing space between patches. It suffices to use a distance proportional to $d_x$ (rather than $d_z$) because when merging lattice surgery patches, the effective distance is maintained. This leads to a multiplicative routing overhead of $$O_{(d_z,d_x)} = \frac{(3d_x+2)(2d_z+d_x+4)}{4d_x d_z} \approx \frac{3}{2} + \frac{d_z}{d_x}$$

The approximation in the above equation holds for large asymmetric codes, e.g., $d_z \gg d_x \gg 4$. This is the asymptotic routing overhead since there is an extra routing space required shown as grey edge padding 1306 in FIG. 13A. However, the cost of edge padding (as a fraction of total costs) vanishes with the number of logical qubits. Routing overheads can be reduced further if not every logical qubit is ready to participate in lattice surgery (e.g., see the cache-core model described below in regard to FIG. 24 and others).

Note that the parity of the multi-qubit Pauli measurement is given by a product of stabilizers in the routing space. For instance, for the P=Y⊗Y⊗Y⊗Y measurement in FIG. 12B, the parity of the measurement is given by the product of all X-type stabilizers and twist defects in the routing space, in addition to domain wall stabilizers with the X-component of the operator incident to the routing space. In some embodiments, time-like failures may refer to a collection of failure mechanisms which can result in the wrong parity outcome of a multi-qubit Pauli measurement implemented via lattice surgery. A logical time-like failure occurs when the incorrect parity of a multi-qubit Pauli is obtained after performing error correction over the full syndrome history of a lattice surgery protocol.

Due to time-like failures in addition to spacelike failures resulting in data qubit errors which anti-commute with P, the measurement of stabilizers in the routing space needs to be repeated $d_m$ times where $d_m$ is determined from the noise model and size of the computation. It is further noted that the decoding techniques discussed above for decoding syndrome measurements during lattice surgery may be applied to lattice surgery performed using twist defects as discussed in this section.

In some embodiments, two types of two types of circuits are used to measure elongated checks and the weight-five stabilizers corresponding to twist defects on both the left and right vertical strips in the routing space of FIG. 12B. For example, the circuit shown in FIG. 14A may be used to measure weight-five stabilizers associated with twist defects 1202 and 1204 on the left-hand side and the circuit shown in FIG. 14B may be used to measure weight-five stabilizers associated with twist defects 1206 and 1208 on the right-hand side.

An example circuit from measuring a weight-five stabilizer is given above with regard to measuring elongated X check 1004 in FIG. 10. Here, a more general procedure is described. In the circuits shown in FIGS. 14A and 14B, $|\bar{\psi}\rangle$ is the encoded state protecting the data during lattice surgery. $P_1$ and $P_2$ are Pauli operators with $P_1P_2$ corresponding to the stabilizer being measured.

Without loss of generality, assume the data qubits are in an eigenstate of $P_1P_2$ so that $P_1P_2|\bar{\psi}\rangle = \pm|\bar{\psi}\rangle$. For the circuit in FIG. 14A, it is straightforward to show that the state prior to the measurements is given by $|\psi\rangle_f = (|0,0\rangle \pm |1,1\rangle)/\sqrt{2}|\bar{\psi}\rangle$. The ancilla state $(|0,0\rangle \pm |1,1\rangle)$ is an eigenstate of $X \otimes X$ with eigenvalue $\pm 1$. As such, the product of the two X-basis measurement outcomes of the ancilla qubits gives the stabilizer measurement outcome.

Figure 14A:
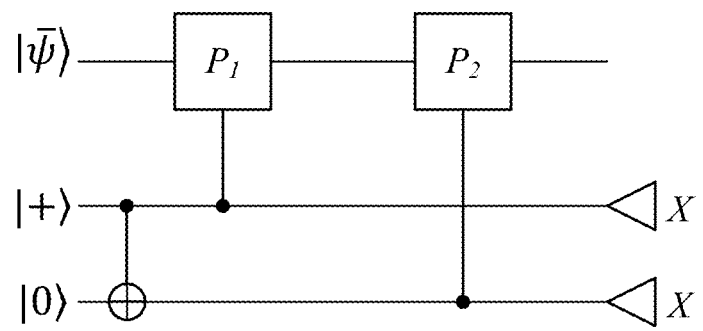
FIG. 14A illustrates a first quantum circuit used to measure weight-five stabilizers of a twist defect, such as the twist defects located on the left-hand side of FIG. 12B, according to some embodiments. The product of P1 and P2 correspond to the operator being measured. Controlled-P1 and controlled-P2 gates can be implemented by taking products of individual controlled-X, controlled-Z and controlled-Y gates.
Figure 14B:
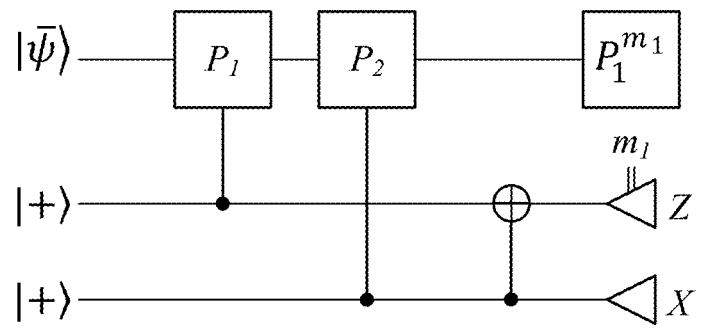
FIG. 14B illustrates a second quantum circuit used to measure weight-five stabilizers of a twist defect, such as the twist defects located on the right-hand side of FIG. 12B, according to some embodiments. The product of P1 and P2 correspond to the operator being measured. Controlled-P1 and controlled-P2 gates can be implemented by taking products of individual controlled-X, controlled-Z and controlled-Y gates.

For the circuit in FIG. 14B, the state prior to the measurement is given by:

$$|\psi\rangle_f = (|0,0\rangle + |0,1\rangle P_2 + |1,0\rangle P_1 + |1,1\rangle P_1P_2)|\bar{\psi}\rangle$$

which can be expressed as:

$$|\psi\rangle_f = |0\rangle(|0\rangle + |1\rangle P_1P_2)|\bar{\psi}\rangle + |1\rangle(|0\rangle P_1 + |1\rangle P_2)|\bar{\psi}\rangle$$

$$= |0\rangle(|0\rangle + |1\rangle P_1P_2)|\bar{\psi}\rangle + P_1|1\rangle(|0\rangle + |1\rangle P_2)|\bar{\psi}\rangle$$

$$= |0\rangle|\pm\rangle|\bar{\psi}\rangle + P_1|1\rangle|\pm\rangle|\bar{\psi}\rangle$$

As can be seen, measuring the second ancilla qubit in the X basis will reveal the desired $\pm 1$ eigenvalue. However, there is also a P1 Pauli correction required depending on the value of the first ancilla qubit measured in the Z basis.

If $P_1$ is expressed as a product of $P_{j1} \ldots P_{jk}$, then a controlled $P_1$ gate would be given by the products of controlled $P_{j1} \ldots$ controlled $P_{jk}$. In a similar manner, if $P_2$ is expressed as a product of $P_{j1} \ldots P_{jk}$, then a controlled $P_2$ gate would be given by the products of controlled $P_{j1} \ldots$ controlled $P_{jk}$.

Additionally, it is pointed out that other techniques for performing lattice surgery using twists have been proposed at a high-level of generality, wherein a Pauli Y operator is measured using several steps, such as (1) starting with two separate surface code patches, e.g., the patch to be measured and a $|0_L\rangle$ ancilla. The next step (2) is to extend the patch by moving the corner to express a minimum weight representative of the logical Y operator along a straight line. Afterwards, (3) a twist defect is used to measure $Z \otimes Y$ with an ancilla prepared in a logical $|0\rangle$ state. The last step (4) implements destructive measurements on qubits in the ancilla region in order to return to the original code space. In such an arrangement, the first and second steps require d rounds of error correction. If the extension step (e.g., step 2) is required for a single Y measurement it would seem natural to prefer this for $Y \otimes Y$ and more general logical measurements. However, the extension step effectively doubles the execution time for lattice surgery and also demands additional routing space.

Figure 16C:
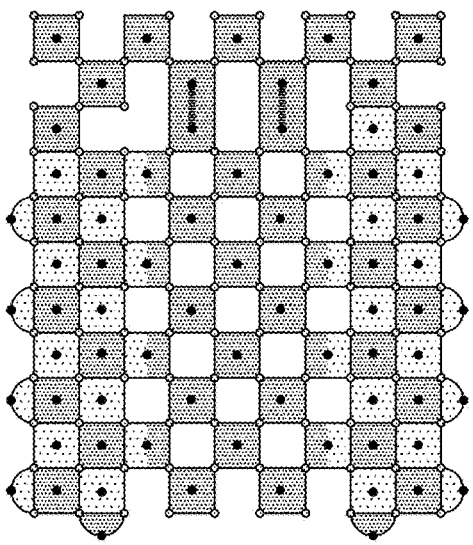
FIG. 16C illustrates stabilizers of a sub-system code that can be regarded as what is being gauge fixed in the lattice surgery operation using twists, according to some embodiments. The stabilizers of the subsystem code show that code distances are preserved when measuring Y operators in a direct fashion without first performing the extension of the logical patches.

In contrast to such other techniques, the proposed lattice surgery procedure with twists, as described herein, allows for the extension step to be skipped while retaining the fault-tolerance properties lattice surgery at the phenomenological level. Gauge fixing is applied, for example in a $Y \otimes Y$ measurement, as shown in FIGS. 16A-16C.

Figure 16B:
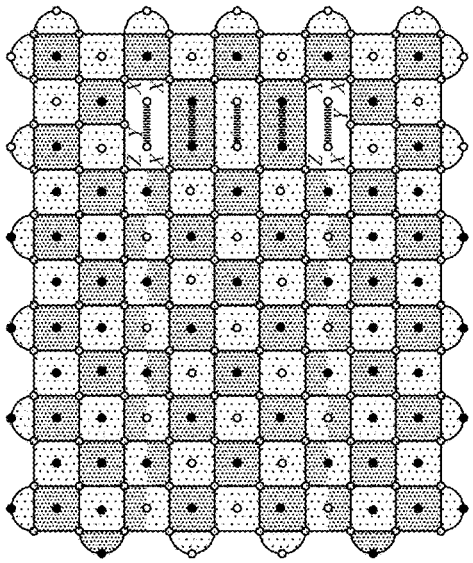
FIG. 16B illustrates stabilizers of merged logical patches (e.g., the logical patches of FIG. 16A), wherein the merged logical patches are obtained via lattice surgery, according to some embodiments. Note that the merge is done in one step without needing to use an additional time step to extend the original logical patches to express the logical Y operators along a straight line.
Figure 16A:
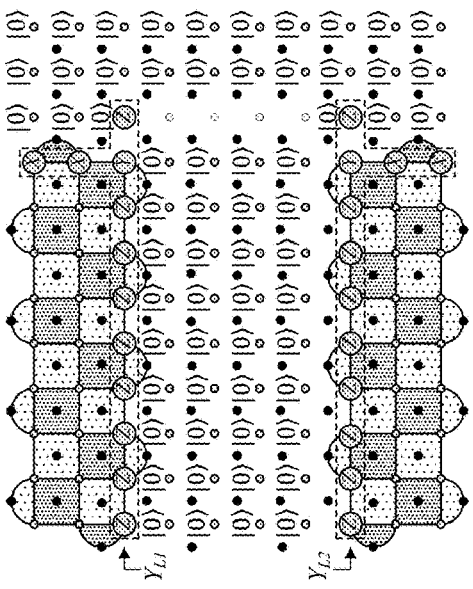
FIG. 16A illustrates example stabilizers for an initial configuration of surface code patches (e.g., logical patches), wherein the logical patches include single qubit Z for |0⟩ states, according to some embodiments. The diagram shown in FIG. 16A treats all Z operators acting on qubits prepared in |0⟩ as part of the stabilizer group prior to the merge. In particular, minimum weight representatives of the logical Y operator includes the extra Z operator acting on one of the qubits prepared in |0⟩, according to some embodiments.

The initial state of FIG. 16A illustrates some set of stabilizers $S_{old}$ that includes all the stabilizer generators for the two logical patches. Note the data qubits in the routing space are prepared in the $|0\rangle$ state. Unconventionally, the Z Pauli for each $|0\rangle$ qubit is regarded as being part of the stabilizer $S_{old}$. This further allows an unusual representative to be chosen for the $Y_{L1}$ and $Y_{L2}$ logical operators (each differs by a Z from $S_{old}$ relative to the standard representatives for $Y_{L1}$ and $Y_{L2}$).

The merged state of FIG. 16B illustrates the stabilizers $S_{new}$ during the merge step (having skipped any extension step). Multiplying the stabilizers with white vertices gives the representative for $Y_{L1}$ and $Y_{L2}$ from the initial configuration and therefore these lattice surgery operations do measure the desired logical operator. If the single-qubit Z operators were not included in $S_{old}$, $Y_{L1} \otimes Y_{L2}$ would not have been measured.

The sub-system code may be considered with stabilizer $\tilde{S} = S_{old} \cap S_{new}$ and gauge group $\tilde{G} = \langle S_{old}, S_{new} \rangle$. The protocol is then (phenomenologically) fault-tolerant provided that this subsystem code retains the distance of the initial code. FIG. 16C illustrates local generators for $\tilde{S}$. The logical operators for the sub-system code must commute with the stabilizer group and not be contained in the gauge group. Examining FIG. 16C one finds that the code distance is indeed maintained at $d_z$ for pure Z errors and at least $d_x$ for all other types of errors.

Figure 17:
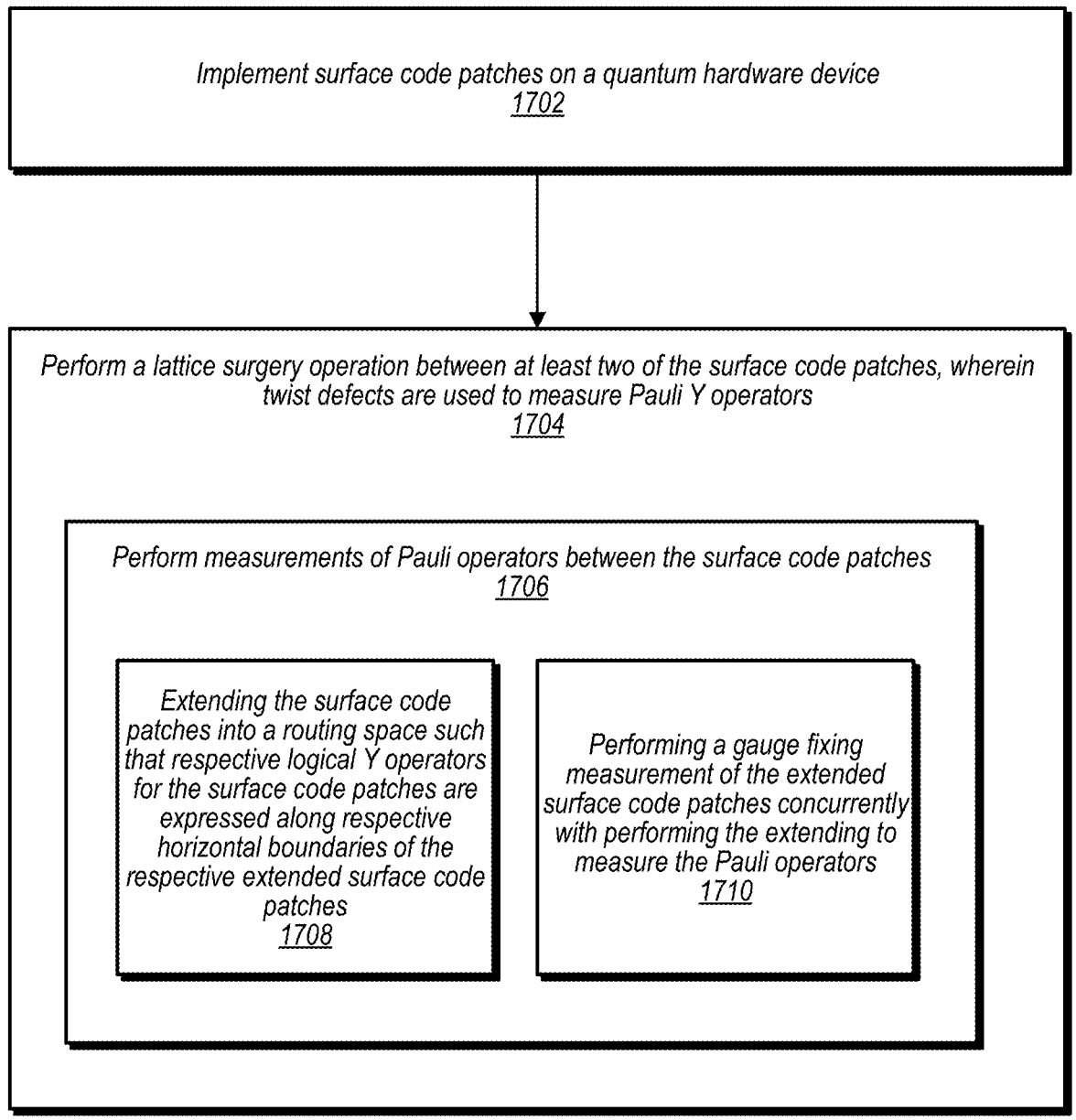
FIG. 17 is a flowchart illustrating a process of performing lattice surgery using twists, according to some embodiments.

FIG. 17 is a flowchart illustrating a process of performing lattice surgery using twists, according to some embodiments.

At block 1702, surface code patches are implemented on a quantum hardware device. For example, surface code patches may be implemented on a quantum hardware device comprising data qubits and ancilla qubits as shown in FIGS. 11-13 and 15-17, using circuits as shown in FIG. 14. At block 1704, a lattice surgery operation is performed between at least two of the surface code patches, for example as shown in FIG. 11 or more than two surface code patches, as shown in FIG. 12A/B. Twist defects, such as twist defects 1112 or 1202, 1204, 1206, and 1208 are used to perform the lattice surgery, along with elongated rectangles, such as elongated rectangles 1108 or 1110. In order to perform the lattice surgery operation, at block 1706, Pauli operator measurements are performed between the surface code patches. In some embodiments, performing the Pauli operator measurements comprises, performing, concurrently in a same time step: (1708) extending the surface code patches into a routing space such that respective logical Y operators for the surface code patches are expressed along respective horizontal boundaries of the respective extended surface code patches and (1710) performing a gauge fixing measurement of the extended surface code patches concurrently with performing the extending to measure the Pauli operators.

Figure 18:
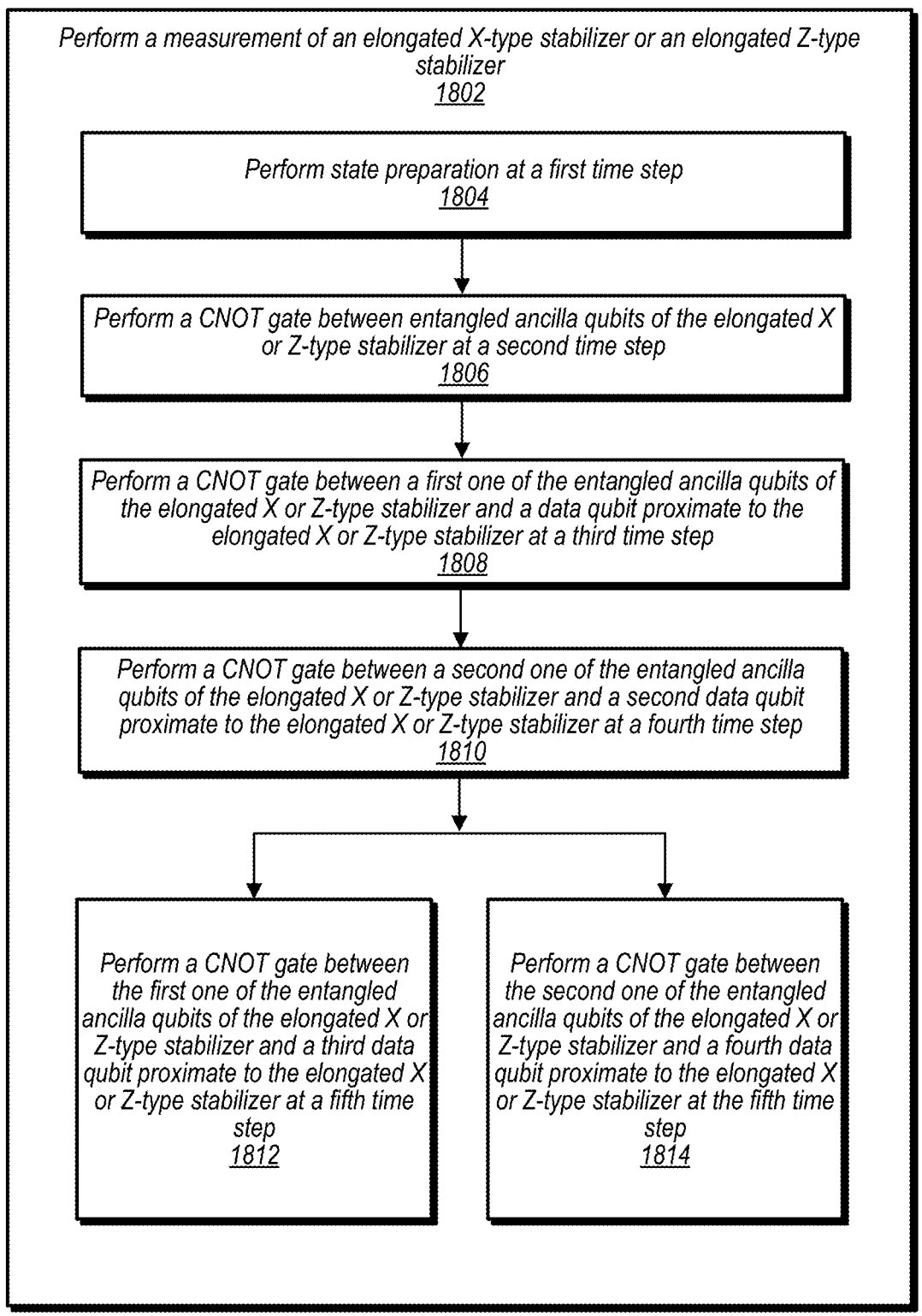
FIG. 18 is a flowchart illustrating a process for performing stabilizer measurements for an elongated X-type stabilizer used in lattice surgery, according to some embodiments.

FIG. 18 is a flowchart illustrating a process for performing stabilizer measurements for an elongated X-type stabilizer used in lattice surgery, according to some embodiments.

For example, performing a stabilizer measurement of an elongated X or Z-type stabilizer at block 1802 comprises performing blocks 1804-1814. Note that when performing a measurement for an X-type stabilizer the CNOT gates are oriented as shown in FIG. 11 for elongated X-stabilizer rectangle 1108 with the targets of the CNOT gates oriented towards the data qubits. Also, as shown in FIG. 10 for elongated X-check 1004, the measurement is performed in the Z-basis. Furthermore, when performing a measurement for a Z-type stabilizer, the CNOT gates are oriented as shown in FIG. 11 for elongated Z-type stabilizer 1110 with the targets of the CNOT gates oriented towards the entangled ancilla qubits. Also, the measurements are performed in the Z basis when performing a measurement for a Z-type stabilizer.

At block 1804, state preparation of the quantum circuits to be used to perform the stabilizer measurement is performed. In some embodiments, measurements may be performed at a last time step and state preparation for another round may be performed at a first time step. In some embodiments, a first time step of a next round in which state preparation is performed may overlap with (or be performed concurrently with) a last time step of a preceding round in which measurements are performed.

At block 1806, a CNOT gate is performed between entangled ancilla qubits of the elongated X or Z-type stabilizer at a second time step. For example, FIG. 11 shows a CNOT gate being performed between ancilla qubits of elongated rectangle 1108 or 1110 at time step 2. At block 1808, a CNOT gate is performed between a first one of the entangled ancilla qubits of the elongated X or Z-type stabilizer and a data qubit proximate to the elongated X or Z-type stabilizer at a third time step. For example, FIG. 11 shows a CNOT gate being performed between a first ancilla qubit and a surrounding data qubit of elongated rectangle 1108 or 1110 at time step 3. At block 1810, a CNOT gate is performed between a second one of the entangled ancilla qubits of the elongated X or Z-type stabilizer and another data qubit proximate to the elongated X or Z-type stabilizer at a fourth time step. For example, FIG. 11 shows a CNOT gate being performed between a second ancilla qubit and a surrounding data qubit of elongated rectangle 1108 or 1110 at time step 4. At blocks 1812 and 1814 CNOT gates are concurrently performed. At block 1812, a CNOT gate is performed between the first one of the entangled ancilla qubits of the elongated X or Z-type stabilizer and a third data qubit proximate to the elongated X or Z-type stabilizer at a fifth time step. Also, at block 1814, a CNOT gate is performed between the second one of the entangled ancilla qubits of the elongated X or Z-type stabilizer and a fourth data qubit proximate to the elongated X or Z-type stabilizer at the fifth time step. For example, FIG. 11 shows CNOT gates being performed as described at time step 5.

Figure 19A:
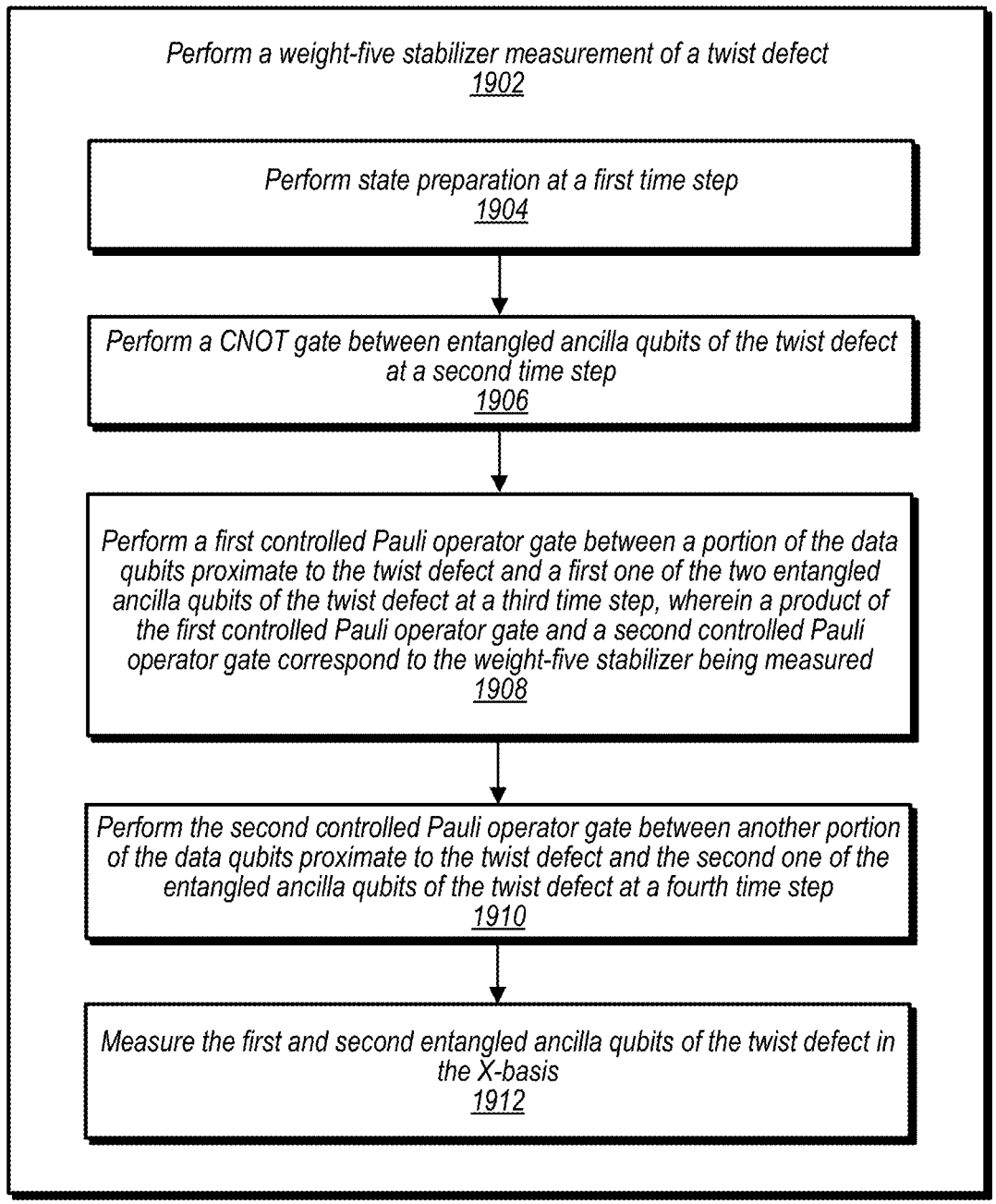
FIG. 19A is a flowchart illustrating a process for performing weight-five stabilizer measurements for a twist defect used in lattice surgery, according to some embodiments.

FIG. 19A is a flowchart illustrating a process for performing weight-five stabilizer measurements for a twist defect used in lattice surgery, according to some embodiments.

For example, performing a weight-five stabilizer measurement of twist defect at block 1902 comprising performing blocks 1904-1912.

At block 1904, state preparation of the quantum circuits to be used to perform the weight-five stabilizer measurement is performed. In some embodiments, measurements may be performed at a last time step and state preparation for another round may be performed at a first time step. In some embodiments, a first time step of a next round in which state preparation is performed may overlap with (or be performed concurrently with) a last time step of a preceding round in which measurements are performed.

At block 1906, a CNOT gate is performed between entangled ancilla qubits of the twist defect at a second time step. For example, FIG. 11 shows a CNOT gate being performed between ancilla qubits of twist defect 1112 at time step 2.

At block 1908, a first controlled Pauli operator gate is performed between a portion of the data qubits proximate to the twist defect and a first one of the two entangled ancilla qubits of the twist defect at a third time step, wherein a product of the first controlled Pauli operator gate and a second controlled Pauli operator gate correspond to the weight-five stabilizer being measured. For example, FIG. 14A illustrates an example circuit for use in performing the first and second Pauli operator.

At block 1910, the second controlled Pauli operator gate is performed between another portion of the data qubits proximate to the twist defect and the second one of the entangled ancilla qubits of the twist defect at a fourth time step.

At block 1912, the first and second entangled ancilla qubits of the twist defect are measured in the X-basis. The process may then revert to 1904 for a subsequent stabilizer measurement round.

Figure 19B:
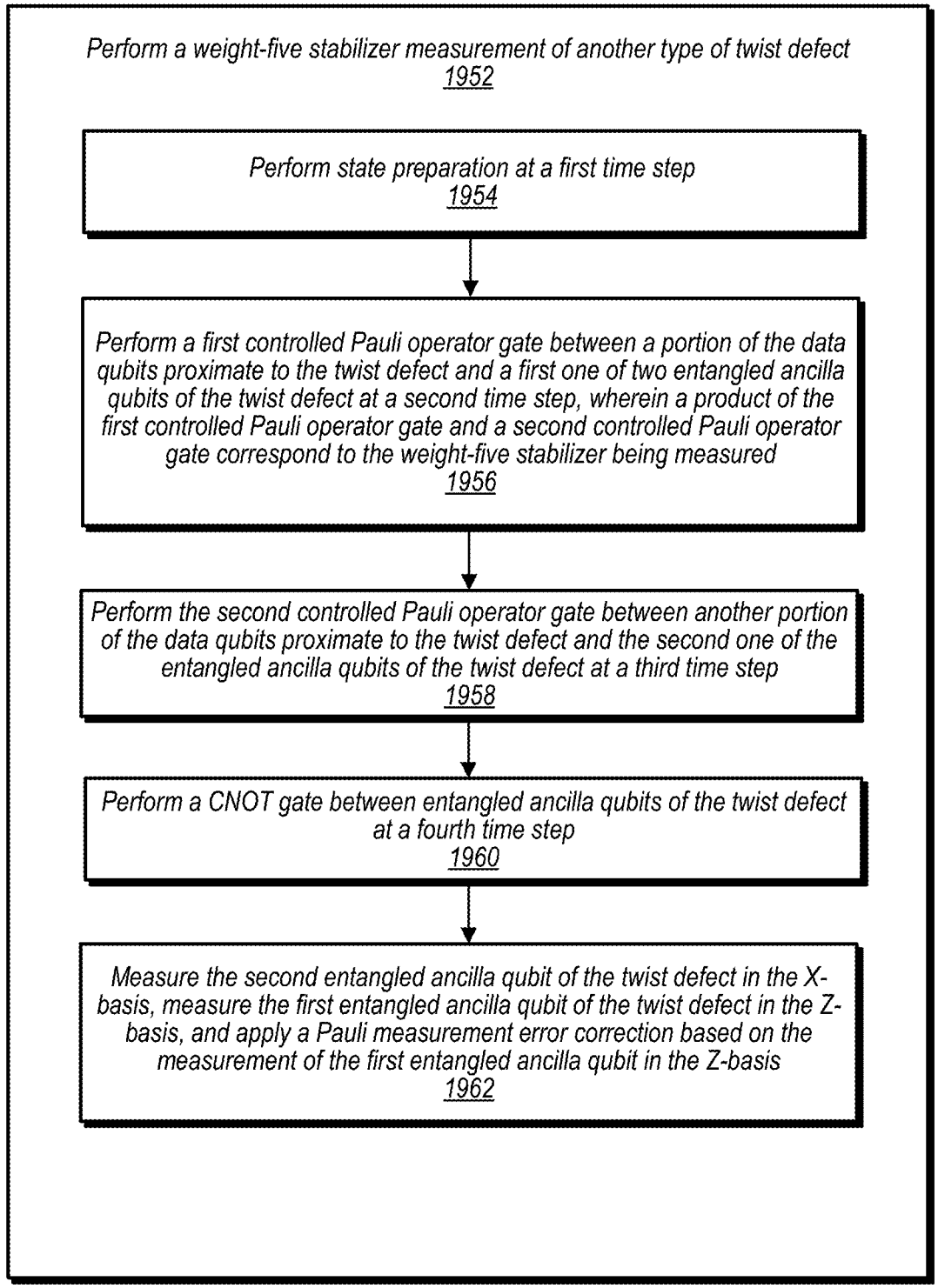
FIG. 19B is a flowchart illustrating another process for performing weight-five stabilizer measurements for another twist defect used in lattice surgery, according to some embodiments.

FIG. 19B is a flowchart illustrating another process for performing weight-five stabilizer measurements for another twist defect used in lattice surgery, according to some embodiments.

For example, performing a weight-five stabilizer measurement of twist defect at block 1952 comprising performing blocks 1954-1962.

At block 1954, state preparation of the quantum circuits to be used to perform the weight-five stabilizer measurement is performed. In some embodiments, measurements may be performed at a last time step and state preparation for another round may be performed at a first time step. In some embodiments, a first time step of a next round in which state preparation is performed may overlap with (or be performed concurrently with) a last time step of a preceding round in which measurements are performed.

At block 1956, a first controlled Pauli operator gate is performed between a portion of the data qubits proximate to the twist defect and a first one of two entangled ancilla qubits of the twist defect at a second time step, wherein a product of the first controlled Pauli operator gate and a second controlled Pauli operator gate correspond to the weight-five stabilizer being measured. For example, FIG. 14B illustrates an example circuit for use in performing the first and second Pauli operator.

At block 1958, the second controlled Pauli operator gate is performed between another portion of the data qubits proximate to the twist defect and the second one of the entangled ancilla qubits of the twist defect at a third time step.

At block 1960, a CNOT gate is performed between entangled ancilla qubits of the twist defect at a fourth time step.

At block 1962, the second entangled ancilla qubit of the twist defect is measured in the X-basis, the first entangled ancilla qubit of the twist defect is measured in the Z-basis, and a Pauli measurement error correction is applied based on the measurement of the first entangled ancilla qubit in the Z-basis.

In some embodiments, lattice surgery using twists as described above may be combined with any other ones of the techniques described herein, such as error correction decoding techniques for lattice surgery, temporal encoding techniques to speed up lattice surgery, and/or quantum computer designs that utilize lattice surgery.

Temporal Encoding Techniques to Speed Up Lattice Surgery

A key idea behind temporal encoding of lattice surgery (TELS) is to use fast, noisy lattice surgery operations, with this noise corrected by encoding the sequence of Pauli measurements within a classical error correction code. Thus, more noise can be tolerated in the Pauli measurements, requiring fewer rounds of syndrome measurements during a lattice surgery protocol, wherein logical failures arising during a sequence of Pauli measurements implemented via lattice surgery can be corrected using a classical error correcting code.

This encoding can be thought of as taking place in the time domain, so the encoding does not directly lead to additional qubit overhead costs. There can be a small additive qubit cost when temporal encoding of lattice surgery (TELS) is used for magic state injection, with magic states needing to be stored for slightly longer times.

Parallelizable Pauli Measurements

In some embodiments, a sequence of Pauli measurements can be grouped in larger sets of parallelizable Pauli measurements. Let $P_{[t,t+k]} := \{P_t, P_{t+1}, \ldots, P_{t+k}\}$ be a subsequence of Pauli operators. $P_{[t,t+k]}$ is a parallelizable set if: all Pauli operators commute; and any Clifford corrections can be commuted to the end of the sub-sequence. For example, a parallelizable set is given when magic states are used to perform a $T^{\otimes k}$ gate. For example, several ways to implement two T gates with Pauli based computation (PBC) and sequential Pauli based computation (seqPBC) are shown in FIG. 1A to FIG. 1D. Therefore, given a circuit with $\mu$ T-gates and T-depth $\gamma$, the Pauli measurement sequence can be split into a sequence of $\gamma$ parallelizable sets of average size $k := \mu/\gamma$.

In time-optimal Pauli based computation, an n-qubit computation of T-depth $\gamma$ can be reduced to runtime $O(n+\gamma)$. However, the space-time volume is not compressed by using the time-optimal approach, so that reducing the algorithm runtime to 10% of a seqPBC runtime would require at least a 10× increase in qubit cost.

Encoding of Pauli Measurements

In some embodiments, temporal encoding of lattice surgery takes advantage of parallelizable Pauli sets to speed up lattice surgery while maintaining a given level of certainty (e.g., low error rate). However, unlike other approaches, it does not incur a multiplicative qubit overhead cause, and thus reduces an overall space-time cost of performing a quantum algorithm.

Due to the properties of a parallelizable Pauli set, all Pauli operators within the set can be measured in any order.

Furthermore, any set S that generates the group $(P_t, P_{t+1}, \ldots, P_{t+k})$ can be measured. If the set S is overcomplete, there will be some linear dependencies between the measurements that can be used to detect (and correct) for any errors in the lattice surgery measurements. For example, consider the simplest parallelizable set $\{P_1, P_2\}$ as in FIG. 1D and let $d_m$ be the required lattice surgery time, so performing both measurements takes $2(d_m+1)$ error correction cycles. Instead, $\{P_1, P_2, P_1P_2\}$ could be measured. If the 3rd measurement outcome (e.g., $P_1P_2$) is not equal to the product of the first two measurements (e.g., the product of $P_1$ and $P_2$), then it can be determined that something has gone wrong and the measurements can be repeated to gain more certainty of the true values. By measuring the overcomplete set $\{P_1, P_2, P_1P_2\}$ an extra lattice surgery measurement has been performed. However, this extra measurement (resulting in an overcomplete set) allows a single lattice surgery failure to be tolerated without causing a logical error. This is because the single lattice surgery failure can be detected, and when re-measuring the original set $\{P_1, P_2\}$ a second lattice surgery failure would need to occur to produce a wrong measurement outcome. This allows for fewer rounds of lattice surgery measurements to be taken and still avoid errors. For example, $d'_m \ll d_m$ while still achieving a same overall success probability. Also, since the overall time in non-temporally encoded lattice surgery is $2(d_m+1)$, if the measurements are such that $3d'_m \ll 2d_m$, then the computation has been speed up.

In general, given a parallelizable Pauli set $$P = \{P_t, P_{t+1}, \ldots, P_{t+k}\}$$

Figure 20:
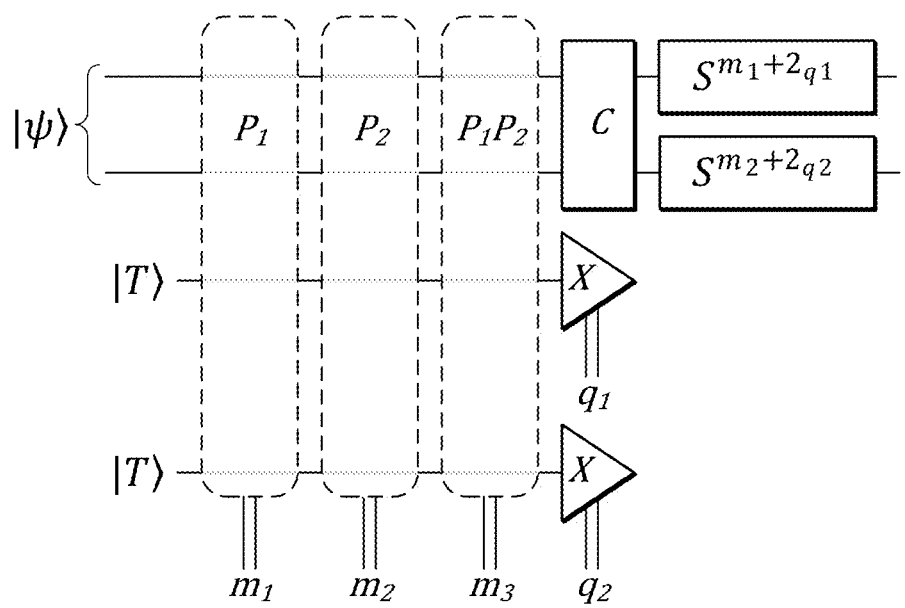
FIG. 20 illustrates a protocol for performing Pauli measurements for temporal encoded lattice surgery, according to some embodiments. The additional $P_1 \otimes P_2$ measurement is used for detecting if one of the two $P_1$ or $P_2$ measurements failed, according to some embodiments.

Pauli operators can be defined as $$Q[x] := \prod_{j=0}^{k-1} P_{t+j}^{x_j}$$

where x is a length k binary column vector. Given a set S that generates all the required Pauli operators, such that $\langle S \rangle = \langle P \rangle$, the elements of the set can be written as $$S = \{Q[x^1], Q[x^2], \ldots, Q[x^k]\}$$

with superscripts denoting different vectors. Since this is a generating set, the vectors $\{x^1, x^2, \ldots, x^k\}$ span the relevant space. Furthermore, a matrix G can be defined with these vectors as columns and such a matrix specifies the temporal encoding of lattice surgery (TELS) protocol. In the simple k=2 example as shown in FIG. 20, $S = \{P_1, P_2, P_1P_2\}$, and G is defined as $$G = \begin{pmatrix} 1 & 0 & 1 \\ 0 & 1 & 1 \end{pmatrix} = (x^1 x^2 x^3)$$

Notice that the rows of the above matrix generate the code words of the [3, 2, 2] classical code. In general G can be considered as the generator matrix for the code words of an [n, k, d] classical code. This is referred to herein as the measurement code for the temporal encoding of lattice surgery (TELS) protocol. Note that k is the number of (unencoded) Pauli operators in the generating set. The full-rank G matrix is considered where k equals the number of rows in G. The number n represents how many Pauli measurements are physically performed in the encoded scheme and corresponds to the number of columns in G. The distance d is the lowest weight vector in the row-span of G.

In order to show that the code distance d does in fact capture the ability of TELS to correct errors, the redundancy in lattice surgery measurements can be formalized as follows. For any length n binary vector $u=(u_1, u_2, \ldots, u_n)$ $$\prod_{j:u_j=1} Q[x^j] = Q\left[\sum_l u_l x^l\right]$$

Since the matrix G is full-rank and has more columns than rows, there will exist "u" such that $\Sigma_j u_j x^j = 0$. For these "u" it is true that.

$$\prod_{j:u_j=1} Q[x^j] = 1$$

Therefore, these "u" vectors describe redundancy in the measurements. The condition $\Sigma_j u_j x^j = 0$ can be rewritten compactly as $Gu=0$. Following the convention in coding theory, this set of "u" is called the dual of G and denoted as:

$$G^\perp := \{u : Gu = 0 (\text{mod } 2)\}$$

Next, consider that this redundancy can be used to detect time-like lattice surgery errors. For example, let $m=\{m_1, m_2, \ldots, m_n\}$ be a binary vector denoting the outcomes of the lattice surgery Pauli measurements in the set S. That is, if a measurement of $Q[x^j]$ gives outcome "+1" set $m_j=0$ and when the measurement of $Q[x^j]$ gives "−1" set $m_j=1$. Given a $u \in G^\perp$, we know that Pauli operators product to the identity so when there are no time-like lattice surgery errors we have $$\prod_{j:u_j=1} m_j = u \cdot m = 0 (\text{mod } 2)$$

Conversely, if it observed that $$\prod_{j:u_j=1} m_j = u \cdot m = 1 (\text{mod } 2)$$

then it is known that a time-like lattice surgery error has occurred. For example, consider m=s+e, where "s" is the ideal measurement outcome and "e" is the error measurement outcome. The ideal measurement outcomes are always self-consistent and so they always satisfy u·s=0 for all $u \in G^\perp$. Therefore, it can be seen that an error "e" is undetected if and only if u·e=0 for some $u \in G^\perp$. This is equivalent to undetected errors "e" being in the row-span of G (since the dual of the dual is always the original space). Recall, the distance d denotes the lowest (non-zero) weight vector in the row-span of G. Therefore, d also denotes the smallest number of time-like lattice surgery errors needed for them to be undetected by TELS. Consequently, if $\mathbb{P}$ is the probability of a single time-like error, TELS error-detection will fail with probability $O(\mathbb{P}^d)$.

As an example, take the Pauli set $\{P_t, P_{t+1}, \ldots, P_{t+k}\}$ and measure each of these observables separately, and then measure the product of them so that the measurement code has the generator matrix $$G = \begin{pmatrix} 1 & 0 & \ldots & 0 & 1 \\ 0 & 1 & \ldots & 0 & 1 \\ \vdots & \vdots & \vdots & \vdots & \vdots \\ 0 & 0 & \ldots & 1 & 1 \end{pmatrix}$$

which is an identity matrix padded with an extra column that is an all 1 vector. Therefore, this corresponds to a $[\alpha+1, \alpha, 2]$ classical code that detects a single error. Concatenating such a code m times gives a code with parameters $[(\alpha+1)^m, \alpha^m, 2^m]$. Another example that can be considered is an example wherein a simple [8, 4, 4] extended Hamming code is used as the measurement code with generator matrix $$G = \begin{pmatrix} 0 & 0 & 0 & 0 & 1 & 1 & 1 & 1 \\ 1 & 1 & 1 & 1 & 0 & 0 & 0 & 0 \\ 1 & 1 & 0 & 0 & 1 & 1 & 0 & 0 \\ 1 & 0 & 1 & 0 & 1 & 0 & 1 & 0 \end{pmatrix}$$

This corresponds with replacing $\{P_1, P_2, P_3, P_4\}$ with S containing the 8 operators $$S = \{P_2 P_3 P_4, P_2 P_3 P_2 P_4, P_2, P_1 P_3 P_4, P_1 P_3, P_1 P_4, P_1\}$$

Because the generator matrix has distance 4, this scheme will detect up to 3 errors. This Hamming code is the m=3 member of a family of $[2^m, 2^m-m-1, 4]$ extended Hamming codes. There are several viable strategies to handle a detected error.

In some embodiments, the following detect/remeasure strategy is used: if a distance d measurement code is used with lattice surgery performed for time $d_m$, then whenever an error is detected the Pauli operators are "remeasured" but this time using the original Pauli set $P=\{P_t, P_{t+1}, \ldots, P_{t+k}\}$ instead of using the overcomplete set S. For the remeasure round, the lattice surgery is performed using an amount of time $[qd_m]$ where q is some constant scaling factor. The expected runtime to execute the protocol is then $$T = n(d_m+1) + p_d k d d_m$$

where $p_d$ is the probability of detecting an error.

Figure 21:
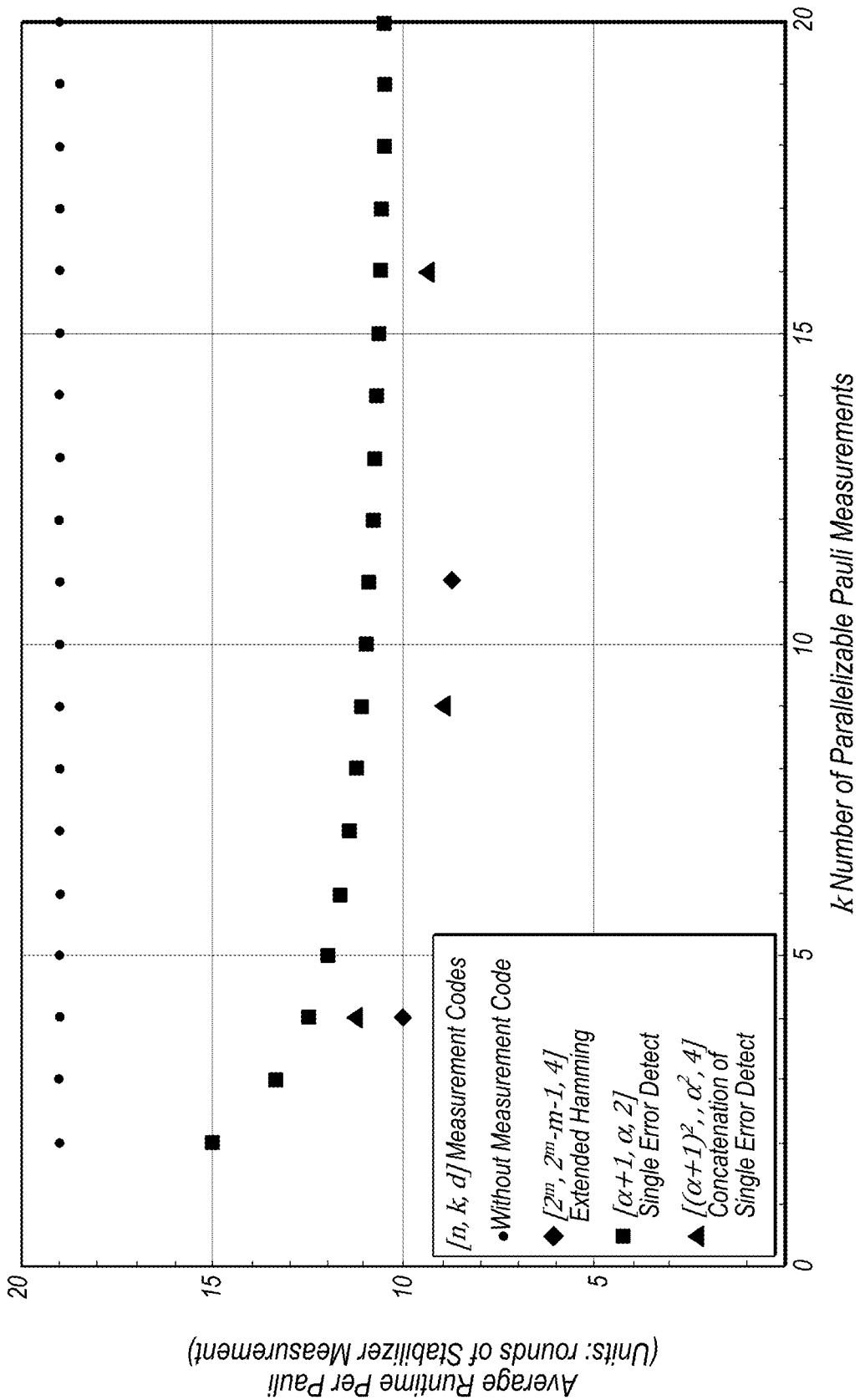
FIG. 21 is a graph illustrating run-times for standard lattice surgery as compared to temporal encoded lattice surgery, according to some embodiments.

FIG. 21 shows some example numerical results using distance 2 and 4 classical codes. For example, when performing k=11 parallelizable gates, the TELS scheme using extended Hamming codes will have a runtime of 46% that of a standard fast seqPBC approach that measures the original parallelizable Pauli set P.

FIG. 22 is a flowchart illustrating a process of performing lattice surgery using temporally encoded measurements (e.g. temporally encoded lattice surgery or TELS), according to some embodiments. Note that the lattice surgery protocol using twists, as described in the preceding section, may be used with temporal encoding of lattice surgery.

At block 2202 temporally encoded lattice surgery is performed via temporally encoded measurements. The temporally encoded lattice surgery (TELS) includes, at block 2204, measuring a parallelizable set of Pauli operators associated with a lattice surgery operation. The set comprises Pauli measurements of at least a first Pauli operator; at least a second Pauli operator; and at least one product of the first and second Pauli operators, wherein there is a linear dependence between the measurements of the first and second Pauli operators. Then, at block 2206 errors are detected or corrected based on comparing a calculated product of the Pauli measurements of the first and second Pauli operator to the measured product of the first and second Pauli operators.

Quantum Computer Designs that Utilize Lattice Surgery

In some embodiments, a new layout and data access structure is used that extends the layout shown in FIG. 13A discussed above with regard to twist-based lattice surgery. For the following discussion, consider surface code patches of size $d_z$ by $d_x$. Between the qubits of the surface code patches, some qubits are dedicated as a lattice surgery "bus" or routing space. The layout and data access structure are comprised of tiles as shown in FIG. 23A. For instance, such tiles may be in the construction of a surface code patch as shown in FIG. 23B, and FIG. 23C illustrates a unit cell comprising four surface code patches with "routing space" between the surface code patches also constructed from tiles. The routing space supports fast access if logical X and Z operators of the surface code patches are adjacent to the routing space. In some embodiments, the unit cell as shown in FIG. 23C may alternatively be arranged with similar route spacing as shown in FIG. 13A.

Quantum Computer Core Computing Region

In some embodiments, resource costs are counted in terms of tiles (e.g., as shown in FIG. 23A). Each tile comprises a single data qubit and four quarter ancilla qubits (quarter qubit because a given ancilla is shared by four tiles). Therefore, a device with T tiles will require roughly 2T qubits. However, qubits cannot be cut into quarters and so a precise counting will include these. For instance, a rectangular device with a height of h tiles and width of w tiles would have a total of T=wh tiles and 2T+w+h+1 qubits. When the device is roughly square, then h and w are of size $O\sqrt{T}$ and so a negligible additive cost compared to 2T. A surface code patch using $d_x d_z$ tiles as shown in FIG. 23B is used in some embodiments. Therefore $2d_x d_z$ qubits are used. The number of data and ancilla qubits actively used in the surface code patch is $2d_x d_z - 1$, and so when the surface code patches are packed in a 2D arrangement, the tightest possible packing will contain one idling qubit per patch.

Figure 23D:
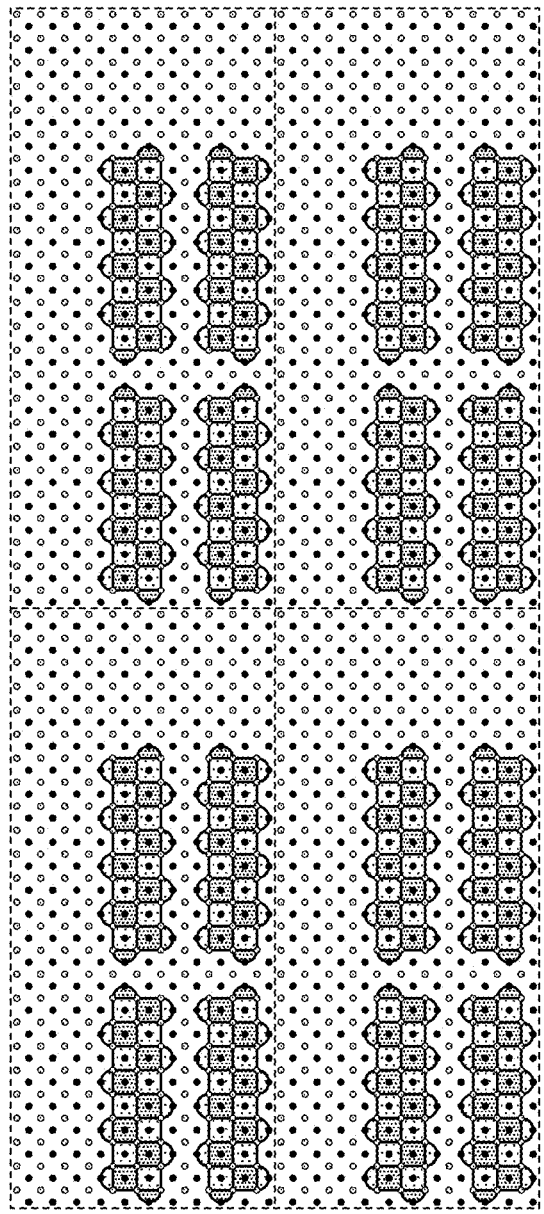
FIG. 23D illustrates a set of four unit cells that may be used in a core computing region of a quantum computer, according to some embodiments.

In some embodiments, surface code patches are collected into groups of four, which are referred to herein as a unit cell (see FIGS. 23C and 13A). These unit cells are then repeated as shown in FIG. 23D to get the required number of logical qubits. In addition, the unit cells are arranged to form a quantum "core", along with some additional padding shown in FIG. 23E. Notice that in FIGS. 23A-23E, every patch has logical X and Z boundary operators connected to the routing space, which enables quick performance of multi-qubit Pauli measurements between any subset of qubits within the core. Additionally, there are unused qubits between some of the surface code patches. The spacing of the qubits ensures that lattice surgery can be performed (as discussed in FIGS. 10-19B) using twists.

The routing overhead for unit cells is then the ratio of the number of tiles divided by the cost without any routing space (e.g., $4d_x d_z$).

$$\text{Overhead (unit cell)} = \frac{(2d_z + d_x + 4)(3d_x + 2)}{4d_z d_x}$$

Figure 23E:
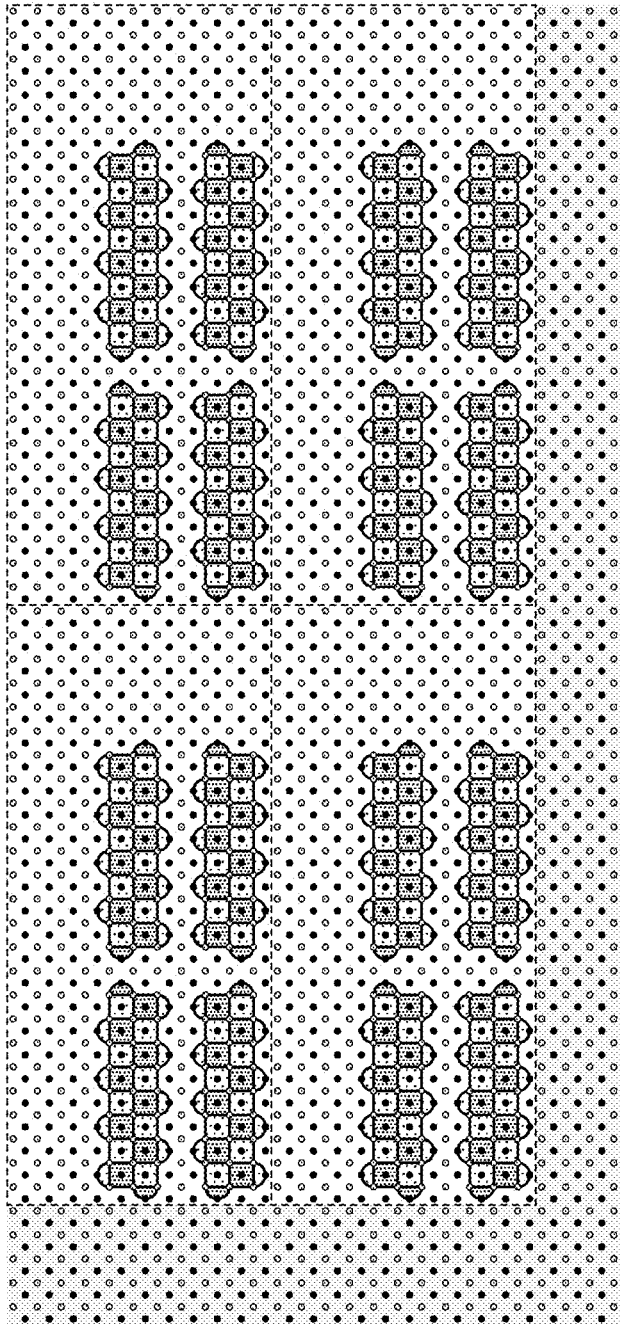
FIG. 23E illustrates additional edge padding surrounding the set of four unit cells, which may be used in a quantum computer, according to some embodiments.

The overhead for the entire core will include a contribution from the additional padding shown in FIG. 23E. However, in the limit of many unit cells, the total overhead is dominated by the unit cell overhead. In the limit of large distances $d_z, d_x \gg 1$, $$\text{Overhead (unit cell)} \approx \frac{3}{2} + \frac{3}{4}\frac{d_x}{d_z}$$

Therefore, in the limit of large noise bias, $d_z \gg d_x$, the routing overhead factor is 1.5×.

Quantum Computer Cache Region

Figure 24:
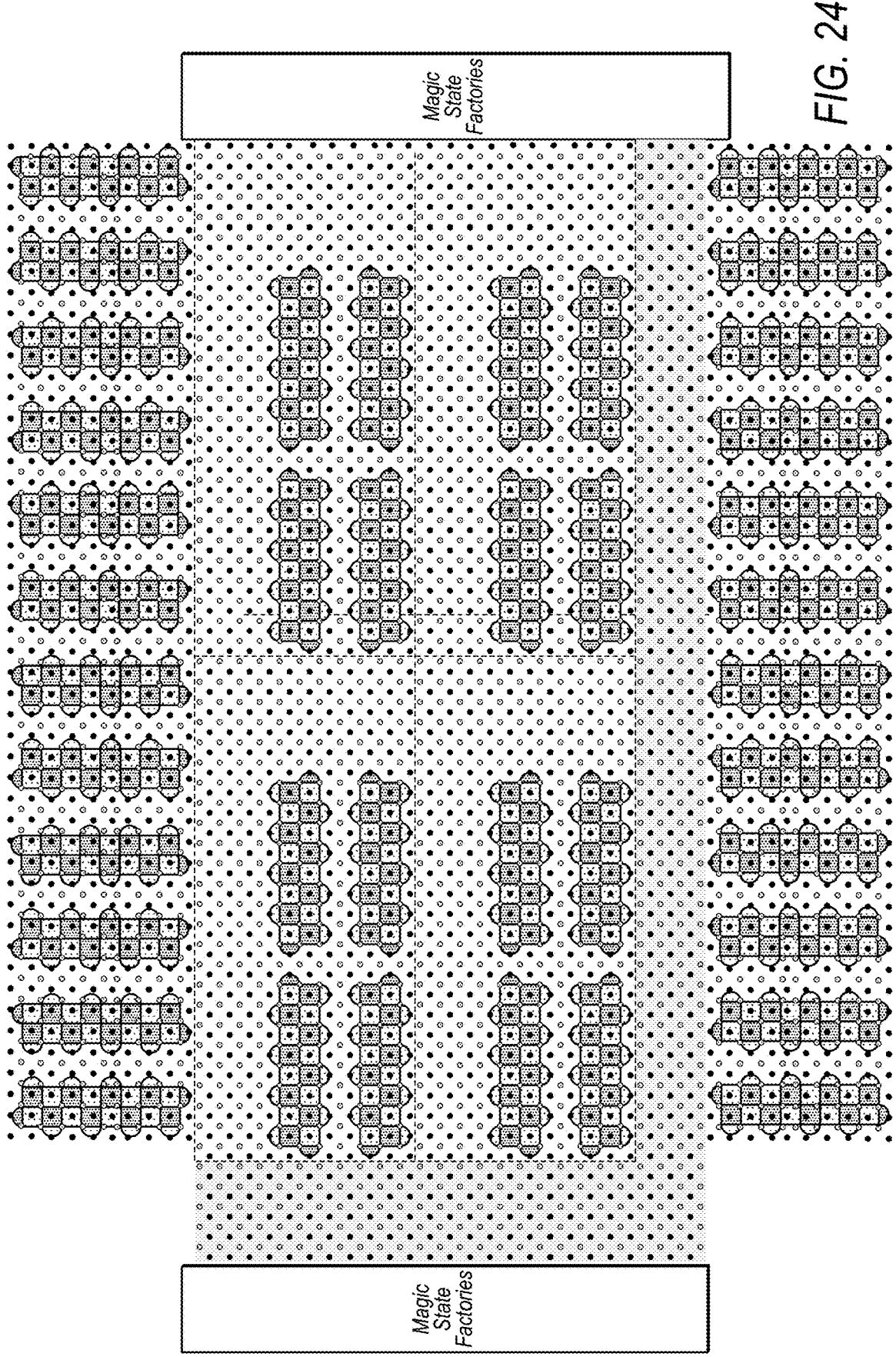
FIG. 24 illustrates an example core computing region surrounded by edge padding and additional cache regions, along with magic state factories at either end of the core computing region, according to some embodiments. The cache region comprises the remaining logical qubits encoded in the surface code which are used in the implementation of a quantum algorithm, according to some embodiments.

Using state distillation to prepare magic states, magic state factories that supply the core are provided as shown in FIG. 24. In a core and cache architecture some logical qubits are temporarily stored in a quantum analog of cache. However, with some time cost, logical qubits can be quickly swapped in and out of the cache. A small-scale sketch of a device comprising core, cache and magic state factories is illustrated in FIG. 24. Note that in some embodiments, the route spacing may be adjusted to be similar to that shown in FIG. 13A.

Packing qubits more compactly in the cache will clearly reduce the overhead costs. However, such a layout comes at a price since only the X logical operators of these qubits can be accessed when a surface code patch is in the cache. To access the logical Z operators, the surface code patch must be swapped out of the cache and into the core. Thus, for a logical qubit stored in the cache, the following operations can be performed:

1) Perform single qubit X or Z measurements for a logical qubit in the cache (time cost: zero).
2) Measure multi-qubit operators of the form A⊗B where B acts on the cache qubits and is a tensor product of X operators only, and A acts on the core qubits and can be an arbitrary Pauli operator (time cost: $d_m$).
3) Perform Pauli updates to the Pauli frame (in software).
4) Perform Clifford frame cleaning to qubits in the core, by updating the Clifford frame (in software).

In some embodiments, the above operations are the only allowed operations on cache qubits.

For algorithms where swapping in/out of the cache can be made infrequently (compared to other time costs), this approach will reduce the routing overhead with a mild impact on the algorithm runtime. Note also that the cache/core architecture can be used in combination with the twist-free or TELS schemes already discussed above.

This leaves the question of how to swap the location of qubits from the cache to the core. It is not feasible to directly implement the Clifford SWAP operation, since Clifford operators can only be performed on core qubits. Further, surface code patches cannot be moved around to swap their positions since such operations would require the Clifford frame C to be re-labelled. Such a re-labelling might make C act non-trivially on qubits in the cache. Rather, when performing a SWAP from a qubit in the core to the cache, the Clifford frame needs to be cleaned so that it only acts on core qubits.

Figure 25A:
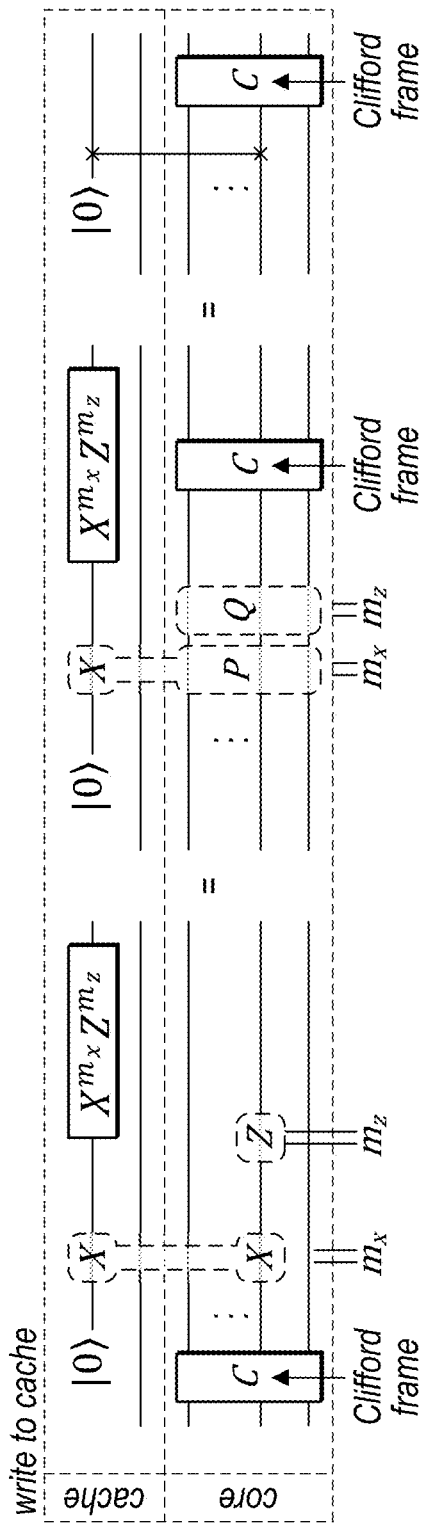
FIG. 25A illustrates an example circuit diagram for a write to cache operation, which may be applied to write logical data stored in a surface code in a core computing region to a surface code in a cache region, according to some embodiments.
Figure 25B:
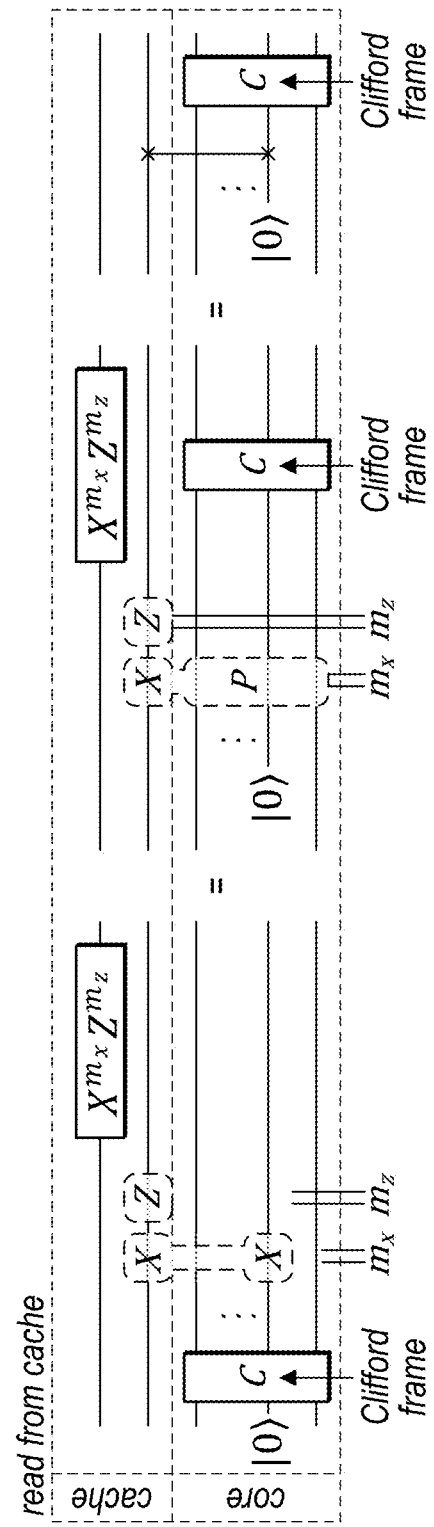
FIG. 25B illustrates an example circuit diagram for a read from cache operation, which may be applied to read logical data stored in a surface code in a cache region into a surface code in a core computing region, according to some embodiments.

In some embodiments two elementary operations are defined: write to cache (WTC) and read from cache (RFC), which when combined will enable a Clifford-cleaned swap. The WTC and RFC protocols are presented using the circuit diagrams shown in FIGS. 25A and 25B. They are both essentially 2-qubit teleportation protocols, but with the Clifford frame adapting the Pauli measurements performed.

The WTC operation uses two multi-qubit Pauli measurements, whereas RFC can be performed faster as it uses only one multi-qubit Pauli measurement and a single-qubit Pauli measurement (that takes zero time). The WTC operation requires a logical $|0\rangle$ ancilla in the cache, which through the protocol swaps place with a logical qubit in the core. The RFC operation requires a logical $|0\rangle$ ancilla in the core, which through the protocol swaps place with a logical qubit in the cache.

For a pair of logical qubits, one in the core and one in the cache, their positions can be cleanly swapped by executing WTC followed by RFC. The $|0\rangle$ ancilla initially in the cache, will move to the core, then back to the cache, but at a different location than it started. The whole swap procedure requires three multi-qubit Pauli measurements if none of the Pauli measurements involve Y operators. In a general setting where the twist-free lattice surgery protocol is used to measure Y operators, the WTC and RFC protocols will require a total of six multi-qubit Pauli measurements.

Figure 26:
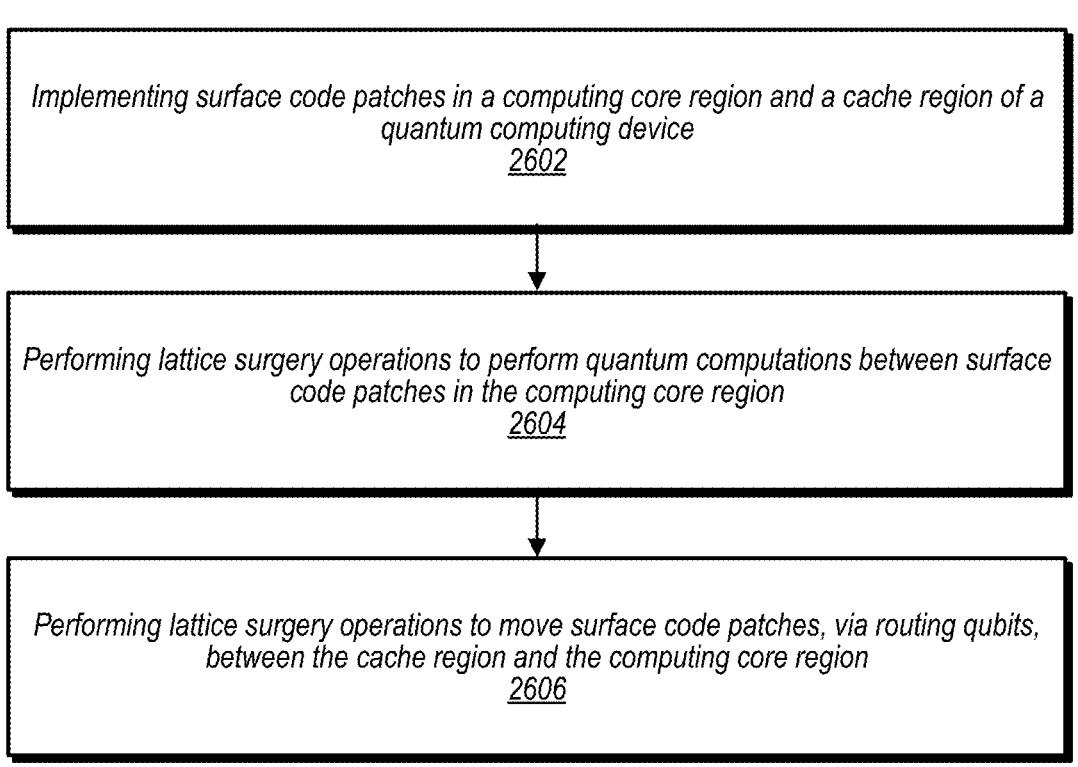
FIG. 26 is a flowchart illustrating a process of performing quantum computations using a quantum computing device comprising a computing core region and a cache region, according to some embodiments.

FIG. 26 is a flowchart illustrating a process of performing quantum computations using a quantum computing device comprising a computing core region and a cache region, according to some embodiments.

At block 2602, surface code patches are implemented in a computing core region and in a cache region of quantum computing device, such as shown in FIG. 24. At block 2604, lattice surgery operations are performed in order to perform quantum computations between surface code patches in the computing core region. At block 2606, lattice surgery operations are performed to move surface code patches, via routing computing, between the cache region and the computing core region.

Illustrative Computer System

Figure 27:
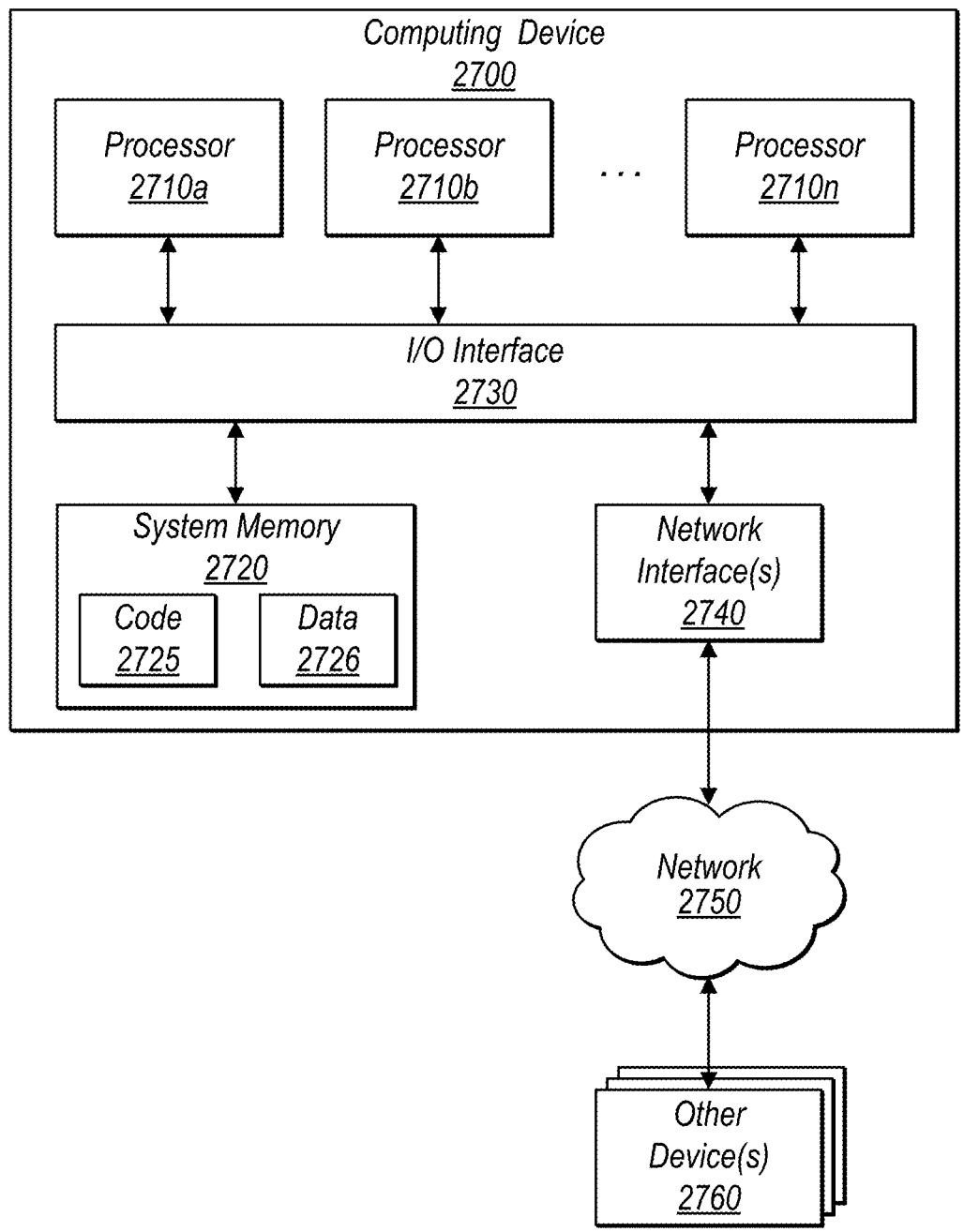
FIG. 27 is a block diagram illustrating an example computing device that may be used in at least some embodiments.

FIG. 27 is a block diagram illustrating an example computing device that may be used in at least some embodiments.

FIG. 27 illustrates such a general-purpose computing device 2700 as may be used in any of the embodiments described herein. In the illustrated embodiment, computing device 2700 includes one or more processors 2710 coupled to a system memory 2720 (which may comprise both non-volatile and volatile memory modules) via an input/output (I/O) interface 2730. Computing device 2700 further includes a network interface 2740 coupled to I/O interface 2730. Classical computing functions such as encoding and decoding Pauli measurements, controlling a quantum hardware device, and other non-quantum operations as described herein may be performed on a classical computer system, such as computing device 2700.

In various embodiments, computing device 2700 may be a uniprocessor system including one processor 2710, or a multiprocessor system including several processors 2710 (e.g., two, four, eight, or another suitable number). Processors 2710 may be any suitable processors capable of executing instructions. For example, in various embodiments, processors 2710 may be general-purpose or embedded processors implementing any of a variety of instruction set architectures (ISAs), such as the x86, PowerPC, SPARC, or MIPS ISAs, or any other suitable ISA. In multiprocessor systems, each of processors 2710 may commonly, but not necessarily, implement the same ISA. In some implementations, graphics processing units (GPUs) may be used instead of, or in addition to, conventional processors.

System memory 2720 may be configured to store instructions and data accessible by processor(s) 2710. In at least some embodiments, the system memory 2720 may comprise both volatile and non-volatile portions; in other embodiments, only volatile memory may be used. In various embodiments, the volatile portion of system memory 2720 may be implemented using any suitable memory technology, such as static random-access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random-access memory (ReRAM), three-dimensional NAND technologies, Ferroelectric RAM, magneto resistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 2720 as code 2725 and data 2726.

In some embodiments, I/O interface 2730 may be configured to coordinate I/O traffic between processor 2710, system memory 2720, and any peripheral devices in the device, including network interface 2740 or other peripheral interfaces such as various types of persistent and/or volatile storage devices. In some embodiments, I/O interface 2730 may perform any necessary protocol, timing or other data transformations to convert data signals from one component (e.g., system memory 2720) into a format suitable for use by another component (e.g., processor 2710). In some embodiments, I/O interface 2730 may include support for devices attached through various types of peripheral buses, such as a variant of the Peripheral Component Interconnect (PCI) bus standard or the Universal Serial Bus (USB) standard, for example. In some embodiments, the function of I/O interface 2730 may be split into two or more separate components, such as a north bridge and a south bridge, for example. Also, in some embodiments some or all of the functionality of I/O interface 2730, such as an interface to system memory 2720, may be incorporated directly into processor 2710.

Network interface 2740 may be configured to allow data to be exchanged between computing device 2700 and other devices 2760 attached to a network or networks 2750, such as other computer systems or devices. In various embodiments, network interface 2740 may support communication via any suitable wired or wireless general data networks, such as types of Ethernet network, for example. Additionally, network interface 2740 may support communication via telecommunications/telephony networks such as analog voice networks or digital fiber communications networks, via storage area networks such as Fibre Channel SANs, or via any other suitable type of network and/or protocol.

In some embodiments, system memory 2720 may represent one embodiment of a computer-accessible medium configured to store at least a subset of program instructions and data used for implementing the methods and apparatus discussed in the context of FIG. 1 through FIG. 26. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 2700 via I/O interface 2730. A non-transitory computer-accessible storage medium may also include any volatile or non-volatile media such as RAM (e.g., SDRAM, DDR SDRAM, RDRAM, SRAM, etc.), ROM, etc., that may be included in some embodiments of computing device 2700 as system memory 2720 or another type of memory. In some embodiments, a plurality of non-transitory computer-readable storage media may collectively store program instructions that when executed on or across one or more processors implement at least a subset of the methods and techniques described above. A computer-accessible medium may further include transmission media or signals such as electrical, electromagnetic, or digital signals, conveyed via a communication medium such as a network and/or a wireless link, such as may be implemented via network interface 2740. Portions or all of multiple computing devices such as that illustrated in FIG. 27 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g., SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
a quantum hardware device; and
a computing device, configured to cause:
a plurality of surface code patches storing logical information to be implemented on the quantum hardware device, wherein the surface code patches comprise data qubits that encode the logical information; and
a lattice surgery operation to be performed between at least two of the surface code patches, wherein twist defects are used to perform the lattice surgery operation,
wherein to perform the lattice surgery operation using twist defects, the computing device is configured to:
perform measurements of Pauli operators between the surface code patches, wherein:
a Pauli-Y measurement is performed via:
extending the surface code patches into a routing space such that respective logical Y operators for the surface code patches are expressed along respective horizontal boundaries of the respective extended surface code patches; and
performing a gauge fixing measurement of the extended surface code patches,
wherein the extending and the gauge fixing measurement are performed in a same time step.

2. The system of claim 1, wherein the extended surface code patches, extended into the routing space comprise:
twist defects;
elongated X-type stabilizers; and
elongated Z-type stabilizers.

3. The system of claim 2, wherein the twist defects, the elongated X-type stabilizers, and the elongated Z-type stabilizers comprise:
two entangled ancilla qubits prepared in a GHZ state.

4. The system of claim 3, wherein a gate scheduling used to perform a weight-four stabilizer measurement of one of the elongated X-type stabilizers or Z-type stabilizers comprises:
performing state preparation at a first time step;
performing a CNOT gate between the two entangled ancilla qubits of the elongated X-type or Z-type stabilizer at a second time step;
performing a CNOT gate between a first one of the two entangled ancilla qubits of the elongated X-type or Z-type stabilizer and a data qubit at a third time step;
performing a CNOT gate between a second one of the two entangled ancilla qubits of the elongated X-type or Z-type stabilizer and a second data qubit at a fourth time step;
concurrently performing at a fifth time step:
a CNOT gate between the first one of the entangled ancilla qubits of the elongated X-type or Z-type stabilizer and a third data qubit; and
a CNOT gate between the second one of the entangled ancilla qubits of the elongated X-type or Z-type stabilizer and a fourth data qubit.

5. The system of claim 4, wherein the first one of the two entangled ancilla qubits of the elongated X-type stabilizer is prepared in a $|0\rangle$ state and the second one of the two entangled ancilla qubits of the elongated X-type stabilizer is prepared in a $|+\rangle$ state.

6. The system of claim 2, wherein a quantum circuit used to perform a weight-five stabilizer measurement of one of the twists defects comprises:
a first controlled Pauli operator gate ($P_1$) and a second controlled Pauli operator gate ($P_2$),
wherein $P_1 P_2$ corresponds to a given stabilizer being measured as part of performing the gauge fixing measurement of the extended surface code patches.

7. The system of claim 3, wherein a gate scheduling used to perform a weight-five stabilizer measurement of one of the twist defects comprises:
performing state preparation at a first time step;
performing a CNOT gate between the two entangled ancilla qubits of the twist defect at a second time step;
performing a first controlled Pauli operator gate between a portion of the data qubits proximate to the twist defect and a first one of the two entangled ancilla qubits of the twist defect, wherein a product of the first controlled Pauli operator gate and a second controlled Pauli operator gate correspond to the weight-five stabilizer being measured;

performing the second controlled Pauli operator gate between another portion of the data qubits proximate to the twist defect and the second one of the entangled ancilla qubits of the twist defect; and measuring the first and second entangled ancilla qubits of the twist defect in the X-basis.

8. The system of claim 7, wherein the first one of the entangled ancilla qubits of the twist defect is prepared in a $|+\rangle$ state and the second one of the entangled ancilla qubits of the twist defect is prepared in a $|0\rangle$ state.

9. The system of claim 8, wherein a gate scheduling used to perform a weight-five stabilizer measurement of another one of the twist defects comprises:

performing state preparation at a first time step;

performing the first controlled Pauli operator gate between a portion of the data qubits proximate to the other twist defect and a first one of the two entangled ancilla qubits of the other twist defect;

performing the second controlled Pauli operator gate between another portion of the data qubits proximate to the other twist defect and the second one of the entangled ancilla qubits of the other twist defect;

performing a CNOT gate between the two the entangled ancilla qubits of the other twist defect at a fifth time step; and measuring the second entangled ancilla qubit of the other twist defect in the X-basis, measuring the first entangled ancilla qubit of the other twist defect in the Z basis, and applying a Pauli operator measurement correction based on the measurement of the first ancilla qubit of the other twist defect in the Z-basis.

10. The system of claim 9, wherein, for the other twist defect, the first one of the two entangled ancilla qubits is prepared in a $|+\rangle$ state and the second one of the two entangled ancilla qubits is prepared in a $|+\rangle$ state.

11. The system of claim 1, wherein the computing device is further configured to cause:

measurements to be performed for a parallelizable set of Pauli operators associated with the lattice surgery operation, wherein the set comprises Pauli measurements of:
at least a first Pauli operator;
at least a second Pauli operator; and
at least one product of the first and second Pauli operators, wherein there is a linear dependence between the measurements of the first and second Pauli operators; and detect an error in the Pauli measurements associated with the lattice surgery operation based on comparing a calculated product of the Pauli measurements of the first and second Pauli operators to the measured product of the Pauli measurements of the first and second Pauli operators.

12. The system of claim 11, wherein to correct the error the computing device is further configured to cause:

the measurements for an original parallelizable set of Pauli operators to be repeated.

13. The system of claim 1, wherein the computing device is further configured to:

implement the surface code patches in:
a computing core region of a two-dimensional array of qubits of the quantum hardware device; and
a cache region of the two-dimensional array of qubits of the quantum hardware device,
wherein the surface code patches in the computing core region are arranged such that the surface code patches are spaced out with a greater number of routing qubits between respective ones of the surface code patches than a number of routing qubits that are included between respective ones of the surface code patches in the cache region; and perform arbitrary lattice surgery operations to:
perform quantum computations between surface code patches in the computing core region; and
move respective ones of the surface code patches, via the routing qubits, between the cache region and the computing core region.

14. The system of claim 1, wherein a first gate scheduling (gate schedule A), a second gate scheduling (gate schedule B) and a third gate scheduling (gate schedule C) are used for performing X or Z stabilizer measurements for the extended surface code patches when measuring a Y operator.

15. A method of performing lattice surgery using twist defects, the method comprising:

extending surface code patches into a routing space such that respective logical Y operators for the surface code patches are expressed along respective horizontal boundaries of the respective extended surface code patches; and performing a gauge fixing measurement of the extended surface code patches, wherein said extending and said performing the gauge fixing measurement are performed in a same time step.

16. The method of claim 15, wherein a gate scheduling used to perform a weight-five stabilizer measurement of one of the twist defects comprises:

performing state preparation at a first time step;

performing a CNOT gate between two entangled ancilla qubits of the twist defect at a second time step;

performing a first controlled Pauli operator gate between a portion of the data qubits proximate to the twist defect and a first one of the two entangled ancilla qubits of the twist defect, wherein a product of the first controlled Pauli operator gate and a second controlled Pauli operator gate correspond to the weight-five stabilizer being measured;

performing the second controlled Pauli operator gate between another portion of the data qubits proximate to the twist defect and the second one of the entangled ancilla qubits of the twist defect; and measuring the first and second entangled ancilla qubits of the twist defect in the X-basis.

17. The method of claim 16, wherein a gate scheduling used to perform a weight-five stabilizer measurement of another one of the twist defects comprises:

performing state preparation at a first time step;

performing the first controlled Pauli operator gate between a portion of the data qubits proximate to the other twist defect and a first one of the two entangled ancilla qubits of the other twist defect;

performing the second controlled Pauli operator gate between another portion of the data qubits proximate to the other twist defect and the second one of the entangled ancilla qubits of the other twist defect;

performing a CNOT gate between the two entangled ancilla qubits of the other twist defect at a fifth time step; and measuring the second entangled ancilla qubit of the other twist defect in the X-basis, measuring the first entangled ancilla qubit of the other twist defect in the Z basis, and applying a Pauli operator measurement correction based on the measurement of the first ancilla qubit of the other twist defect in the Z-basis.

18. A non-transitory, computer-readable, medium storing program instructions that, when executed on or across one or more processors, cause the one or more processors to:

implement a plurality of surface code patches storing logical information on a quantum hardware device; and perform a lattice surgery operation between at least two of the surface code patches, wherein twist defects are used to perform the lattice surgery operation, wherein to perform the lattice surgery operation using twist defects, the program instructions cause the one or more processors to:

perform measurements of Pauli operators between the surface code patches, wherein:

a Pauli-Y measurement is performed via:

extending the surface code patches into a routing space such that respective logical Y operators for the surface code patches are expressed along respective horizontal boundaries of the respective extended surface code patches; and performing a gauge fixing measurement of the extended surface code patches, wherein the extending and the gauge fixing measurement are performed in a same time step.

19. The non-transitory, computer-readable medium of claim 18, wherein to perform a weight-five stabilizer measurement of one of the twist defects, the program instructions cause the one or more processors to:

perform state preparation at a first time step;

perform a CNOT gate between the two entangled ancilla qubits of the twist defect at a second time step;

perform a first controlled Pauli operator gate between a portion of the data qubits proximate to the twist defect and a first one of the two entangled ancilla qubits of the twist defect, wherein a product of the first controlled Pauli operator gate and a second controlled Pauli operator gate correspond to the weight-five stabilizer being measured;

perform the second controlled Pauli operator gate between another portion of the data qubits proximate to the twist defect and the second one of the entangled ancilla qubits of the twist defect at; and measure the first and second entangled ancilla qubits of the twist defect in the X-basis.

20. The non-transitory, computer-readable medium of claim 18, wherein to perform a weight-five stabilizer measurement of another one of the twist defects, the program instructions cause the one or more processors to:

perform state preparation at a first time step;

perform a first controlled Pauli operator gate between a portion of the data qubits proximate to the other twist defect and a first one of the two entangled ancilla qubits of the other twist defect;

perform a second controlled Pauli operator gate between another portion of the data qubits proximate to the other twist defect and the second one of the entangled ancilla qubits of the other twist defect;

perform a CNOT gate between the two the entangled ancilla qubits of the other twist defect at a fifth time step; and measure the second entangled ancilla qubit of the other twist defect in the X-basis, measuring the first entangled ancilla qubit of the other twist defect in the Z basis, and applying a Pauli operator measurement correction based on the measurement of the first ancilla qubit of the other twist defect in the Z-basis.

* * * * *